United States Patent
Welford et al.

(10) Patent No.: US 9,810,775 B1
(45) Date of Patent: Nov. 7, 2017

(54) Q-SWITCHED LASER FOR LIDAR SYSTEM

(71) Applicant: LUMINAR TECHNOLOGIES, INC., Portola Valley, CA (US)

(72) Inventors: David Welford, Danvers, MA (US); Martin A. Jaspan, Somerville, MA (US); Jason M. Eichenholz, Orlando, FL (US); Scott R. Campbell, Sanford, FL (US); Lane A. Martin, Sunnyvale, CA (US); Matthew D. Weed, Winter Park, FL (US)

(73) Assignee: Luminar Technologies, Inc., Portola Valley, CA (US)

( * ) Notice: Subject to any disclaimer, the term of this patent is extended or adjusted under 35 U.S.C. 154(b) by 0 days.

(21) Appl. No.: 15/461,378

(22) Filed: Mar. 16, 2017

(51) Int. Cl.
  *G01C 3/08* (2006.01)
  *G01S 7/481* (2006.01)
  *G01S 17/10* (2006.01)
  *H01S 3/11* (2006.01)
  *H01S 3/0941* (2006.01)

(52) U.S. Cl.
  CPC .......... *G01S 7/4814* (2013.01); *G01S 7/4817* (2013.01); *G01S 17/10* (2013.01); *H01S 3/0941* (2013.01); *H01S 3/1109* (2013.01); *H01S 3/1115* (2013.01)

(58) Field of Classification Search
  CPC ...... G01S 7/4814; G01S 7/4817; G01S 17/10; H01S 3/1109; H01S 3/1115
  USPC .................................................... 356/5.01
  See application file for complete search history.

(56) References Cited

U.S. PATENT DOCUMENTS

| | | | |
|---|---|---|---|
| 5,181,211 A | 1/1993 | Burnham et al. | |
| 5,198,657 A | 3/1993 | Trost et al. | |
| 5,381,431 A * | 1/1995 | Zayhowski | H01S 3/115 372/10 |
| 5,696,778 A | 12/1997 | MacPherson | |
| 5,852,492 A | 12/1998 | Nimblett et al. | |
| 5,867,305 A | 2/1999 | Waarts et al. | |
| 5,872,621 A | 2/1999 | Wilkerson et al. | |
| 5,892,575 A | 4/1999 | Marino | |
| 6,246,468 B1 * | 6/2001 | Dimsdale | G01B 11/002 356/4.02 |
| 6,449,384 B2 | 9/2002 | Laumeyer et al. | |

(Continued)

FOREIGN PATENT DOCUMENTS

WO    WO 2017/095817    6/2017

OTHER PUBLICATIONS

U.S. Appl. No. 15/180,580, filed Jun. 13, 2016, Hall.

(Continued)

*Primary Examiner* — Mark Hellner
(74) *Attorney, Agent, or Firm* — Knobbe, Martens, Olson & Bear, LLP

(57) ABSTRACT

In one embodiment, a lidar system includes a Q-switched laser configured to emit pulses of light, where the Q-switched laser includes a gain medium and a Q-switch. The lidar system further includes a scanner configured to scan the emitted pulses of light across a field of regard and a receiver configured to detect at least a portion of the scanned pulses of light scattered by a target located a distance from the lidar system. The lidar system also includes a processor configured to determine the distance from the lidar system to the target based at least in part on a round-trip time of flight for an emitted pulse of light to travel from the lidar system to the target and back to the lidar system.

20 Claims, 12 Drawing Sheets

(56) References Cited

U.S. PATENT DOCUMENTS

| | | | |
|---|---|---|---|
| 6,710,324 B2 | 3/2004 | Hipp | |
| 6,723,975 B2 | 4/2004 | Saccomanno | |
| 6,747,747 B2 | 6/2004 | Hipp | |
| 6,759,649 B2 | 7/2004 | Hipp | |
| 7,092,548 B2 | 8/2006 | Laumeyer et al. | |
| 7,209,221 B2 | 4/2007 | Breed et al. | |
| 7,345,271 B2 | 3/2008 | Boehlau et al. | |
| 7,443,903 B2 | 10/2008 | Leonardo et al. | |
| 7,532,311 B2 | 5/2009 | Henderson et al. | |
| 7,570,793 B2 | 8/2009 | Lages et al. | |
| 7,583,364 B1 | 9/2009 | Mayor et al. | |
| 7,649,920 B2 | 1/2010 | Welford | |
| 7,652,752 B2 | 1/2010 | Fetzer et al. | |
| 7,872,794 B1 | 1/2011 | Minelly et al. | |
| 7,902,570 B2 | 3/2011 | Itzler et al. | |
| 7,945,408 B2 | 5/2011 | Dimsdale et al. | |
| 7,969,558 B2 | 6/2011 | Hall | |
| 7,995,796 B2 | 8/2011 | Retterath et al. | |
| 8,059,263 B2 | 11/2011 | Haberer et al. | |
| 8,072,663 B2 | 12/2011 | O'Neill et al. | |
| 8,081,301 B2 | 12/2011 | Stann et al. | |
| 8,138,849 B2 | 3/2012 | West et al. | |
| 8,279,420 B2 | 10/2012 | Ludwig et al. | |
| 8,280,623 B2 | 10/2012 | Trepagnier et al. | |
| 8,346,480 B2 | 1/2013 | Trepagnier et al. | |
| 8,364,334 B2 | 1/2013 | Au et al. | |
| 8,452,561 B2 | 5/2013 | Dimsdale et al. | |
| 8,541,744 B1 | 9/2013 | Liu | |
| 8,548,014 B2 | 10/2013 | Fermann et al. | |
| 8,625,080 B2 | 1/2014 | Heizman et al. | |
| 8,675,181 B2 | 3/2014 | Hall | |
| 8,723,955 B2 | 5/2014 | Klehn et al. | |
| 8,767,190 B2 | 7/2014 | Hall | |
| 8,796,605 B2 | 8/2014 | Mordarski et al. | |
| 8,804,787 B1 | 8/2014 | Coleman et al. | |
| 8,836,922 B1 | 9/2014 | Pennecot et al. | |
| 8,880,296 B2 | 11/2014 | Breed | |
| 8,896,818 B2 * | 11/2014 | Walsh | G01S 7/4818 356/3.01 |
| 8,934,509 B2 | 1/2015 | Savage-Leuchs et al. | |
| 9,000,347 B2 | 4/2015 | Woodward et al. | |
| 9,041,136 B2 | 5/2015 | Chia | |
| 9,048,370 B1 | 6/2015 | Urmson et al. | |
| 9,063,549 B1 | 6/2015 | Pennecot et al. | |
| 9,069,060 B1 | 6/2015 | Zbrozek et al. | |
| 9,074,878 B2 | 7/2015 | Steffey et al. | |
| 9,086,273 B1 | 7/2015 | Gruver et al. | |
| 9,086,481 B1 | 7/2015 | Dowdall et al. | |
| 9,091,754 B2 | 7/2015 | D'Aligny | |
| 9,103,669 B2 | 8/2015 | Giacotto et al. | |
| 9,121,703 B1 | 9/2015 | Droz et al. | |
| 9,160,140 B2 | 10/2015 | Gusev et al. | |
| 9,170,333 B2 | 10/2015 | Mheen et al. | |
| 9,199,641 B2 | 12/2015 | Ferguson et al. | |
| 9,203,210 B2 * | 12/2015 | Taira | H01S 3/1643 |
| 9,213,085 B2 | 12/2015 | Kanter | |
| 9,239,260 B2 | 1/2016 | Bayha et al. | |
| 9,246,041 B1 | 1/2016 | Clausen et al. | |
| 9,285,464 B2 | 3/2016 | Pennecot et al. | |
| 9,285,477 B1 | 3/2016 | Smith et al. | |
| 9,297,901 B2 | 3/2016 | Bayha et al. | |
| 9,299,731 B1 | 3/2016 | Lenius et al. | |
| 9,304,154 B1 | 4/2016 | Droz et al. | |
| 9,304,203 B1 | 4/2016 | Droz et al. | |
| 9,304,316 B2 | 4/2016 | Weiss et al. | |
| 9,310,471 B2 | 4/2016 | Sayyah et al. | |
| 9,335,255 B2 | 5/2016 | Retterath et al. | |
| 9,360,554 B2 | 6/2016 | Retterath et al. | |
| 9,368,933 B1 | 6/2016 | Nijjar et al. | |
| 9,383,201 B2 | 7/2016 | Jachman et al. | |
| 9,383,445 B2 | 7/2016 | Lu et al. | |
| 9,515,448 B2 * | 12/2016 | Stultz | H01S 3/0627 |
| 2002/0041435 A1 | 4/2002 | Krummrich | |
| 2002/0060784 A1 | 5/2002 | Pack et al. | |
| 2003/0043058 A1 | 3/2003 | Jamieson et al. | |
| 2005/0214690 A1 | 9/2005 | Verheijden et al. | |
| 2006/0231771 A1 | 10/2006 | Lee et al. | |
| 2006/0290920 A1 | 12/2006 | Kämpchen et al. | |
| 2007/0040121 A1 | 2/2007 | Kalayeh | |
| 2007/0182949 A1 | 8/2007 | Niclass | |
| 2008/0027591 A1 | 1/2008 | Lenser et al. | |
| 2008/0074640 A1 | 3/2008 | Walsh et al. | |
| 2008/0181266 A1 | 7/2008 | Deladurantaye et al. | |
| 2008/0309913 A1 | 12/2008 | Fallon | |
| 2009/0122295 A1 | 5/2009 | Eaton | |
| 2009/0262760 A1 | 10/2009 | Krupkin et al. | |
| 2009/0273770 A1 | 11/2009 | Bauhahn et al. | |
| 2010/0034221 A1 | 2/2010 | Dragic | |
| 2010/0091263 A1 | 4/2010 | Kumagai et al. | |
| 2010/0128744 A1 | 5/2010 | Deladurantaye et al. | |
| 2011/0085149 A1 | 4/2011 | Nathan | |
| 2011/0122895 A1 | 5/2011 | Savage-Leuchs et al. | |
| 2012/0027034 A1 | 2/2012 | Nettleton et al. | |
| 2012/0168605 A1 | 7/2012 | Milanovic | |
| 2012/0206712 A1 | 8/2012 | Chang et al. | |
| 2012/0227263 A1 | 9/2012 | Leclair et al. | |
| 2012/0268105 A1 | 10/2012 | Mann et al. | |
| 2013/0010820 A1 | 1/2013 | Curtis | |
| 2013/0033742 A1 | 2/2013 | Rogers et al. | |
| 2013/0282208 A1 | 10/2013 | Mendez-Rodriguez et al. | |
| 2014/0111805 A1 | 4/2014 | Albert et al. | |
| 2014/0146303 A1 | 5/2014 | Mitchell et al. | |
| 2014/0168631 A1 | 6/2014 | Haslim et al. | |
| 2014/0176933 A1 | 6/2014 | Haslim et al. | |
| 2014/0211194 A1 | 7/2014 | Pacala et al. | |
| 2014/0268098 A1 | 9/2014 | Schwarz | |
| 2014/0268311 A1 | 9/2014 | Zhu | |
| 2014/0293263 A1 | 10/2014 | Justice et al. | |
| 2014/0293266 A1 | 10/2014 | Hsu et al. | |
| 2014/0330479 A1 | 11/2014 | Dolgov | |
| 2014/0376001 A1 | 12/2014 | Swanson | |
| 2015/0109605 A1 | 4/2015 | Major, Jr. et al. | |
| 2015/0131080 A1 | 5/2015 | Retterath et al. | |
| 2015/0177368 A1 | 6/2015 | Bayha et al. | |
| 2015/0185244 A1 | 7/2015 | Inoue et al. | |
| 2015/0185313 A1 | 7/2015 | Zhu | |
| 2015/0192676 A1 | 7/2015 | Kotelnikov et al. | |
| 2015/0192677 A1 | 7/2015 | Yu et al. | |
| 2015/0204978 A1 | 7/2015 | Hammes et al. | |
| 2015/0214690 A1 | 7/2015 | Savage-Leuchs et al. | |
| 2015/0301182 A1 | 10/2015 | Geiger et al. | |
| 2015/0316415 A1 | 11/2015 | Islam | |
| 2015/0323654 A1 | 11/2015 | Jachmann et al. | |
| 2015/0378023 A1 | 12/2015 | Royo et al. | |
| 2015/0378241 A1 | 12/2015 | Eldada | |
| 2016/0025842 A1 | 1/2016 | Anderson et al. | |
| 2016/0047901 A1 | 2/2016 | Pacala et al. | |
| 2016/0049765 A1 | 2/2016 | Eldada | |
| 2016/0146939 A1 | 5/2016 | Shpunt et al. | |
| 2016/0146940 A1 | 5/2016 | Koehler | |
| 2016/0161600 A1 | 6/2016 | Eldada et al. | |
| 2016/0245919 A1 | 8/2016 | Kalscheur et al. | |

OTHER PUBLICATIONS

Belghachem et al., "Comparison of laser generation in thermally bonded and unbonded Er3+,Yb3+:glass/Co2+:MgAl2O4 microchip lasers", Optical Materials, vol. 46, 561 (2015) May 28, 2015.

Chang et al., "Compact efficient Q-switched eye-safe laser at 1525 nm with a double-end diffusion-bonded Nd:YVO4 crystal as a self-Raman medium", Optics Express, vol. 17, 4330 (2009) May 3, 2009.

Chen, "Compact efficient all-solid-state eye-safe laser with self-frequency Raman conversion in a Nd:YVO4 crystal", Optics Letters, vol. 29, 2172 (2004) Sep. 15, 2004.

Chen et al., "Compact efficient intracavity optical parametric oscillator with a passively Q-switched Nd:YVO4/Cr4+:YAG laser in a hemispherical cavity", Appl. Phys. B, vol. 77, 493 (2003) Sep. 30, 2003.

Chen et al., "Diode-pumped passively Q-switched Er3+:Yb3+:Sr3Lu2(BO3)4 laser at 1534 nm", Optics Express, vol. 22, 8333 (2014) Apr. 1, 2014.

(56) References Cited

OTHER PUBLICATIONS

Chen et al., "Efficient subnanosecond diode-pumped passively Q-switched Nd:YVO4 self-stimulated Raman laser", Optics Letters, vol. 29, 1251, (2004) Jun. 1, 2004.

Chen et al., "Efficient sub-nanosecond intracavity optical parametric oscillator pumped with a passively Q-switched Gd:YVO4 laser", Appl. Phys. B, vol. 79, 823 (2004) Sep. 1, 2004.

Chen et al., "Monolithic quasi-phase-matched nonlinear crystal for simultaneous laser Q-switching and parametric oscillation in a Nd:YVO4 laser", Optics Letters, vol. 30, 1045 (2005) May 1, 2005.

Chen et al., "Optimization of Fiber-Coupled Laser-Diode End-Pumped Lasers: Influence of Pump-Beam Quality", IEEE Journ. Quant. Electron., vol. 32, 2010 (1996) Nov. 1996.

Degnan et al., "Effects of thermalization on Q-switched laser properties", IEEE Journ. Quant. Electron., vol. 34, 887 (1998) May 1998.

Degnan, "Optimization of passively Q-switched lasers", IEEE Journ. Quant. Electron., vol. 31, 1890 (1995) Nov. 1995.

Druon et al., "High-repetition-rate 300-ps pulsed ultraviolet source with a passively Q-switched microchip laser and a multipass amplifier", Optics Letters, vol. 24, 499 (1999) Apr. 1, 1999.

Godard et al., "Cross-resonant optical parametric oscillators: study of and application to difference-frequency generation", J. Opt. Soc. Am. B, vol. 22, 1966 (2005) Sep. 2005.

Hansson et al., "Transmission measurements in KTP and isomorphic compounds", Applied Optics, vol. 39, 5058 (2000) Sep. 20, 2000.

Hellstrom et al., "Passive Q-switching at 1.54 µm of an Er—Yb:GdCa4O(BO3)3 laser with a Co2+:MgAl2O4 saturable absorber", Appl. Phys. B, vol. 81, 49 (2005) May 26, 2005.

Jaspan et al., "Passively Q-switched microlaser performance in the presence of pump-induced bleaching of the saturable absorber", Applied Optics, vol. 43, 2555, (2004) Apr. 20, 2004.

Karlsson et al., "Diode-pumped Er—Yb:glass laser passively Q-switched by use of Co2+:MgAl2O4 as a saturable absorber", Applied Optics, vol. 39, 6188 (2000) Nov. 20, 2000.

Krupke et al., "Spectroscopic, optical and thermomechanical properties of neodymium- and chromium-doped gadolinium scandium gallium garnet", J. Opt. Soc. Am., vol. 3, 102 (1986) Jan. 1986.

Marchev et al., "Non-critical OPO based on periodically-poled KTP crystal generating 250 ps idler pulses at 1-10 kHz", Paper CTh3B.7, Conference on Lasers and Electro-optics (CLEO) (2012) May 2012.

Marchev et al., "Sub-nanosecond, 1-kHz, low-threshold, non-critical OPO based on periodically-poled KTP crystal pumped at 1064 nm", Proc. SPIE, vol. 8240, 82400D (2012) Jan. 21, 2012.

Missey et al., "Periodically poled lithium niobate monolithic nanosecond optical parametric oscillators and generators", Optics Letters, vol. 24, 1227 (1999) Sep. 1, 1999.

Moncorge et al., "Nd doped crystals for medical laser applications", Optical Materials, vol. 8, 109 (1997) Jul. 1997.

Nejezchleb et al., "Microchip laser based on Yb:YAG/V:AYG monolithic crystal", Proc. SPIE, vol. 9726, 97261H (2016) Jul. 15, 2016.

Ostendorf et al., "10 W high-efficiency high-brightness tapered diode lasers at 976 nm", Proc. SPIE, vol. 6876, 68760H (2008) Feb. 14, 2008.

Patel et al., "New Formalism for the Analysis of Passively Q-Switched Laser Systems", IEEE Journ. Quant. Electron., vol. 37, 707 (2001) May 2001.

Pfistner et al., "Spectroscopic and laser characteristics of new YSGG, GSGG, GSAG mixtures doped with Nd3+", Optical Materials, vol. 1, 101 (1992) Apr. 1992.

Podstavkin et al., "KTP Optical Parametric Amplifier Pumped by High Power Passively Q-Switched Microchip Laser", Paper MB19, Advanced Solid-State Photonics Conference, (2005) Feb. 6, 2005.

Siegman, "Defining the effective radius of curvature for a non-ideal optical beam", IEEE Journ. Quant. Electron., vol. 27, 1146 (1991) May 1991.

Stultz et al., "Short pulse, high-repetition rate, passively Q-switched Er:yttrium-aluminum-garnet laser at 1.6 microns", Appl. Phys. Letts., vol. 87, 241118 (2005) Dec. 9, 2005.

Su et al., "Analysis of a diode-pumped passively Q-switched Nd:GdVO4 self-stimulating Raman laser", Optical Materials, vol. 30, 1895, (2008) Apr. 25, 2008.

Sulc et al., "1444-nm Q-switched pulse generator based on Nd:YAG/V:YAG microchip laser", Laser Physics, vol. 20, 1288 (2010) May 3, 2010.

Rapaport et al., "Temperature dependence of the 1.06-µm stimulated emission cross section of neodymium in YAG and in GSGG", Applied Optics, vol. 41, 7052 (2002) Nov. 20, 2002.

Rustad et al., "Effect of idler absorption in pulsed optical parametric oscillators", Optics Express, vol. 19, 2815 (2011) Jan. 31, 2011.

Welford, "Passively Q-switched lasers: short pulse duration, single-frequency sources", pp. 121-122 in Proceedings of LEOS Annual Meeting, IEEE, San Diego, CA, 2001 Nov. 2001.

Xioa et al., "A generalized model for passively Q-switched lasers including excited state absorption in the saturable absorber", IEEE Journ. Quant. Electron., vol. 33, 41 (1997) Jan. 1997.

Xiao et al., "Z-scan measurement of the ground and excited state absorption cross sections of Cr4+ in yttrium aluminum garnet", IEEE J. Quant. Electron., vol. 35, 1086, (1999) Jul. 1999.

Xu et al., "Diode-pumped passively Q-switched Nd:YAG/SrWO4 intracavity Raman laser with high pulse energy and average output power", Appl. Phys. B, vol. 107, 343 (2012) Apr. 21, 2012.

Zayhowski, "Periodically poled lithium niobate optical parametric amplifiers pumped by high-power passively Q-switched microchip lasers", Optics Letters, vol. 22, 169, (1997) Feb. 1, 1997.

Zayhowski et al., "Pump-induced bleaching of the saturable absorber in short-pulse Nd:YAG/Cr4+:YAG passively Q-switched microchip lasers", IEEE Journ. Quant. Electron., vol. 39, 1588 (2003) Dec. 2003.

Zhou et al., "Progress on high-power, high-brightness VCSELs and applications", Proc. SPIE, vol. 9381, 93810B (2015) Mar. 4, 2015.

Search Report and Written Opinion dated Apr. 4, 2017 in PCT Application No. PCT/US2016/064020.

Office Action dated Jun. 21, 2017 in U.S. Appl. No. 15/461,394, 18 pgs.

Office Action dated Jul. 13, 2017 in U.S. Appl. No. 15/470,718, 17 pgs.

* cited by examiner

Q-SWITCHED LASER FOR LIDAR SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Technical Field

This disclosure generally relates to lidar systems.

Description of the Related Art

Light detection and ranging (lidar) is a technology that can be used to measure distances to remote targets. Typically, a lidar system includes a light source and an optical receiver. The light source can be, for example, a laser which emits light having a particular operating wavelength. The operating wavelength of a lidar system may lie, for example, in the infrared, visible, or ultraviolet portions of the electromagnetic spectrum. The light source emits light toward a target which then scatters the light. Some of the scattered light is received back at the receiver. The system determines the distance to the target based on one or more characteristics associated with the returned light. For example, the system may determine the distance to the target based on the time of flight of a returned light pulse.

SUMMARY

In some embodiments, a lidar system comprises: a Q-switched laser configured to emit pulses of light, wherein the Q-switched laser comprises a gain medium and a Q-switch; a scanner configured to scan the emitted pulses of light across a field of regard; a receiver configured to detect at least a portion of the scanned pulses of light scattered by a target located a distance from the lidar system; and a processor configured to determine the distance from the lidar system to the target based at least in part on a round-trip time of flight for an emitted pulse of light to travel from the lidar system to the target and back to the lidar system.

DETAILED DESCRIPTION

Figure 1:
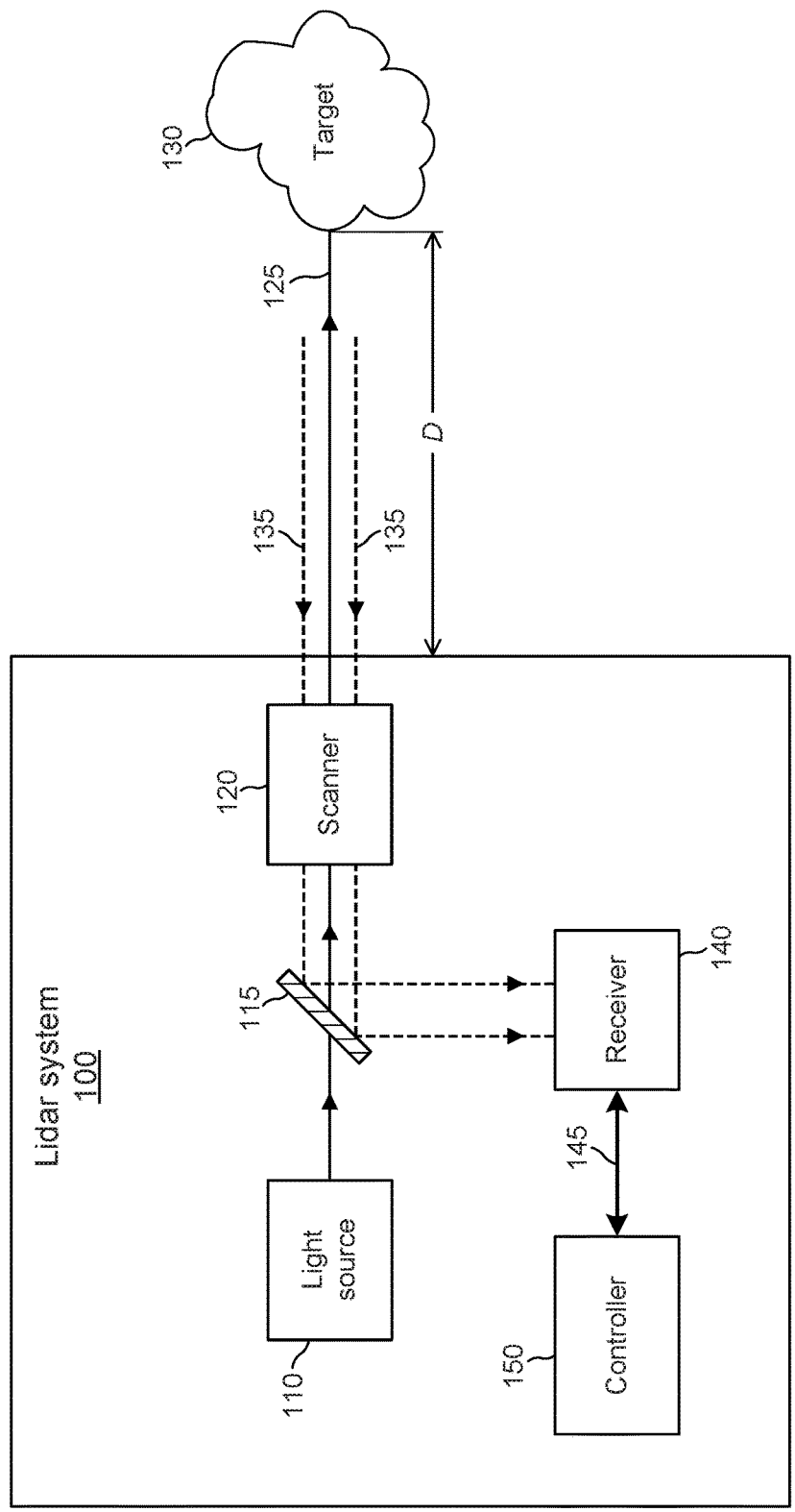
FIG. 1 illustrates an example light detection and ranging (lidar) system.

FIG. 1 illustrates an example light detection and ranging (lidar) system 100. In particular embodiments, a lidar system 100 may be referred to as a laser ranging system, a laser radar system, a LIDAR system, or a laser detection and ranging (LADAR or ladar) system. In particular embodiments, a lidar system 100 may include a light source 110, mirror 115, scanner 120, receiver 140, or controller 150. The light source 110 may be, for example, a laser which emits light having a particular operating wavelength in the infrared, visible, or ultraviolet portions of the electromagnetic spectrum. As an example, light source 110 may include a laser with an operating wavelength between approximately 1.2 µm and 1.7 µm. The light source 110 emits an output beam of light 125 which may be continuous-wave, pulsed, or modulated in any suitable manner for a given application. The output beam of light 125 is directed down range toward a remote target 130. As an example, the remote target 130 may be located a distance D of approximately 1 m to 1 km from the lidar system 100.

Once the output beam 125 reaches the down range target 130, the target may scatter or reflect at least a portion of light from the output beam 125, and some of the scattered or reflected light may return toward the lidar system 100. In the example of FIG. 1, the scattered or reflected light is represented by input beam 135, which passes through scanner 120 and is directed by mirror 115 to receiver 140. In particular embodiments, a relatively small fraction of the light from output beam 125 may return to the lidar system 100 as input beam 135. As an example, the ratio of input beam 135 average power, peak power, or pulse energy to output beam 125 average power, peak power, or pulse energy may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of output beam 125 has a pulse energy of 1 microjoule (µJ), then the pulse energy of a corresponding pulse of input beam 135 may have a pulse energy of approximately 100 nanojoules (nJ), 10 nJ, 1 nJ, 100 picojoules (pJ), 10 pJ, 1 pJ, 100 femtojoules (fJ), 10 fJ, 1 fJ, 100 attojoules (aJ), 10 aJ, or 1 aJ. In particular embodiments, output beam 125 may be referred to as a laser beam, light beam, optical beam, emitted beam, or beam. In particular embodiments, input beam 135 may be referred to as a return beam, received beam, return light, received light, input light, scattered light, or reflected light. As used herein, scattered light may refer to light that is scattered or reflected by a target 130. As an example, an input beam 135 may include: light from the output beam 125 that is scattered by target 130; light from the output beam 125 that is reflected by target 130; or a combination of scattered and reflected light from target 130.

In particular embodiments, receiver 140 may receive or detect photons from input beam 135 and generate one or more representative signals. For example, the receiver 140 may generate an output electrical signal 145 that is representative of the input beam 135. This electrical signal 145 may be sent to controller 150. In particular embodiments, controller 150 may include a processor, computing system (e.g., an ASIC or FPGA), or other suitable circuitry configured to analyze one or more characteristics of the electrical signal 145 from the receiver 140 to determine one or more characteristics of the target 130, such as its distance down range from the lidar system 100. This can be done, for example, by analyzing the time of flight or phase modulation for a beam of light 125 transmitted by the light source 110. If lidar system 100 measures a time of flight of T (e.g., T represents a round-trip time of flight for an emitted pulse of light to travel from the lidar system 100 to the target 130 and back to the lidar system 100), then the distance D from the target 130 to the lidar system 100 may be expressed as $D=c \cdot T/2$, where c is the speed of light (approximately $3.0 \times 10^8$ m/s). As an example, if a time of flight is measured to be T=300 ns, then the distance from the target 130 to the lidar system 100 may be determined to be approximately D=45.0 m. As another example, if a time of flight is measured to be T=1.33 µs, then the distance from the target 130 to the lidar system 100 may be determined to be approximately D=199.5 m. In particular embodiments, a distance D from lidar system 100 to a target 130 may be referred to as a distance, depth, or range of target 130. As used herein, the speed of light c refers to the speed of light in any suitable medium, such as for example in air, water, or vacuum. As an example, the speed of light in vacuum is approximately $2.9979 \times 10^8$ m/s, and the speed of light in air (which has a refractive index of approximately 1.0003) is approximately $2.9970 \times 10^8$ m/s.

In particular embodiments, light source 110 may include a pulsed laser. As an example, light source 110 may be a pulsed laser configured to produce or emit pulses of light with a pulse duration or pulse width of approximately 10 picoseconds (ps) to 20 nanoseconds (ns). As another example, light source 110 may be a pulsed laser that produces pulses with a pulse duration of approximately 200-400 ps. As another example, light source 110 may be a pulsed laser that produces pulses at a pulse repetition frequency of approximately 100 kHz to 5 MHz or a pulse period (e.g., a time between consecutive pulses) of approximately 200 ns to 10 µs. In particular embodiments, light source 110 may have a substantially constant pulse repetition frequency, or light source 110 may have a variable or adjustable pulse repetition frequency. As an example, light source 110 may be a pulsed laser that produces pulses at a substantially constant pulse repetition frequency of approximately 640 kHz (e.g., 640,000 pulses per second), corresponding to a pulse period of approximately 1.56 µs. As another example, light source 110 may have a pulse repetition frequency that can be varied from approximately 700 kHz to 3 MHz. As used herein, a pulse of light may be referred to as an optical pulse, a light pulse, or a pulse.

In particular embodiments, light source 110 may produce a free-space output beam 125 having any suitable average optical power, and the output beam 125 may have optical pulses with any suitable pulse energy or peak optical power. As an example, output beam 125 may have an average power of approximately 1 mW, 10 mW, 100 mW, 1 W, 10 W, or any other suitable average power. As another example, output beam 125 may include pulses with a pulse energy of approximately 0.1 µJ, 1 µJ, 10 µJ, 100 µJ, 1 mJ, or any other suitable pulse energy. As another example, output beam 125 may include pulses with a peak power of approximately 10 W, 100 W, 1 kW, 5 kW, 10 kW, or any other suitable peak power. An optical pulse with a duration of 400 ps and a pulse energy of 1 µJ has a peak power of approximately 2.5 kW. If the pulse repetition frequency is 500 kHz, then the average power of an output beam 125 with 1-µJ pulses is approximately 0.5 W.

In particular embodiments, light source 110 may include a laser diode, such as for example, a Fabry-Perot laser diode, a quantum well laser, a distributed Bragg reflector (DBR) laser, a distributed feedback (DFB) laser, or a vertical-cavity surface-emitting laser (VCSEL). As an example, light source 110 may include an aluminum-gallium-arsenide (AlGaAs) laser diode, an indium-gallium-arsenide (InGaAs) laser diode, or an indium-gallium-arsenide-phosphide (InGaAsP) laser diode. In particular embodiments, light source 110 may include a pulsed laser diode with a peak emission wavelength of approximately 1400-1600 nm. As an example, light source 110 may include a laser diode that is current modulated to produce optical pulses. In particular embodiments, light source 110 may include a pulsed laser diode followed by one or more optical-amplification stages. As an example, light source 110 may be a fiber-laser module that includes a current-modulated laser diode with a peak wavelength of approximately 1550 nm followed by a single-stage or a multi-stage erbium-doped fiber amplifier (EDFA). As another example, light source 110 may include a continuous-wave (CW) or quasi-CW laser diode followed by an external optical modulator (e.g., an electro-optic modulator), and the output of the modulator may be fed into an optical amplifier.

In particular embodiments, an output beam of light 125 emitted by light source 110 may be a collimated optical beam with any suitable beam divergence, such as for example, a divergence of approximately 0.1 to 3.0 milliradian (mrad). A divergence of output beam 125 may refer to an angular measure of an increase in beam size (e.g., a beam radius or beam diameter) as output beam 125 travels away from light source 110 or lidar system 100. In particular embodiments, output beam 125 may have a substantially circular cross section with a beam divergence characterized by a single divergence value. As an example, an output beam 125 with a circular cross section and a divergence of 1 mrad may have a beam diameter or spot size of approximately 10 cm at a distance of 100 m from lidar system 100. In particular embodiments, output beam 125 may be an astigmatic beam or may have a substantially elliptical cross section and may be characterized by two divergence values. As an example, output beam 125 may have a fast axis and a slow axis, where the fast-axis divergence is greater than the slow-axis divergence. As another example, output beam 125 may be an astigmatic beam with a fast-axis divergence of 2 mrad and a slow-axis divergence of 0.5 mrad.

In particular embodiments, an output beam of light 125 emitted by light source 110 may be unpolarized or randomly polarized, may have no specific or fixed polarization (e.g., the polarization may vary with time), or may have a particular polarization (e.g., output beam 125 may be linearly polarized, elliptically polarized, or circularly polarized). As an example, light source 110 may produce linearly polarized light, and lidar system 100 may include a quarter-wave plate that converts this linearly polarized light into circularly polarized light. The circularly polarized light may be transmitted as output beam 125, and lidar system 100 may receive input beam 135, which may be substantially or at least partially circularly polarized in the same manner as the output beam 125 (e.g., if output beam 125 is right-hand circularly polarized, then input beam 135 may also be right-hand circularly polarized). The input beam 135 may pass through the same quarter-wave plate (or a different quarter-wave plate) resulting in the input beam 135 being converted to linearly polarized light which is orthogonally polarized (e.g., polarized at a right angle) with respect to the linearly polarized light produced by light source 110. As another example, lidar system 100 may employ polarization-diversity detection where two polarization components are detected separately. The output beam 125 may be linearly polarized, and the lidar system 100 may split the input beam 135 into two polarization components (e.g., s-polarization and p-polarization) which are detected separately by two photodiodes (e.g., a balanced photoreceiver that includes two photodiodes).

In particular embodiments, lidar system 100 may include one or more optical components configured to condition, shape, filter, modify, steer, or direct the output beam 125 or the input beam 135. As an example, lidar system 100 may include one or more lenses, mirrors, filters (e.g., bandpass or interference filters), beam splitters, polarizers, polarizing beam splitters, wave plates (e.g., half-wave or quarter-wave plates), diffractive elements, or holographic elements. In particular embodiments, lidar system 100 may include a telescope, one or more lenses, or one or more mirrors to expand, focus, or collimate the output beam 125 to a desired beam diameter or divergence. As an example, the lidar system 100 may include one or more lenses to focus the input beam 135 onto an active region of receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto an active region of receiver 140. As illustrated in FIG. 1, the lidar system 100 may include mirror 115 (which may be a metallic or dielectric mirror), and mirror 115 may be configured so that light beam 125 passes through the mirror 115. As an example, mirror 115 (which may be referred to as an overlap mirror, superposition mirror, or beam-combiner mirror) may include a hole, slot, or aperture which output light beam 125 passes through. As another example, mirror 115 may be configured so that at least 80% of output beam 125 passes through mirror 115 and at least 80% of input beam 135 is reflected by mirror 115. In particular embodiments, mirror 115 may provide for output beam 125 and input beam 135 to be substantially coaxial so that the two beams travel along substantially the same optical path (albeit in opposite directions).

In particular embodiments, lidar system 100 may include a scanner 120 to steer the output beam 125 in one or more directions down range. As an example, scanner 120 may include one or more scanning mirrors that are configured to rotate, tilt, pivot, or move in an angular manner about one or more axes. In particular embodiments, a flat scanning mirror may be attached to a scanner actuator or mechanism which scans the mirror over a particular angular range. As an example, scanner 120 may include a galvanometer scanner, a resonant scanner, a piezoelectric actuator, a polygonal scanner, a rotating-prism scanner, a voice coil motor, a DC motor, a stepper motor, or a microelectromechanical systems (MEMS) device, or any other suitable actuator or mechanism. In particular embodiments, scanner 120 may be configured to scan the output beam 125 over a 5-degree angular range, 20-degree angular range, 30-degree angular range, 60-degree angular range, or any other suitable angular range. As an example, a scanning mirror may be configured to periodically rotate over a 15-degree range, which results in the output beam 125 scanning across a 30-degree range (e.g., a 0-degree rotation by a scanning mirror results in a 20-degree angular scan of output beam 125). In particular embodiments, a field of regard (FOR) of a lidar system 100 may refer to an area or angular range over which the lidar system 100 may be configured to scan or capture distance information. As an example, a lidar system 100 with an output beam 125 with a 30-degree scanning range may be referred to as having a 30-degree angular field of regard. As another example, a lidar system 100 with a scanning mirror that rotates over a 30-degree range may produce an output beam 125 that scans across a 60-degree range (e.g., a 60-degree FOR). In particular embodiments, lidar system 100 may have a FOR of approximately 10°, 20°, 40°, 60°, 120°, or any other suitable FOR.

In particular embodiments, scanner 120 may be configured to scan the output beam 125 horizontally and vertically, and lidar system 100 may have a particular FOR along the horizontal direction and another particular FOR along the vertical direction. As an example, lidar system 100 may have a horizontal FOR of 10° to 120° and a vertical FOR of 2° to 45°. In particular embodiments, scanner 120 may include a first mirror and a second mirror, where the first mirror directs the output beam 125 toward the second mirror, and the second mirror directs the output beam 125 down range. As an example, the first mirror may scan the output beam 125 along a first direction, and the second mirror may scan the output beam 125 along a second direction that is substantially orthogonal to the first direction. As another example, the first mirror may scan the output beam 125 along a substantially horizontal direction, and the second mirror may scan the output beam 125 along a substantially vertical direction (or vice versa). In particular embodiments, scanner 120 may be referred to as a beam scanner, optical scanner, or laser scanner.

In particular embodiments, one or more scanning mirrors may be communicatively coupled to controller 150 which may control the scanning mirror(s) so as to guide the output beam 125 in a desired direction down range or along a desired scan pattern. In particular embodiments, a scan pattern (which may be referred to as an optical scan pattern, optical scan path, or scan path) may refer to a pattern or path along which the output beam 125 is directed. As an example, scanner 120 may include two scanning mirrors configured to scan the output beam 125 across a 60° horizontal FOR and a 20° vertical FOR. The two scanner mirrors may be controlled to follow a scan path that substantially covers the 60°×20° FOR. As an example, the scan path may result in a point cloud with pixels that substantially cover the 60°×20° FOR. The pixels may be approximately evenly distributed across the 60°×20° FOR. Alternately, the pixels may have a particular nonuniform distribution (e.g., the pixels may be distributed across all or a portion of the 60°×20° FOR, and the pixels may have a higher density in one or more particular regions of the 60°×20° FOR).

In particular embodiments, a light source 110 may emit pulses of light which are scanned by scanner 120 across a FOR of lidar system 100. One or more of the emitted pulses of light may be scattered by a target 130 located down range from the lidar system 100, and a receiver 140 may detect at least a portion of the pulses of light scattered by the target 130. In particular embodiments, receiver 140 may be referred to as a photoreceiver, optical receiver, optical sensor, detector, photodetector, or optical detector. In particular embodiments, lidar system 100 may include a receiver 140 that receives or detects at least a portion of input beam 135 and produces an electrical signal that corresponds to input beam 135. As an example, if input beam 135 includes an optical pulse, then receiver 140 may produce an electrical current or voltage pulse that corresponds to the optical pulse detected by receiver 140. As another example, receiver 140 may include one or more avalanche photodiodes (APDs) or one or more single-photon avalanche diodes (SPADs). As another example, receiver 140 may include one or more PN photodiodes (e.g., a photodiode structure formed by a p-type semiconductor and a n-type semiconductor) or one or more PIN photodiodes (e.g., a photodiode structure formed by an undoped intrinsic semiconductor region located between p-type and n-type regions). Receiver 140 may have an active region or an avalanche-multiplication region that includes silicon, germanium, or InGaAs. The active region of receiver 140 may have any suitable size, such as for example, a diameter or width of approximately 50-500 µm. In particular embodiments, receiver 140 may include circuitry that performs signal amplification, sampling, filtering, signal conditioning, analog-to-digital conversion, time-to-digital conversion, pulse detection, threshold detection, rising-edge detection, or falling-edge detection. As an example, receiver 140 may include a transimpedance amplifier that converts a received photocurrent (e.g., a current produced by an APD in response to a received optical signal) into a voltage signal. The voltage signal may be sent to pulse-detection circuitry that produces an analog or digital output signal 145 that corresponds to one or more characteristics (e.g., rising edge, falling edge, amplitude, or duration) of a received optical pulse. As an example, the pulse-detection circuitry may perform a time-to-digital conversion to produce a digital output signal 145. The electrical output signal 145 may be sent to controller 150 for processing or analysis (e.g., to determine a time-of-flight value corresponding to a received optical pulse).

In particular embodiments, controller 150 may be electrically coupled or communicatively coupled to light source 110, scanner 120, or receiver 140. As an example, controller 150 may receive electrical trigger pulses or edges from light source 110, where each pulse or edge corresponds to the emission of an optical pulse by light source 110. As another example, controller 150 may provide instructions, a control signal, or a trigger signal to light source 110 indicating when light source 110 should produce optical pulses. Controller 150 may send an electrical trigger signal that includes electrical pulses, where each electrical pulse results in the emission of an optical pulse by light source 110. In particular embodiments, the frequency, period, duration, pulse energy, peak power, average power, or wavelength of the optical pulses produced by light source 110 may be adjusted based on instructions, a control signal, or trigger pulses provided by controller 150. In particular embodiments, controller 150 may be coupled to light source 110 and receiver 140, and controller 150 may determine a time-of-flight value for an optical pulse based on timing information associated with when the pulse was emitted by light source 110 and when a portion of the pulse (e.g., input beam 135) was detected or received by receiver 140. In particular embodiments, controller 150 may include circuitry that performs signal amplification, sampling, filtering, signal conditioning, analog-to-digital conversion, time-to-digital conversion, pulse detection, threshold detection, rising-edge detection, or falling-edge detection.

In particular embodiments, a lidar system 100 may be used to determine the distance to one or more down range targets 130. By scanning the lidar system 100 across a field of regard, the system can be used to map the distance to a number of points within the field of regard. Each of these depth-mapped points may be referred to as a pixel. A collection of pixels captured in succession (which may be referred to as a depth map, a point cloud, or a frame) may be rendered as an image or may be analyzed to identify or detect objects or to determine a shape or distance of objects within the FOR. As an example, a depth map may cover a field of regard that extends 60° horizontally and 15° vertically, and the depth map may include a frame of 100-2000 pixels in the horizontal direction by 4-400 pixels in the vertical direction.

In particular embodiments, lidar system 100 may be configured to repeatedly capture or generate point clouds of a field of regard at any suitable frame rate between approximately 0.1 frames per second (FPS) and approximately 1,000 FPS. As an example, lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. As another example, lidar system 100 may be configured to produce optical pulses at a rate of $5 \times 10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). In particular embodiments, a point-cloud frame rate may be substantially fixed, or a point-cloud frame rate may be dynamically adjustable. As an example, a lidar system 100 may capture one or more point clouds at a particular frame rate (e.g., 1 Hz) and then switch to capture one or more point clouds at a different frame rate (e.g., 10 Hz). A slower frame rate (e.g., 1 Hz) may be used to capture one or more high-resolution point clouds, and a faster frame rate (e.g., 10 Hz) may be used to rapidly capture multiple lower-resolution point clouds.

In particular embodiments, a lidar system 100 may be configured to sense, identify, or determine distances to one or more targets 130 within a field of regard. As an example, a lidar system 100 may determine a distance to a target 130, where all or part of the target 130 is contained within a field of regard of the lidar system 100. All or part of a target 130 being contained within a FOR of the lidar system 100 may refer to the FOR overlapping, encompassing, or enclosing at least a portion of the target 130. In particular embodiments, target 130 may include all or part of an object that is moving or stationary relative to lidar system 100. As an example, target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

In particular embodiments, one or more lidar systems 100 may be integrated into a vehicle. As an example, multiple lidar systems 100 may be integrated into a car to provide a complete 360-degree horizontal FOR around the car. As another example, 6-10 lidar systems 100, each system having a 45-degree to 90-degree horizontal FOR, may be combined together to form a sensing system that provides a point cloud covering a 360-degree horizontal FOR. The lidar systems 100 may be oriented so that adjacent FORs have an amount of spatial or angular overlap to allow data from the multiple lidar systems 100 to be combined or stitched together to form a single or continuous 360-degree point cloud. As an example, the FOR of each lidar system 100 may have approximately 1-15 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), or spacecraft. In particular embodiments, a vehicle may include an internal combustion engine or an electric motor that provides propulsion for the vehicle.

In particular embodiments, one or more lidar systems 100 may be included in a vehicle as part of an advanced driver assistance system (ADAS) to assist a driver of the vehicle in the driving process. For example, a lidar system 100 may be part of an ADAS that provides information or feedback to a driver (e.g., to alert the driver to potential problems or hazards) or that automatically takes control of part of a vehicle (e.g., a braking system or a steering system) to avoid collisions or accidents. A lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In particular embodiments, one or more lidar systems 100 may be integrated into a vehicle as part of an autonomous-vehicle driving system. As an example, a lidar system 100 may provide information about the surrounding environment to a driving system of an autonomous vehicle. An autonomous-vehicle driving system may include one or more computing systems that receive information from a lidar system 100 about the surrounding environment, analyze the received information, and provide control signals to the vehicle's driving systems (e.g., steering wheel, accelerator, brake, or turn signal). As an example, a lidar system 100 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 130 and their respective locations, distances, or speeds, and the autonomous-vehicle driving system may update control signals based on this information. As an example, if lidar system 100 detects a vehicle ahead that is slowing down or stopping, the autonomous-vehicle driving system may send instructions to release the accelerator and apply the brakes.

In particular embodiments, an autonomous vehicle may be referred to as an autonomous car, driverless car, self-driving car, robotic car, or unmanned vehicle. In particular embodiments, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In particular embodiments, an autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

Figure 2:
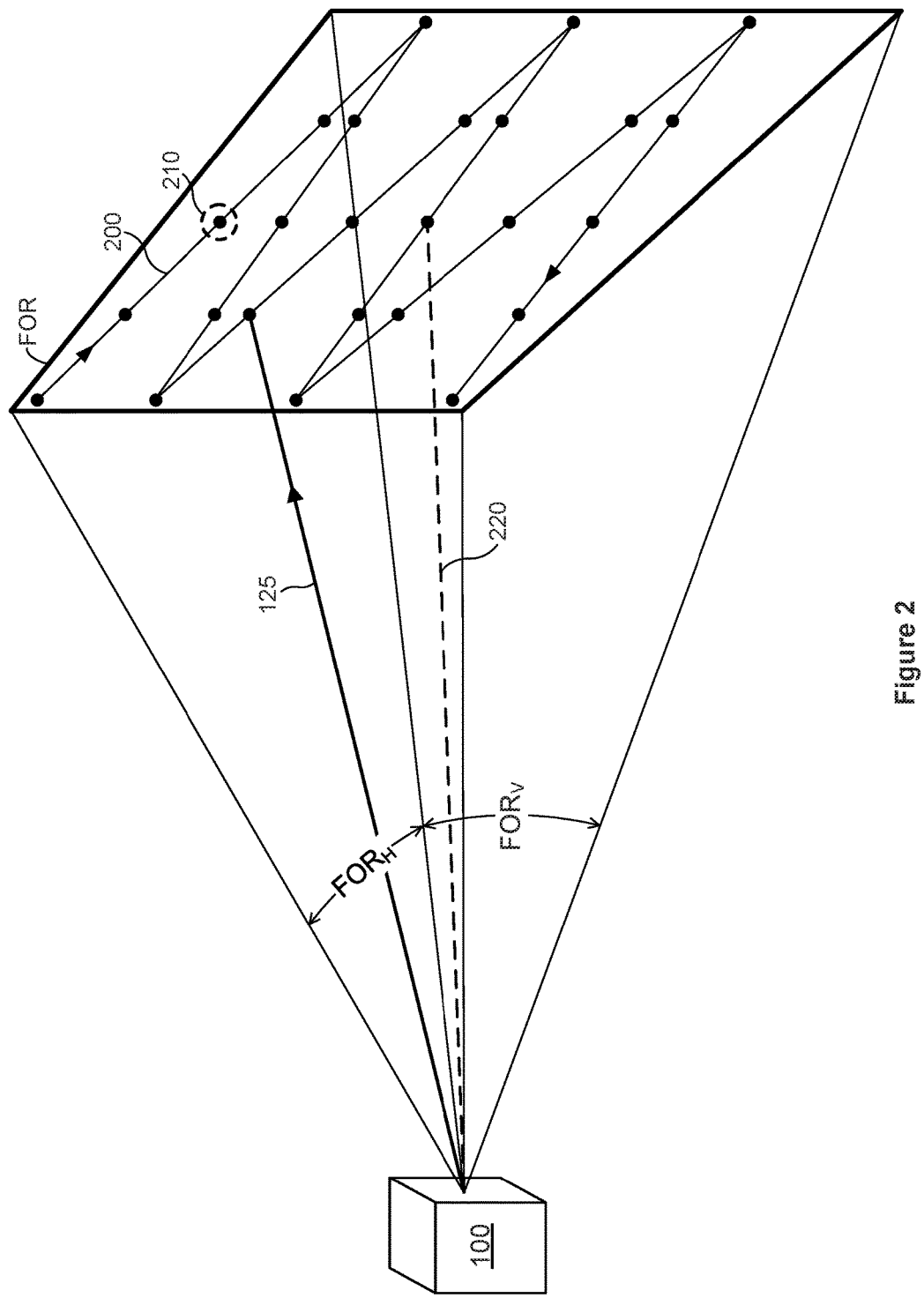
FIG. 2 illustrates an example scan pattern produced by a lidar system.

FIG. 2 illustrates an example scan pattern 200 produced by a lidar system 100. In particular embodiments, a lidar system 100 may be configured to scan output optical beam 125 along one or more particular scan patterns 200. In particular embodiments, a scan pattern 200 may scan across any suitable field of regard (FOR) having any suitable horizontal FOR ($FOR_H$) and any suitable vertical FOR ($FOR_V$). For example, a scan pattern 200 may have a field of regard represented by angular dimensions (e.g., $FOR_H \times FOR_V$) 40°×30°, 90°×40°, or 60°×15°. As another example, a scan pattern 200 may have a $FOR_H$ greater than or equal to 10°, 25°, 30°, 40°, 60°, 90°, or 120°. As another example, a scan pattern 200 may have a $FOR_V$ greater than or equal to 2°, 5°, 10°, 15°, 20°, 30°, or 45°. In the example of FIG. 2, reference line 220 represents a center of the field of regard of scan pattern 200. In particular embodiments, reference line 220 may have any suitable orientation, such as for example, a horizontal angle of 0° (e.g., reference line 220 may be oriented straight ahead) and a vertical angle of 0° (e.g., reference line 220 may have an inclination of 0°), or reference line 220 may have a nonzero horizontal angle or a nonzero inclination (e.g., a vertical angle of +10° or −10°). In FIG. 2, if the scan pattern 200 has a 60°×15° field of regard, then scan pattern 200 covers a ±30° horizontal range with respect to reference line 220 and a ±7.5° vertical range with respect to reference line 220. Additionally, optical beam 125 in FIG. 2 has an orientation of approximately −15° horizontal and +3° vertical with respect to reference line 220. Optical beam 125 may be referred to as having an azimuth of −15° and an altitude of +3° relative to reference line 220. In particular embodiments, an azimuth (which may be referred to as an azimuth angle) may represent a horizontal angle with respect to reference line 220, and an altitude (which may be referred to as an altitude angle, elevation, or elevation angle) may represent a vertical angle with respect to reference line 220.

In particular embodiments, a scan pattern 200 may include multiple pixels 210, and each pixel 210 may be associated with one or more laser pulses and one or more corresponding distance measurements. In particular embodiments, a cycle of scan pattern 200 may include a total of $P_x \times P_y$ pixels 210 (e.g., a two-dimensional distribution of $P_x$ by $P_y$ pixels). As an example, scan pattern 200 may include a distribution with dimensions of approximately 100-2,000 pixels 210 along a horizontal direction and approximately 4-400 pixels 210 along a vertical direction. As another example, scan pattern 200 may include a distribution of 1,000 pixels 210 along the horizontal direction by 64 pixels 210 along the vertical direction (e.g., the frame size is 1000×64 pixels) for a total of 64,000 pixels per cycle of scan pattern 200. In particular embodiments, the number of pixels 210 along a horizontal direction may be referred to as a horizontal resolution of scan pattern 200, and the number of pixels 210 along a vertical direction may be referred to as a vertical resolution. As an example, scan pattern 200 may have a horizontal resolution of greater than or equal to 100 pixels 210 and a vertical resolution of greater than or equal to 4 pixels 210. As another example, scan pattern 200 may have a horizontal resolution of 100-2,000 pixels 210 and a vertical resolution of 4-400 pixels 210.

In particular embodiments, each pixel 210 may be associated with a distance (e.g., a distance to a portion of a target 130 from which an associated laser pulse was scattered) or one or more angular values. As an example, a pixel 210 may be associated with a distance value and two angular values (e.g., an azimuth and altitude) that represent the angular location of the pixel 210 with respect to the lidar system 100. A distance to a portion of target 130 may be determined based at least in part on a time-of-flight measurement for a corresponding pulse. An angular value (e.g., an azimuth or altitude) may correspond to an angle (e.g., relative to reference line 220) of output beam 125 (e.g., when a corresponding pulse is emitted from lidar system 100) or an angle of input beam 135 (e.g., when an input signal is received by lidar system 100). In particular embodiments, an angular value may be determined based at least in part on a position of a component of scanner 120. As an example, an azimuth or altitude value associated with a pixel 210 may be determined from an angular position of one or more corresponding scanning mirrors of scanner 120.

Figure 3:
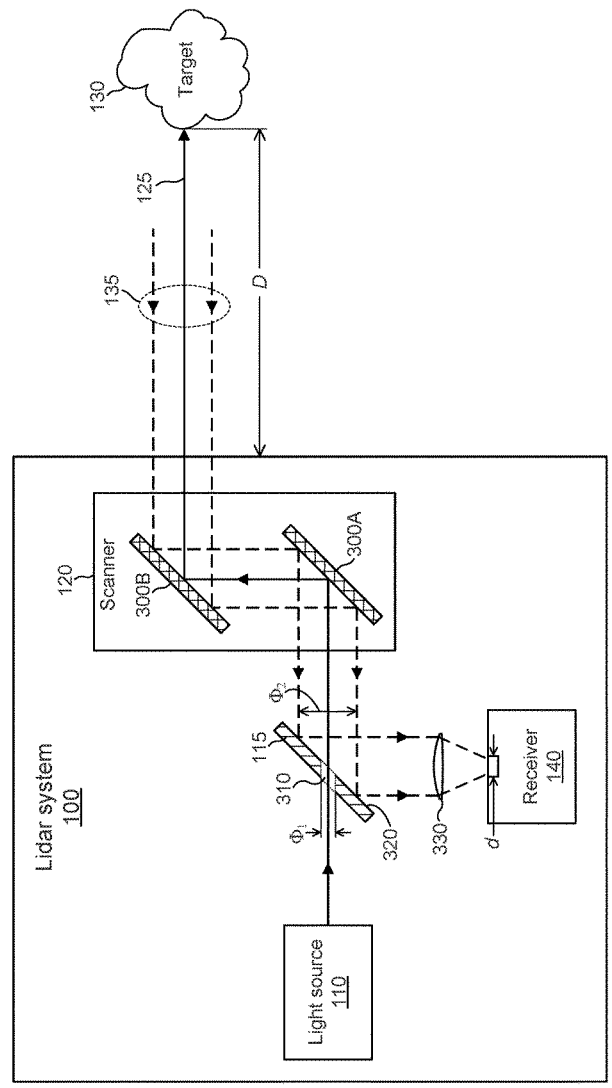
FIG. 3 illustrates an example lidar system with an example overlap mirror.

FIG. 3 illustrates an example lidar system 100 with an example overlap mirror 115. In particular embodiments, a lidar system 100 may include a light source 110 configured to emit pulses of light and a scanner 120 configured to scan at least a portion of the emitted pulses of light across a field of regard. As an example, the light source 110 may include a pulsed solid-state laser, and the optical pulses produced by the solid-state laser may be directed through aperture 310 of overlap mirror 115 and then coupled to scanner 120. In particular embodiments, a lidar system 100 may include a receiver 140 configured to detect at least a portion of the scanned pulses of light scattered by a target 130 located a distance D from the lidar system 100. As an example, one or more pulses of light that are directed down range from lidar system 100 by scanner 120 (e.g., as part of output beam 125) may scatter off a target 130, and a portion of the scattered light may propagate back to the lidar system 100 (e.g., as part of input beam 135) and be detected by receiver 140.

In particular embodiments, lidar system 100 may include one or more processors (e.g., controller 150) configured to determine a distance D from the lidar system 100 to a target 130 based at least in part on a round-trip time of flight for an emitted pulse of light to travel from the lidar system 100 to the target 130 and back to the lidar system 100. The target 130 may be at least partially contained within a field of regard of the lidar system 100 and located a distance D from the lidar system 100 that is less than or equal to a maximum range $R_{MAX}$ of the lidar system 100. In particular embodiments, a maximum range (which may be referred to as a maximum distance) of a lidar system 100 may refer to the maximum distance over which the lidar system 100 is configured to sense or identify targets 130 that appear in a field of regard of the lidar system 100. The maximum range of lidar system 100 may be any suitable distance, such as for example, 25 m, 50 m, 100 m, 200 m, 500 m, or 1 km. As an example, a lidar system 100 with a 200-m maximum range may be configured to sense or identify various targets 130 located up to 200 m away from the lidar system 100. For a lidar system 100 with a 200-m maximum range ($R_{MAX} \cong 200$ m), the time of flight corresponding to the maximum range is approximately $2 \cdot R_{MAX}/c \cong 1.33$ μs.

In particular embodiments, light source 110, scanner 120, and receiver 140 may be packaged together within a single housing, where a housing may refer to a box, case, or enclosure that holds or contains all or part of a lidar system 100. As an example, a lidar-system enclosure may contain a light source 110, overlap mirror 115, scanner 120, and receiver 140 of a lidar system 100. Additionally, the lidar-system enclosure may include a controller 150, or a controller 150 may be located remotely from the enclosure. The lidar-system enclosure may also include one or more electrical connections for conveying electrical power or electrical signals to or from the enclosure.

In particular embodiments, light source 110 may include an eye-safe laser. An eye-safe laser may refer to a laser or a light source with an emission wavelength, average power, peak power, peak intensity, pulse energy, beam size, beam divergence, or exposure time such that emitted light from the laser presents little or no possibility of causing damage to a person's eyes. As an example, light source 110 may be classified as a Class 1 laser product (as specified by the 60825-1 standard of the International Electrotechnical Commission (IEC)) or a Class I laser product (as specified by Title 21, Section 1040.10 of the United States Code of Federal Regulations (CFR)) that is safe under all conditions of normal use. In particular embodiments, light source 110 may include an eye-safe laser (e.g., a Class 1 or a Class I laser) configured to operate at any suitable wavelength between approximately 1400 nm and approximately 1700 nm. As an example, light source 110 may include an eye-safe laser with an operating wavelength between approximately 1400 nm and approximately 1600 nm. As another example, light source 110 may include an eye-safe laser with an operating wavelength between approximately 1530 nm and approximately 1560 nm. As another example, light source 110 may include a solid-state laser, where the solid-state laser is an eye-safe laser with an operating wavelength between approximately 1400 nm and approximately 1600 nm.

In particular embodiments, scanner 120 may include one or more mirrors, where each mirror is mechanically driven by a galvanometer scanner, a resonant scanner, a MEMS device, a voice coil motor, or any suitable combination thereof. A galvanometer scanner (which may be referred to as a galvanometer actuator) may include a galvanometer-based scanning motor with a magnet and coil. When an electrical current is supplied to the coil, a rotational force is applied to the magnet, which causes a mirror attached to the galvanometer scanner to rotate. The electrical current supplied to the coil may be controlled to dynamically change the position of the galvanometer mirror. A resonant scanner (which may be referred to as a resonant actuator) may include a spring-like mechanism driven by an actuator to produce a periodic oscillation at a substantially fixed frequency (e.g., 1 kHz). A MEMS-based scanning device may include a mirror with a diameter between approximately 1 and 10 mm, where the mirror is rotated using electromagnetic or electrostatic actuation. A voice coil motor (which may be referred to as a voice coil actuator) may include a magnet and coil. When an electrical current is supplied to the coil, a translational force is applied to the magnet, which causes a mirror attached to the magnet to move or rotate.

In particular embodiments, a scanner 120 may include any suitable number of mirrors driven by any suitable number of mechanical actuators. As an example, a scanner 120 may include a single mirror configured to scan an output beam 125 along a single direction (e.g., a scanner 120 may be a one-dimensional scanner that scans along a horizontal or vertical direction). The mirror may be driven by one actuator (e.g., a galvanometer) or two actuators configured to drive the mirror in a push-pull configuration. As another example, a scanner 120 may include a single mirror that scans an output beam 125 along two directions (e.g., horizontal and vertical). The mirror may be driven by two actuators, where each actuator provides rotational motion along a particular direction or about a particular axis. As another example, a scanner 120 may include two mirrors, where one mirror scans an output beam 125 along a horizontal direction and the other mirror scans the output beam 125 along a vertical direction. In the example of FIG. 3, scanner 120 includes two mirrors, mirror 300A and mirror 300B. Mirror 300A may scan output beam 125 along a substantially horizontal direction, and mirror 300B may scan the output beam 125 along a substantially vertical direction.

In particular embodiments, a scanner 120 may include two mirrors, where each mirror is driven by a corresponding galvanometer scanner. As an example, scanner 120 may include a galvanometer actuator that scans mirror 300A along a first direction (e.g., horizontal), and scanner 120 may include another galvanometer actuator that scans mirror 300B along a second direction (e.g., vertical). In particular embodiments, a scanner 120 may include two mirrors, where one mirror is driven by a resonant actuator and the other mirror is driven by a galvanometer actuator. As an example, a resonant actuator may scan mirror 300A along a first direction, and a galvanometer actuator may scan mirror 300B along a second direction. The first and second directions may be substantially orthogonal to one another. As an example, the first direction may be substantially horizontal, and the second direction may be substantially vertical, or vice versa. In particular embodiments, a scanner 120 may include one mirror driven by two actuators which are configured to scan the mirror along two substantially orthogonal directions. As an example, one mirror may be driven along a substantially horizontal direction by a resonant actuator or a galvanometer actuator, and the mirror may also be driven along a substantially vertical direction by a galvanometer actuator. As another example, a mirror may be driven along two substantially orthogonal directions by two resonant actuators.

In particular embodiments, a scanner 120 may include a mirror configured to be scanned along one direction by two actuators arranged in a push-pull configuration. Driving a mirror in a push-pull configuration may refer to a mirror that is driven in one direction by two actuators. The two actuators may be located at opposite ends or sides of the mirror, and the actuators may be driven in a cooperative manner so that when one actuator pushes on the mirror, the other actuator pulls on the mirror, and vice versa. As an example, a mirror may be driven along a horizontal or vertical direction by two voice coil actuators arranged in a push-pull configuration. In particular embodiments, a scanner 120 may include one mirror configured to be scanned along two axes, where motion along each axis is provided by two actuators arranged in a push-pull configuration. As an example, a mirror may be driven along a horizontal direction by two resonant actuators arranged in a horizontal push-pull configuration, and the mirror may be driven along a vertical direction by another two resonant actuators arranged in a vertical push-pull configuration.

In particular embodiments, a scanner 120 may include two mirrors which are driven synchronously so that the output beam 125 is directed along any suitable scan pattern 200. As an example, a galvanometer actuator may drive mirror 300A with a substantially linear back-and-forth motion (e.g., the galvanometer may be driven with a substantially triangle-shaped waveform) that causes output beam 125 to trace a substantially horizontal back-and-forth pattern. Additionally, another galvanometer actuator may scan mirror 300B relatively slowly along a substantially vertical direction. For example, the two galvanometers may be synchronized so that for every 64 horizontal traces, the output beam 125 makes a single trace along a vertical direction. As another example, a resonant actuator may drive mirror 300A along a substantially horizontal direction, and a galvanometer actuator may scan mirror 300B relatively slowly along a substantially vertical direction.

In particular embodiments, a scanner 120 may include one mirror driven by two or more actuators, where the actuators are driven synchronously so that the output beam 125 is directed along a particular scan pattern 200. As an example, one mirror may be driven synchronously along two substantially orthogonal directions so that the output beam 125 follows a scan pattern 200 that includes substantially straight lines. In particular embodiments, a scanner 120 may include two mirrors driven synchronously so that the synchronously driven mirrors trace out a scan pattern 200 that includes substantially straight lines. As an example, the scan pattern 200 may include a series of substantially straight lines directed substantially horizontally, vertically, or along any other suitable direction. The straight lines may be achieved by applying a dynamically adjusted deflection along a vertical direction (e.g., with a galvanometer actuator) as an output beam 125 is scanned along a substantially horizontal direction (e.g., with a galvanometer or resonant actuator). If a vertical deflection is not applied, the output beam 125 may trace out a curved path as it scans from side to side. By applying a vertical deflection as the mirror is scanned horizontally, a scan pattern 200 that includes substantially straight lines may be achieved. In particular embodiments, a vertical actuator may be used to apply both a dynamically adjusted vertical deflection as the output beam 125 is scanned horizontally as well as a discrete vertical offset between each horizontal scan (e.g., to step the output beam 125 to a subsequent row of a scan pattern 200).

In the example of FIG. 3, lidar system 100 produces an output beam 125 and receives light from an input beam 135. The output beam 125, which includes at least a portion of the pulses of light emitted by light source 110, may be scanned across a field of regard. The input beam 135 may include at least a portion of the scanned pulses of light which are scattered by one or more targets 130 and detected by receiver 140. In particular embodiments, output beam 125 and input beam 135 may be substantially coaxial. The input and output beams being substantially coaxial may refer to the beams being at least partially overlapped or sharing a common propagation axis so that input beam 135 and output beam 125 travel along substantially the same optical path (albeit in opposite directions). As output beam 125 is scanned across a field of regard, the input beam 135 may follow along with the output beam 125 so that the coaxial relationship between the two beams is maintained.

In particular embodiments, a lidar system 100 may include an overlap mirror 115 configured to overlap the input beam 135 and output beam 125 so that they are substantially coaxial. In FIG. 3, the overlap mirror 115 includes a hole, slot, or aperture 310 which the output beam 125 passes through and a reflecting surface 320 that reflects at least a portion of the input beam 135 toward the receiver 140. The overlap mirror 115 may be oriented so that input beam 135 and output beam 125 are at least partially overlapped. In particular embodiments, input beam 135 may pass through a lens 330 which focuses the beam onto an active region of the receiver 140. The active region may refer to an area over which receiver 140 may receive or detect input light. The active region may have any suitable size or diameter d, such as for example, a diameter of approximately 25 µm, 50 µm, 80 µm, 100 µm, 200 µm, 500 µm, 1 mm, 2 mm, or 5 mm. In particular embodiments, overlap mirror 115 may have a reflecting surface 320 that is substantially flat or the reflecting surface 320 may be curved (e.g., mirror 115 may be an off-axis parabolic mirror configured to focus the input beam 135 onto an active region of the receiver 140).

In particular embodiments, aperture 310 may have any suitable size or diameter $\Phi_1$, and input beam 135 may have any suitable size or diameter $\Phi_2$, where $\Phi_2$ is greater than $\Phi_1$. As an example, aperture 310 may have a diameter $\Phi_1$ of approximately 0.2 mm, 0.5 mm, 1 mm, 2 mm, 3 mm, 5 mm, or 10 mm, and input beam 135 may have a diameter $\Phi_2$ of approximately 2 mm, 5 mm, 10 mm, 15 mm, 20 mm, 30 mm, 40 mm, or 50 mm. In particular embodiments, reflective surface 320 of overlap mirror 115 may reflect greater than or equal to 70% of input beam 135 toward the receiver 140. As an example, if reflective surface 320 has a reflectivity R at an operating wavelength of the light source 110, then the fraction of input beam 135 directed toward the receiver 140 may be expressed as $R \times [1-(\Phi_1/\Phi_2)^2]$. For example, if R is 95%, $\Phi_1$ is 2 mm, and $\Phi_2$ is 10 mm, then approximately 91% of input beam 135 may be directed toward the receiver 140 by reflective surface 320.

Figure 4:
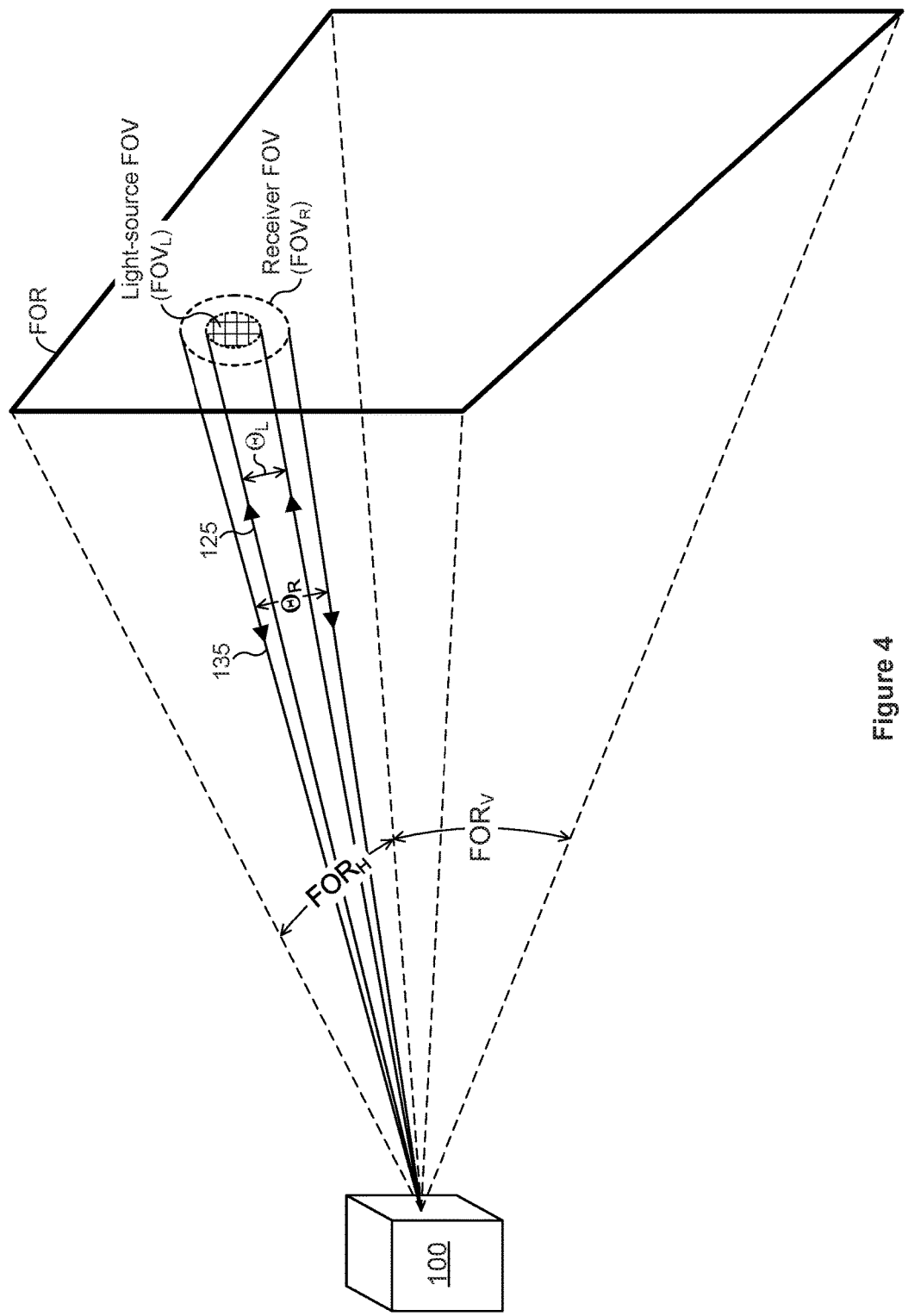
FIG. 4 illustrates an example light-source field of view and receiver field of view for a lidar system.

FIG. 4 illustrates an example light-source field of view ($FOV_L$) and receiver field of view ($FOV_R$) for a lidar system 100. The light source 110 may emit pulses of light as the $FOV_L$ and $FOV_R$ are scanned across a field of regard (FOR) of the lidar system 100. In particular embodiments, a light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected. As an example, as the light-source field of view is scanned across a field of regard, a portion of a pulse of light emitted by the light source 110 may be sent down range from lidar system 100, and the pulse of light may be sent in the direction that the $FOV_L$ is pointing at the time the pulse is emitted. The pulse of light may scatter off a target 130, and the receiver 140 may receive and detect a portion of the scattered light that is directed along or contained within the $FOV_R$.

In particular embodiments, scanner 120 may be configured to scan both a light-source field of view and a receiver field of view across a field of regard of the lidar system 100. Multiple pulses of light may be emitted and detected as the scanner 120 scans the $FOV_L$ and $FOV_R$ across the field of regard of the lidar system 100 while tracing out a scan pattern 200. In particular embodiments, the light-source field of view and the receiver field of view may be scanned synchronously with respect to one another, so that as the $FOV_L$ is scanned across a scan pattern 200, the $FOV_R$ follows substantially the same path at the same scanning speed. Additionally, the $FOV_L$ and $FOV_R$ may maintain the same relative position to one another as they are scanned across the field of regard. As an example, the $FOV_L$ may be substantially overlapped with or centered inside the $FOV_R$ (as illustrated in FIG. 4), and this relative positioning between $FOV_L$ and $FOV_R$ may be maintained throughout a scan. As another example, the $FOV_R$ may lag behind the $FOV_L$ by a particular, fixed amount throughout a scan (e.g., the $FOV_R$ may be offset from the $FOV_L$ in a direction opposite the scan direction).

In particular embodiments, the $FOV_L$ may have an angular size or extent $\Theta_L$ that is substantially the same as or that corresponds to the divergence of the output beam 125, and the $FOV_R$ may have an angular size or extent $\Theta_R$ that corresponds to an angle over which the receiver 140 may receive and detect light. In particular embodiments, the receiver field of view may be any suitable size relative to the light-source field of view. As an example, the receiver field of view may be smaller than, substantially the same size as, or larger than the angular extent of the light-source field of view. In particular embodiments, the light-source field of view may have an angular extent of less than or equal to 50 milliradians, and the receiver field of view may have an angular extent of less than or equal to 50 milliradians. The $FOV_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent $\Theta_R$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. In particular embodiments, the light-source field of view and the receiver field of view may have approximately equal angular extents. As an example, $\Theta_L$ and $\Theta_R$ may both be approximately equal to 1 mrad, 2 mrad, or 3 mrad. In particular embodiments, the receiver field of view may be larger than the light-source field of view, or the light-source field of view may be larger than the receiver field of view. As an example, $\Theta_L$ may be approximately equal to 1.5 mrad, and $\Theta_R$ may be approximately equal to 3 mrad.

In particular embodiments, a pixel 210 may represent or may correspond to a light-source field of view. As the output beam 125 propagates from the light source 110, the diameter of the output beam 125 (as well as the size of the corresponding pixel 210) may increase according to the beam divergence $\Theta_L$. As an example, if the output beam 125 has a $\Theta_L$ of 2 mrad, then at a distance of 100 m from the lidar system 100, the output beam 125 may have a size or diameter of approximately 20 cm, and a corresponding pixel 210 may also have a corresponding size or diameter of approximately 20 cm. At a distance of 200 m from the lidar system 100, the output beam 125 and the corresponding pixel 210 may each have a diameter of approximately 40 cm.

Figure 5:
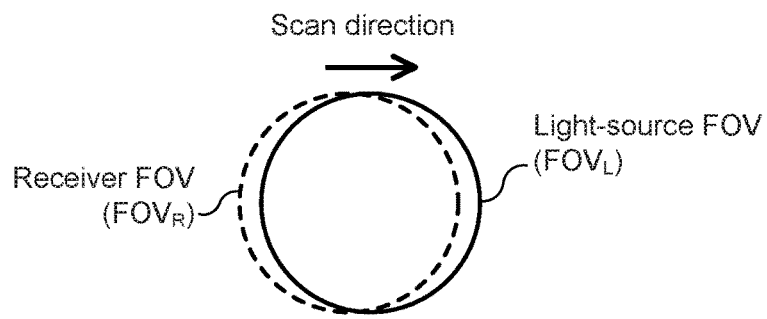
FIG. 5 illustrates an example light-source field of view and receiver field of view with a corresponding scan direction.

FIG. 5 illustrates an example light-source field of view and receiver field of view with a corresponding scan direction. In particular embodiments, scanner 120 may scan the $FOV_L$ and $FOV_R$ along any suitable scan direction or combination of scan directions, such as for example, left to right, right to left, upward, downward, or any suitable combination thereof. As an example, the $FOV_L$ and $FOV_R$ may follow a left-to-right scan direction (as illustrated in FIG. 5) across a field of regard, and then the $FOV_L$ and $FOV_R$ may travel back across the field of regard in a right-to-left scan direction. In particular embodiments, a light-source field of view and a receiver field of view may be at least partially overlapped during scanning. As an example, the $FOV_L$ and $FOV_R$ may have any suitable amount of angular overlap, such as for example, approximately 1%, 2%, 5%, 10%, 25%, 50%, 75%, 90%, or 100% of angular overlap. As another example, if $\Theta_L$ and $\Theta_R$ are 2 mrad, and $FOV_L$ and $FOV_R$ are offset from one another by 1 mrad, then $FOV_L$ and $FOV_R$ may be referred to as having a 50% angular overlap. As another example, the $FOV_L$ and $FOV_R$ may be substantially coincident with one another and may have an angular overlap of approximately 100%. In the example of FIG. 5, the $FOV_L$ and $FOV_R$ are approximately the same size and have an angular overlap of approximately 90%.

Figure 6:
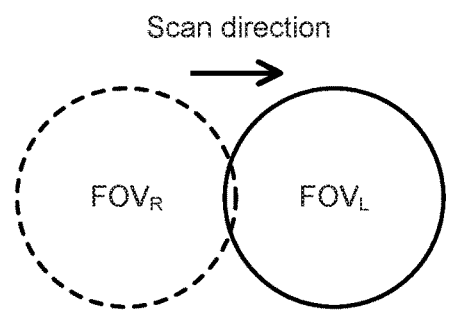
FIG. 6 illustrates an example receiver field of view that is offset from a light-source field of view.

FIG. 6 illustrates an example receiver field of view that is offset from a light-source field of view. In particular embodiments, a $FOV_L$ and $FOV_R$ may be scanned along a particular scanning direction, and the $FOV_R$ may be offset from the $FOV_L$ in a direction opposite the scanning direction. In the example of FIG. 6, the $FOV_L$ and $FOV_R$ are approximately the same size, and the $FOV_R$ lags behind the $FOV_L$ so that the $FOV_L$ and $FOV_R$ have an angular overlap of approximately 5%. In particular embodiments, the $FOV_R$ may be configured to lag behind the $FOV_L$ to produce any suitable angular overlap, such as for example, an angular overlap of less than or equal to 50%, 25%, 5%, 1%, or 0.1%. After a pulse of light is emitted by light source 110, the pulse may scatter from a target 130, and some of the scattered light may propagate back to the lidar system 100 along a path that corresponds to the orientation of the light-source field of view at the time the pulse was emitted. As the pulse of light propagates to and from the target 130, the receiver field of view moves in the scan direction and increases its overlap with the previous location of the light-source field of view (e.g., the location of the light-source field of view when the pulse was emitted). For a close-range target (e.g., a target 130 located within 20% of the maximum range of the lidar system), when the receiver 140 detects scattered light from the emitted pulse, the receiver field of view may overlap less than or equal to 20% of the previous location of the light-source field of view. The receiver 140 may receive less than or equal to 20% of the scattered light that propagates back to the lidar system 100 along the path that corresponds to the orientation of the light-source field of view at the time the pulse was emitted. However, since the target 130 is located relatively close to the lidar system 100, the receiver 140 may still receive a sufficient amount of light to produce a signal indicating that a pulse has been detected. For a midrange target (e.g., a target 130 located between 20% and 80% of the maximum range of the lidar system 100), when the receiver 140 detects the scattered light, the receiver field of view may overlap between 20% and 80% of the previous location of the light-source field of view. For a target 130 located a distance greater than or equal to 80% of the maximum range of the lidar system 100, when the receiver 140 detects the scattered light, the receiver field of view may overlap greater than or equal to 80% of the previous location of the light-source field of view. For a target 130 located at the maximum range from the lidar system 100, when the receiver 140 detects the scattered light, the receiver field of view may be substantially overlapped with the previous location of the light-source field of view, and the receiver 140 may receive substantially all of the scattered light that propagates back to the lidar system 100.

Figure 7:
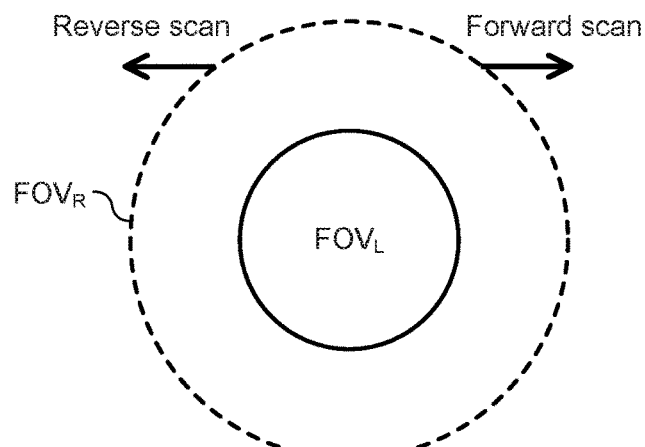
FIG. 7 illustrates an example forward-scan direction and reverse-scan direction for a light-source field of view and a receiver field of view.

FIG. 7 illustrates an example forward-scan direction and reverse-scan direction for a light-source field of view and a receiver field of view. In particular embodiments, a lidar system 100 may be configured so that the $FOV_R$ is larger than the $FOV_L$, and the receiver and light-source FOVs may be substantially coincident, overlapped, or centered with respect to one another. As an example, the $FOV_R$ may have a diameter or angular extent $\Theta_R$, that is approximately 1.5×, 2×, 3×, 4×, 5×, or 10× larger than the diameter or angular extent $\Theta_L$ of the $FOV_L$. In the example of FIG. 7, the diameter of the receiver field of view is approximately 2 times larger than the diameter of the light-source field of view, and the two FOVs are overlapped and centered with respect to one another. The receiver field of view being larger than the light-source field of view may allow the receiver 140 to receive scattered light from emitted pulses in both scan directions (forward scan or reverse scan). In the forward-scan direction illustrated in FIG. 7, scattered light may be received primarily by the left side of the $FOV_R$, and in the reverse-scan direction, scattered light may be received primarily by the right side of the $FOV_R$. For example, as a pulse of light propagates to and from a target 130 during a forward scan, the $FOV_R$ scans to the right, and scattered light that returns to the lidar system 100 may be received primarily by the left portion of the $FOV_R$.

In particular embodiments, a lidar system 100 may perform a series of forward and reverse scans. As an example, a forward scan may include the $FOV_L$ and the $FOV_R$ being scanned horizontally from left to right, and a reverse scan may include the two fields of view being scanned from right to left. As another example, a forward scan may include the $FOV_L$ and the $FOV_R$ being scanned along any suitable direction (e.g., along a 45-degree angle), and a reverse scan may include the two fields of view being scanned along a substantially opposite direction. In particular embodiments, the forward and reverse scans may trace paths that are adjacent to or displaced with respect to one another. As an example, a reverse scan may follow a line in the field of regard that is displaced above, below, to the left of, or to the right of a previous forward scan. As another example, a reverse scan may scan a row in the field of regard that is displaced below a previous forward scan, and the next forward scan may be displaced below the reverse scan. The forward and reverse scans may continue in an alternating manner with each scan being displaced with respect to the previous scan until a complete field of regard has been covered. Scans may be displaced with respect to one another by any suitable fixed or adjustable angular amount, such as for example, by approximately 0.05°, 0.1°, 0.2°, 0.5°, 1°, 2°, 5°, or 10°.

Figure 8:
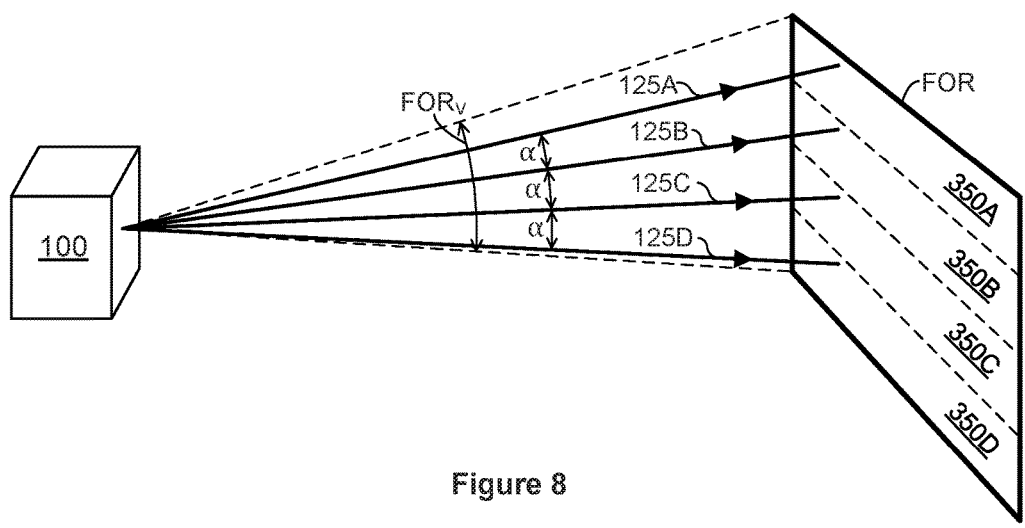
FIG. 8 illustrates an example lidar system 100 that uses multiple output beams to scan a field of regard (FOR).

FIG. 8 illustrates an example lidar system 100 that uses multiple output beams to scan a field of regard (FOR). In particular embodiments, a lidar system 100 may emit two or more angularly separated output beams which are used to scan a FOR. As an example, a lidar system 100 may use 2, 3, 4, 5, 10, 15, 20, 50, or any other suitable number of output beams 125 to simultaneously scan a FOR. In the example of FIG. 8, lidar system 100 produces four angularly separated output beams (125A, 125B, 125C, and 125D) to simultaneously scan across the FOR, which is subdivided into four corresponding regions (350A, 350B, 350C, and 350D). Each of the output beams (125A, 125B, 125C, and 125D) may be configured to scan across a respective region (350A, 350B, 350C, and 350D) of the FOR. The angularly separated output beams may be scanned synchronously so that each output beam follows substantially the same scan pattern within the output beam's corresponding scan region, and the output beams maintain substantially the same relative position to one another as they are scanned. In FIG. 8, output beams 125A, 125B, 125C, and 125D scan across regions 350A, 350B, 350C, and 350D, respectively, and each output beam may follow a scan pattern having approximately the same shape.

In particular embodiments, the multiple output beams produced by a lidar system 100 may have a separation angle α of approximately 0.5°, 1°, 2°, 5°, 10°, 20°, or any other suitable separation angle. If a FOR is divided into N regions, then the separation angle α between adjacent beams may be approximately $FOR_V/N$. In the example of FIG. 8, the FOR is divided into N=4 regions which are scanned by the corresponding four output beams 125A, 125B, 125C, and 125D. If $FOR_V$ is 20°, then the separation angle α between adjacent beams is approximately 5°. In particular embodiments, each optical pulse emitted by a light source 110 may be split into N pulses, where N is 2, 3, 4, 5, 10, 15, 20, 50, or any other suitable value. In the example of FIG. 8, each emitted pulse is split into four pulses which are directed along the four respective output beams 125A, 125B, 125C, and 125D. In particular embodiments, an emitted pulse may be approximately evenly split into N pulses, where each of the N pulses has approximately 1/N of the energy of the emitted pulse. As an example, an emitted pulse with a pulse energy of approximately 4 µJ may be split into 4 pulses, where each of the split pulses has an energy of approximately 1 µJ.

In particular embodiments, a lidar system 100 may include a splitter configured to receive pulses of light emitted by a light source 110 and split each received pulse of light into two or more angularly separated pulses of light which are scanned across a FOR. In particular embodiments, a splitter may include a diffractive optical element, a holographic optical element, a polarizing beam splitter, a non-polarizing beam splitter, or a beam splitter with a metallic or dielectric coating. As an example, a splitter (which may be referred to as a multispot beam generator, an array beam generator, a beam splitter, or a pixelator) may include a diffractive element or a holographic element that divides an input beam into two or more output beams. A diffractive beam splitter may have a repetitive pattern etched or deposited on one of its surfaces. The repetitive pattern may produce a corresponding periodic refractive-index or absorption variation that diffracts an input optical beam to produce N angularly separated output beams. A holographic beam splitter may include a bulk material with a repetitive variation in its refractive index or absorption. As an example, a holographic beam splitter may have a bulk refractive-index variation that results in the splitting of an input optical beam into N angularly separated output beams.

In particular embodiments, a splitter may be positioned before or after a scanner 120. As an example, a splitter may receive emitted pulses of light after they pass through a scanner 120. As another example, a splitter may be positioned before a scanner 120 so that the splitter receives pulses of light emitted by the light source 110, and the scanner 120 receives the pulses of light after they are split by the splitter. In particular embodiments, a scanner 120 may scan angularly separated pulses of light along a scanning direction, and the angularly separated pulses of light produced by a splitter may be split along a direction that is approximately orthogonal to the scanning direction. As an example, if the scanning direction is substantially vertical, then the angularly separated pulses of light may be split along a substantially horizontal direction. In the example of FIG. 8, the scanning direction is substantially horizontal, and the angularly separated pulses of light are split along a substantially vertical direction. In particular embodiments, splitting a beam along a direction that is approximately orthogonal to a scanning direction may allow a lidar system 100 to simultaneously scan multiple regions of a FOR. In FIG. 8, the four output beams 125A, 125B, 125C, and 125B may be used to simultaneously scan the four respective regions 350A, 350B, 350C, and 350D.

In particular embodiments, scanning a FOR with N split pulses may result in an increase in a lidar-system frame rate by a factor of N. As an example, for a light source 110 that produces pulses at a pulse repetition frequency f, if each pulse is split into N pulses, then the effective pulse repetition frequency may be increased to N×f. As another example, for a light source 110 with a pulse repetition frequency of 100 kHz, a frame with 50,000 pixels 210 may be scanned with a frame rate of 2 frames per second. If each emitted pulse is split into N=5 pulses, then the effective pulse repetition frequency is increased to 500 kHz, and the frame rate increases to 10 frames per second.

Figure 9:
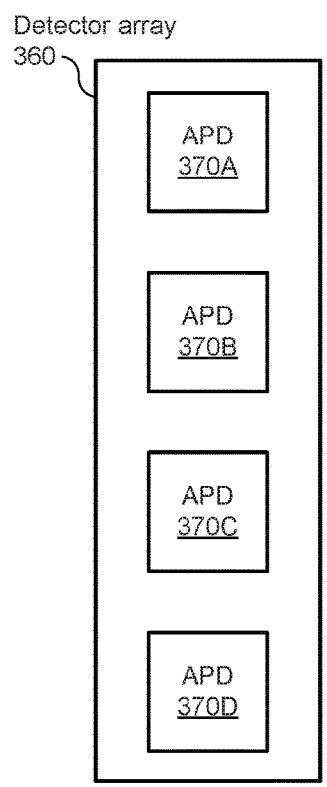
FIG. 9 illustrates an example detector array.

FIG. 9 illustrates an example detector array 360. In particular embodiments, a receiver 140 may include an array 360 of two or more detector elements. Each detector element may include an APD, SPAD, or photodiode and may be configured to detect scattered light from a respective pulse of angularly separated pulses of light which are scanned across a FOR. A detector array 360 may include any suitable arrangement of detector elements. As an example, a detector array 360 may include a one-dimensional horizontal or vertical arrangement of detector elements. As another example, a detector array 360 may include a two-dimensional arrangement of detector elements (e.g., 8 detector elements arranged in a 2×4 grid). In the example of FIG. 9, detector array 360 includes a one-dimensional vertical arrangement of four detector elements (APDs 370A, 370B, 370C, and 370D). In particular embodiments, an arrangement of detector-array elements may correspond to a direction along which the output beams of a lidar system 100 are split. As an example, if an output beam is split along a vertical direction, the elements of a detector array 360 may be arranged along a corresponding direction.

In particular embodiments, a lidar system 100 may include a light source 110 and a splitter configured to split a pulse of light emitted by the light source 110 into N angularly separated pulses of light. The N angularly separated pulses of light may be used to scan N respective regions of a FOR. Additionally, the lidar system 100 may include a detector array 360 with N detector elements, where each detector element is configured to receive scattered light from a corresponding angularly separated pulse of light. The detector array 360 in FIG. 9 may be included in a receiver 140 of lidar system 100 of FIG. 8, and APDs 370A, 370B, 370C, and 370D may be configured to detect scattered light associated with output beams 125A, 125B, 125C, and 125D, respectively. As an example, APD 370A may detect scattered light from output beam 125A, which is used to scan across region 350A of the FOR. Similarly, APDs 370B, 370C, and 370D may detect scattered light from output beams 125B, 125C, and 125D, respectively, which are used to scan across regions 350B, 350C, and 350D, respectively.

In particular embodiments, a light source 110 of a lidar system 100 may include a solid-state laser. In particular embodiments, a solid-state laser may refer to a laser that includes a solid-state, glass, or crystal-based gain medium. As an example, the gain medium of a solid-state laser may include rare-earth ions in a crystal or glass host material that are optically pumped to provide optical gain. In particular embodiments, optical pumping (or, pumping) may refer to providing energy to a gain medium, where the energy is provided by an optical source (e.g., a pump laser diode). The gain medium may absorb light from a pump laser and may be "pumped" or promoted into excited states that provide optical amplification to particular wavelengths of light through stimulated emission. As an example, the gain medium may be a glass or crystal host material doped with rare-earth ions, such as for example, erbium (Er), neodymium (Nd), ytterbium (Yb), praseodymium (Pr), holmium (Ho), thulium (Tm), dysprosium (Dy), any other suitable rare-earth element, or any suitable combination of rare-earth elements. The rare-earth dopants (which may be referred to as gain material or as gain-material dopants) may absorb pump light and provide optical gain to particular wavelengths of light that circulate within a solid-state laser cavity. Herein, reference to a rare-earth element (e.g., erbium or ytterbium) may correspond to an ion of that rare-earth element (e.g., trivalent erbium ($Er^{3+}$) or trivalent ytterbium ($Yb^{3+}$)).

In particular embodiments, a glass host material for a gain medium may include any suitable glass material, such as for example, a silicate glass (e.g., fused silica or borosilicate glass) or a phosphate glass. As an example, a gain medium of a solid-state laser may include a phosphate glass doped with erbium, ytterbium, or a combination of erbium and ytterbium. In particular embodiments, a crystalline host material for a gain medium may include any suitable member of the garnet, perovskite, oxyborate, vanadate, tungstate, or fluoride crystal families. For example, a crystalline host material for a gain medium may include yttrium aluminum garnet ($Y_3Al_5O_{12}$, which may be referred to as YAG), yttrium scandium gallium garnet ($Y_3Sc_2Ga_3O_{12}$, which may be referred to as YSGG), gadolinium scandium gallium garnet ($Gd_{3-x}Sc_{2-y}Ga_{3+x+y}O_{12}$, which may be referred to as GSGG), yttrium aluminum perovskite ($YAlO_3$, which may be referred to as YAP), yttrium aluminum borate ($YAl_3(BO_3)_4$, which may be referred to as YAB), yttrium orthovanadate ($YVO_4$), gadolinium orthovanadate ($GdVO_4$), or yttrium lithium fluoride ($LiYF_4$, which may be referred to as YLF). As an example, a gain medium of a solid-state laser may include a YAG crystal doped with approximately 1.5% Nd, which may be referred to as 1.5 atomic % doping (e.g., approximately 1.5% of the yttrium ions in the YAG crystal are replaced with neodymium ions).

In particular embodiments, a solid-state laser may include or may be referred to as a passively Q-switched (PQSW) laser, an actively Q-switched laser, a Q-switched laser, a diode-pumped solid-state laser (DPSS laser or DPSSL), a microlaser, an optical parametric oscillator (OPO), a self-Raman laser, or any suitable combination thereof. As an example, a solid-state laser may include a PQSW laser or an actively Q-switched laser that produces pulses of light at approximately 1030 nanometers, approximately 1064 nanometers, or between approximately 1400 nanometers and approximately 1480 nanometers. As another example, a solid-state laser may include an OPO that is pumped by a PQSW laser. As another example, a solid-state laser may include a self-Raman laser. In particular embodiments, a solid-state laser may produce an output beam 125 that is a free-space beam. As an example, a solid-state laser may directly emit a free-space optical beam that propagates in air, vacuum, water, or glass.

In particular embodiments, a lidar system 100 may include a solid-state laser configured to emit pulses of light.

In particular embodiments, the optical pulses produced by a solid-state laser may have optical characteristics that include one or more of the following: a pulse repetition frequency of greater than or equal to 20 kHz (e.g., approximately 20 kHz, 30 kHz, 40 kHz, 60 kHz, 80 kHz, 100 kHz, 120 kHz, 150 kHz, 200 kHz, 500 kHz, 1 MHz, or 5 MHz); a pulse duration of less than or equal to 20 nanoseconds (e.g., approximately 50 ps, 200 ps, 400 ps, 500 ps, 800 ps, 1 ns, 2 ns, 4 ns, 8 ns, 10 ns, 15 ns, or 20 ns); a duty cycle of less than or equal to 1% (e.g., approximately 0.001%, 0.005%, 0.01%, 0.02%, 0.05%, 0.1%, 0.2%, 0.5%, or 1%); a pulse energy of greater than or equal to 10 nanojoules (e.g., approximately 10 nJ, 50 nJ, 100 nJ, 500 nJ, 1 μJ, 2 μJ, 5 μJ, 10 μJ, 20 μJ, or 50 μJ); a peak pulse power of greater than or equal to 1 watt (e.g., approximately 1 W, 10 W, 50 W, 100 W, 200 W, 500 W, 1 kW, 2 kW, 10 kW, 50 kW, or 100 kW); an average power of less than or equal to 50 watts (e.g., approximately 50 W, 20 W, 10 W, 5 W, 2 W, 1 W, 0.5 W, or 0.1 W); or an operating wavelength of between 1400 nm and 1700 nm. As an example, a solid-state laser may produce an output beam 125 with a pulse repetition frequency between approximately 40 kHz and approximately 140 kHz, and the pulses may have a pulse duration between approximately 100 ps and approximately 2 ns. As another example, a solid-state laser may produce pulses with a pulse repetition frequency of approximately 100 kHz and a pulse duration of approximately 1 ns, corresponding to a duty cycle of approximately 0.01%. (A duty cycle may be determined from a ratio of pulse duration to pulse period or from a product of pulse duration and pulse repetition frequency.) As another example, a solid-state laser may produce pulses with a pulse repetition frequency of approximately 500 kHz and a pulse duration of approximately 2 ns, corresponding to a duty cycle of approximately 0.1%. As another example, a solid-state laser may produce pulses with a pulse duration of approximately 1 ns and a pulse energy of approximately 1 μJ, which corresponds to pulses with a peak power of approximately 1 kW. (A peak power of a pulse may be determined from a ratio of pulse energy to pulse duration). As another example, a solid-state laser may produce pulses with a pulse duration of approximately 400 ps and a pulse energy of approximately 5 μJ, which corresponds to pulses with a peak power of approximately 12.5 kW. As another example, a solid-state laser may produce pulses with a pulse energy of approximately 4 μJ and a pulse repetition frequency of approximately 100 kHz, corresponding to an average power of approximately 0.4 W. (An average power may be determined from a product of pulse energy and pulse repetition frequency.) As another example, a solid-state laser may produce pulses with a wavelength of approximately 1420 nm, 1440 nm, 1500 nm, 1550 nm, or 1600 nm.

Figure 10:
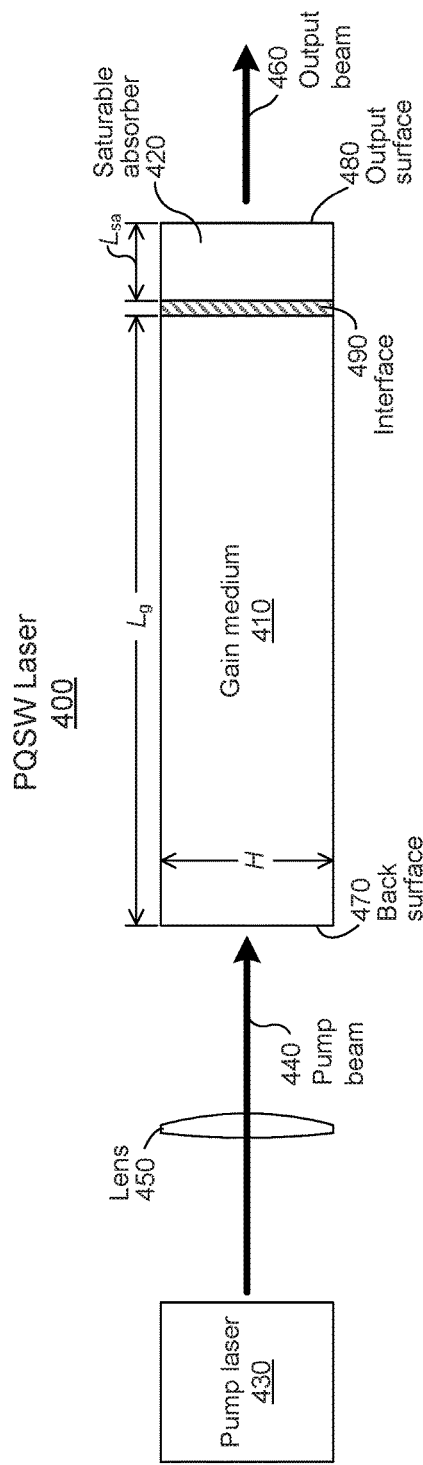
FIG. 10 illustrates an example passively Q-switched (PQSW) laser that includes a gain medium and a saturable absorber.

FIG. 10 illustrates an example passively Q-switched (PQSW) laser 400 that includes a gain medium 410 and a saturable absorber 420. A PQSW laser 400 may produce optical pulses through a Q-switching process provided by an optical interaction between gain medium 410 and saturable absorber 420. In the example of FIG. 10, the PQSW laser 400 is pumped by pump laser 430, which produces a free-space pump beam 440. The pump beam 440 passes through a lens 450 to collimate or focus the pump-beam light, which then propagates to the gain medium 410. In particular embodiments, lens 450 may be referred to as an imaging optic and may include one or more concave or convex lenses configured to collimate or focus the pump beam 440. As an example, lens 450 may focus pump beam 440 to a $1/e^2$ beam diameter of approximately 100-300 μm in gain medium 410. In particular embodiments, the ends of the laser cavity of the PQSW laser 400 may be formed by back surface 470 and output surface 480.

In particular embodiments, a light source 110 of a lidar system 100 may include a PQSW laser 400 that includes a gain medium 410 and a saturable absorber 420. As an example, an output beam 460 of a PQSW laser 400 may be coupled to a splitter or a scanner 120 of a lidar system 100, and at least part of the output beam 460 may form an output beam 125 of the lidar system 100. As another example, an output beam 460 of a PQSW laser 400 may act as a pump source for another optical assembly of a light source 110. For example, optical pulses produced by a PQSW laser 400 may be used to pump an OPO.

A gain medium 410 of a PQSW laser 400 may have any suitable length $L_g$, any suitable height H, and any suitable width. As an example, a gain medium 410 may have a length $L_g$ of between approximately 1 mm and approximately 30 mm, and a gain medium 410 may have a height H or a width of between approximately 0.5 mm and approximately 10 mm. As another example, a gain medium 410 may include a Yb-doped or Nb-doped YAG crystal, and the YAG crystal may have a length $L_g$ of approximately 3.0 mm, a height H of approximately 2.0 mm, and a width of approximately 1.5 mm. A saturable absorber 420 may have any suitable length $L_{sa}$, such as for example, a length of approximately 0.05 mm, 0.1 mm, 0.2 mm, 0.3 mm, 0.5 mm, 1 mm, 2 mm, 5 mm, or 10 mm.

In particular embodiments, gain medium 410 of a PQSW laser 400 may include Nd-doped YAG (Nd:YAG), Yb-doped YAG (Yb:YAG), Nd-doped $YVO_4$ (Nd:$YVO_4$), Nd-doped YSGG (Nd:YSGG), Nd-doped GSGG (Nd:GSGG), Nd-doped YAP (Nd:YAP), Nd-doped YAB (Nd:YAB), Er-doped YAB (Er:YAB), Nd-doped YLF (Nd:YLF), Er-doped glass (Er:glass), YAB doped with Er and Yb (Er,Yb:YAB), or glass doped with Er and Yb (Er,Yb:glass). As an example, gain medium 410 may include Nd:YAG with 0.5% to 5% Nd doping (e.g., 0.5% to 5% of the yttrium ions in the YAG crystal are replaced with neodymium ions). As another example, gain medium 410 may include Yb:YAG with 2% to 20% Yb doping. As another example, gain medium 410 may include Nd:$YVO_4$ with 0.1% to 5% Nd doping.

In particular embodiments, gain medium 410 may be pumped by a pump laser 430 that produces a free-space pump beam 440 which is directed into the gain medium 410. Light from the pump beam 440 may be absorbed by optical gain material (e.g., rare-earth ions) contained within the gain medium 410, and the excited gain material may produce optical gain (through stimulated emission) for particular wavelengths of light circulating within the optical cavity of the PQSW laser 400. The cavity of the PQSW laser 400 may be formed by back surface 470 and output surface 480. In particular embodiments, a pump laser 430 may produce a pump beam 440 with any suitable optical power, such as for example, an average optical power of greater than or equal to 1 W, 2 W, 5 W, 10 W, 15 W, or 20 W. Additionally, the optical gain material in the gain medium 410 may absorb any suitable amount of light from the pump beam 440, such as for example, greater than or equal to 40%, 50%, 60%, 70%, 80%, 90%, or 95% of the pump-beam light.

In particular embodiments, pump laser 430 may be a laser diode, such as for example an edge-emitter laser diode, a vertical-cavity surface-emitting laser (VCSEL) or a vertical-external-cavity surface-emitting laser (VECSEL). An edge-emitter laser diode may refer to a semiconductor laser diode where light propagates in a direction parallel to a surface of the laser's semiconductor substrate, and the laser light is reflected by or coupled out of the laser diode at a cleaved edge. A VCSEL may refer to a semiconductor laser diode where light is emitted perpendicular to the semiconductor substrate surface. A VCSEL may include two mirrors (e.g., Bragg reflectors) incorporated into the VCSEL structure, where the two mirrors are located on either side of the VCSEL gain region and form a resonant optical cavity of the VCSEL. Each of the mirrors may be a dielectric mirror (e.g., a mirror formed by thin films of dielectric material deposited onto a surface of the VCSEL) or a semiconductor-based mirror formed by layers of semiconductor material having alternating refractive indices. A VECSEL (which may be referred to as an extended-cavity vertical-cavity surface-emitting laser, or EC-VCSEL) may refer to a VCSEL-type semiconductor laser diode with the resonant cavity formed by one mirror incorporated into a VCSEL structure and a second mirror located external to the VCSEL structure. The external mirror may be configured to reflect light at an operating wavelength of the VECSEL, and the external mirror may act as an output coupler from which the pump beam 440 is emitted. The spacing between the VCSEL structure and the external mirror may be any suitable distance, such as for example, approximately 0.01 mm, 0.1 mm, 1 mm, 2 mm, 5 mm, 10 mm, 20 mm, or 50 mm. The external mirror of a VECSEL may be a dielectric mirror or a volume Bragg grating (VBG). A VBG may refer to a substantially transparent substrate which has a periodic refractive-index variation within its volume (rather than on a surface of the substrate), and a VBG may be configured to reflect light at the operating wavelength of the VECSEL.

In particular embodiments, pump laser 430 may be a VECSEL, and the external mirror of the VECSEL may be formed by the back surface 470 of gain medium 410. As an example, back surface 470 may act as a cavity mirror of the pump laser 430 and as a cavity mirror of the PQSW laser 400. For example, back surface 470 may have a dielectric coating with a high reflectivity at an operating wavelength of the PQSW laser 400 and a partial reflectivity or high reflectivity at an operating wavelength of the pump laser 430. Light emitted by the VECSEL may be directly coupled from the VECSEL into the gain medium 410 of the PQSW laser 400. In particular embodiments, pump laser 430 may be a VECSEL, and the external mirror of the VECSEL may be bonded to the back surface 470 of the gain medium 410. As an example, the external mirror may be attached or coupled to the back surface 470 by adhesive or epoxy bonding, optical contacting, diffusion bonding, chemically activated direct bonding, or any other suitable bonding technique.

In particular embodiments, a pump laser 430 may operate at any suitable wavelength, such as any suitable wavelength between approximately 800 nm and approximately 1000 nm. As an example, the gain medium 410 may be pumped at a wavelength between approximately 800 nm and approximately 1000 nm by an edge-emitter laser diode or a VECSEL. As another example, a pump laser 430 may produce light at approximately 808 nm, 888 nm, 908 nm, 915 nm, 940 nm, 941 nm, 960 m, 976 nm, or 980 nm. As another example, a pump laser 430 operating at approximately 808-nm may be used to pump a Nd:YAG crystal, and the PQSW laser 400 may produce an output beam 460 with a wavelength of approximately 1064 nm (e.g., 1064.3 nm). As another example, a pump laser 430 operating between approximately 805 nm and approximately 811 nm may be used to pump a Nd:YSGG crystal, and the PQSW laser 400 may produce an output beam 460 with a wavelength of approximately 1422.5 nm. As another example, a pump laser 430 operating between approximately 900 nm and approximately 980 nm may be used to pump a Yb:YAG crystal, and the PQSW laser 400 may produce an output beam 460 with a wavelength of approximately 1030 nm.

In particular embodiments, a pump laser 430 may be temperature stabilized to stabilize the output wavelength of the pump laser 430. As an example, a temperature-stabilized pump laser 430 with an 808-nm output wavelength may be used to pump a Nd:YAG gain medium 410. Since the Nd dopants in a Nd:YAG gain medium 410 have a relatively narrow absorption band, the 808-nm pump laser 430 may be temperature stabilized to ensure that the 808-nm output wavelength is maintained (e.g., the pump laser 430 may be temperature stabilized so the output wavelength varies by less than or equal to ±3 nm, ±1 nm, ±0.5 nm, or ±0.2 nm). A pump laser 430 may be temperature stabilized using a thermoelectric cooler, a temperature sensor, and a temperature-stabilization circuit, and the pump-laser temperature may be stabilized to within any suitable value of a set-point temperature (e.g., within ±10° C., ±5° C., ±1° C., ±0.5° C., or ±0.1° C. of a set-point temperature). In particular embodiments, a pump laser 430 may not require temperature stabilization. As an example, a pump laser 430 with an output wavelength between approximately 940 and approximately 960 nm may be used to pump a Yb:YAG gain medium 410. Since the Yb dopants in a Yb:YAG gain medium have a relatively broad absorption band, the pump laser 430 may not require temperature stabilization.

In particular embodiments, pump laser 430 may be a free-space laser (e.g., a laser that directly produces a free-space pump beam 440) or a fiber-coupled laser. For a fiber-coupled pump laser 430, the pump laser 430 may produce light that is coupled or directed to an optical fiber, and the optical fiber may be terminated by a collimator or lens assembly that produces a free-space pump beam 440 which is directed to gain medium 410. In particular embodiments, the gain medium 410 may be side-pumped or end-pumped by the pump laser 430. As an example, for a side-pumping arrangement, the pump beam 440 may enter the gain medium 410 through a side surface of the gain medium 410 and may be directed substantially orthogonal to the axis along which light propagates within the PQSW laser cavity. In the example of FIG. 10, the pump laser 430 is configured in an end-pumping arrangement where the pump beam 440 enters the gain medium 410 through an end surface (e.g., back surface 470) of the gain medium 410, and the pump beam 440 propagates along a direction that is substantially parallel to the propagation axis of light within the PQSW laser cavity.

In particular embodiments, PQSW laser 400 may include a saturable absorber 420. In the example of FIG. 10, gain medium 410 is located on the pump side of the PQSW laser 400 (e.g., the gain medium 410 is configured to receive the pump beam 440), and saturable absorber 420 is located on the output side of the PQSW laser 400 (e.g., the output beam 460 exits the PQSW laser 400 from output surface 480 of the saturable absorber 420). In particular embodiments, saturable absorber 420 of a PQSW laser 400 may include vanadium-doped YAG ($V^{3+}$:YAG, which may be referred to as V:YAG), chromium-doped YAG ($Cr^{4+}$:YAG, which may be referred to as Cr:YAG), cobalt-doped zinc selenide ($Co^{2+}$:ZnSe, which may be referred to as Co:ZnSe), cobalt-doped $MgAl_2O_4$ ($Co^{2+}$:spinel, which may be referred to as Co:spinel), neodymium-doped strontium fluoride ($Nd^{2+}$:$SrF_2$, which may be referred to as Nd:$SrF_2$), lithium fluoride with $F_2$ color centers (LiF:$F_2$), glass doped with lead-sulfide (PbS) quantum dots, or a semiconductor saturable absorber mirror (SESAM).

In particular embodiments, saturable absorber 420 may include an optical material that becomes more optically transparent as the intensity of light incident on the saturable absorber 420 increases (e.g., the optical loss of the saturable absorber 420 decreases as incident light intensity increases). As an example, the dopant vanadium ions in a V:YAG saturable absorber 420 may absorb light emitted by the gain material of gain medium 410. This absorption process promotes vanadium ions into excited states and depletes the number of ground-state vanadium ions available to absorb additional light emitted by gain medium 410. As the number of available vanadium ions in a ground state is depleted, the optical loss of the V:YAG saturable absorber 420 decreases, which corresponds to an increase in optical transmission.

In particular embodiments, for relatively low optical intensities, a saturable absorber 420 may be relatively absorbing (e.g., the saturable absorber 420 may have a relatively high optical loss), and for relatively high optical intensities, a saturable absorber 420 may be relatively transparent (e.g., the saturable absorber 420 may have a relatively low optical loss). As an example, when a saturable absorber 420 is exposed to an optical intensity of less than or equal to a particular saturation intensity (e.g., the saturable absorber 420 is in a substantially unsaturated state), the saturable absorber 420 may absorb greater than or equal to 10%, 15%, 25%, 50%, 70%, 80%, or 90% of the incident light (e.g., the saturable absorber 420 may have a transmission of less than or equal to 90%, 85%, 75%, 50%, 30%, 20%, or 10%). When exposed to an optical intensity of greater than or equal to the saturation intensity (e.g., the saturable absorber 420 is substantially saturated), a saturable absorber 420 may absorb less than or equal to 50%, 25%, 10%, 5%, or 1% of the incident light (e.g., the saturable absorber 420 may have a transmission of greater than or equal to 50%, 75%, 90%, 95%, or 99%).

In particular embodiments, the energy required to saturate a saturable absorber 420 may depend on the thickness $L_{sa}$ or dopant density of the saturable-absorber material. A saturable absorber 420 may have any suitable saturation intensity, such as for example, a saturation intensity of approximately 1 kW/cm$^2$, 10 kW/cm$^2$, 100 kW/cm$^2$, 1 MW/cm$^2$, 10 MW/cm$^2$, or 100 MW/cm$^2$. As an example, a V:YAG saturable absorber 420 may have a saturation intensity of approximately 3.8 MW/cm$^2$. In particular embodiments, a saturable absorber 420 of a PQSW laser 400 may absorb light at a wavelength corresponding to an operating wavelength of the PQSW laser 400. As an example, a V:YAG saturable absorber 420 may have an absorption coefficient (when operating in an unsaturated state) of approximately 9.8 cm$^{-1}$ for a wavelength of approximately 1030 nm. As another example, a Cr:YAG saturable absorber 420 may have an unsaturated absorption coefficient of approximately 6 cm$^{-1}$ for a wavelength of approximately 1064 nm.

In particular embodiments, a saturable absorber 420 may be referred to as a Q-switch or a passive Q-switch, and the saturable absorber may allow a PQSW laser 400 to produce optical pulses through a Q-switching process. Q-switching refers to a technique for producing optical pulses by changing the optical loss (and thus the Q factor, or quality factor) of a laser cavity. The unsaturated optical loss introduced by a saturable absorber 420 corresponds to a reduction in the Q factor of the laser cavity, and as the saturable absorber 420 saturates, the Q factor increases (corresponding to a reduction in optical loss). The saturable absorber 420 acts as a variable attenuator that prevents the PQSW laser 400 from lasing when the optical intensity in the laser cavity is relatively low. As the optical intensity in the laser cavity increases (as a result of the pump beam 440 exciting the gain material of gain medium 410), the saturable absorber 420 saturates and becomes more transparent (e.g., the optical-cavity loss decreases), and at a particular point after the optical-cavity gain exceeds the loss, the PQSW laser 400 emits an optical pulse. After the pulse is emitted, the saturable absorber 420 returns to an unsaturated state (with relatively high optical loss), and the Q-switching process repeats periodically, resulting in the PQSW laser 400 emitting an output beam 460 that includes a series of Q-switched optical pulses.

In particular embodiments, a Q-switched laser may be passively Q-switched or actively Q-switched. A passively Q-switched laser may include a passive Q-switch (e.g., saturable absorber 420), and an actively Q-switched laser may include an active Q-switch, such as for example, an acousto-optic modulator (AOM) or an electro-optic modulator (EOM). An active Q-switch, which may take the place of a passive Q-switch, may refer to an electrically driven device that provides controllable optical loss in a laser cavity. As an example, an actively Q-switched laser may include a gain medium 410 (e.g., Nd:YAG) pumped by a pump laser 430 and an AOM that acts as an active Q-switch.

In particular embodiments, saturable absorber 420 may be bonded to gain medium 410. Saturable absorber 420 and gain medium 410 being bonded together may refer to saturable absorber 420 and gain medium 410 being mechanically attached or coupled together by adhesive or epoxy bonding, by a direct-bonding technique (e.g., optical contacting, diffusion bonding, or chemically activated direct bonding), or by any other suitable bonding technique. Adhesive or epoxy bonding may include attachment using a substantially transparent adhesive or epoxy, such as for example, an optically clear adhesive or an ultraviolet (UV) light-curing adhesive. Optical contacting may include joining together two optical-quality surfaces (e.g., two polished surfaces substantially free of contaminants) so that the surfaces are held together by intermolecular forces. Diffusion bonding may include applying heat or pressure to the saturable absorber 420 and gain medium 410 to allow elements to diffuse between the two parts and form a bond at the atomic level. In chemically activated direct bonding, two surfaces are chemically activated to create dangling bonds. The activated surfaces are pre-bonded together through hydrogen bonds, and the two pre-bonded parts are then annealed to form covalent bonds.

In particular embodiments, a PQSW laser 400 may include an interface 490 located between the gain medium 410 and saturable absorber 420. An interface 490 may represent a bond, border, or coating located between gain medium 410 and saturable absorber 420. The thickness of interface 490 may be any suitable value between zero thickness and approximately 1-mm thickness. As an example, an optical or diffusion bond may have a thickness close to or approximately equal to zero (e.g., the thickness may be less than or equal to 1 μm, 100 nm, 10 nm, or 1 nm). As another example, interface 490 may include adhesive or epoxy material and may have a thickness of approximately 0.1-100 μm.

In particular embodiments, gain medium 410 may include Nd:YAG, Yb:YAG, Nd:YVO$_4$, Nd:YSGG, Nd:GSGG, Nd:YAP, Nd:YAB, Er:YAB, Nd:YLF, Er:glass, Er,Yb:YAB, or Er,Yb:glass, and saturable absorber 420 may include V:YAG, Cr:YAG, Co:spinel, Nd:SrF$_2$, or LiF:F$_2$. As an example, PQSW laser 400 may include a Nd:YAG gain medium 410 bonded to a Cr:YAG saturable absorber 420. As another example, PQSW laser 400 may include a Nd:YAG gain medium 410 bonded to a V:YAG saturable absorber 420. As another example, PQSW laser 400 may include a Yb:YAG gain medium 410 bonded to a V:YAG saturable absorber 420. In particular embodiments, gain medium 410 and saturable absorber 420 may each be part of a monolithic structure in a single host crystal. As an example, PQSW laser 400 may include a single YAG crystal with part of the crystal doped with Nd or Yb (to form gain medium 410) and another part of the crystal doped with Cr or V (to form saturable absorber 420). The interface 490 may represent a border or transition region between the gain medium 410 and the saturable absorber 420, and the interface 490 may have a thickness close to or approximately equal to zero.

In particular embodiments, interface 490 may include a thin-film dielectric coating configured to block or reflect light from the pump beam 440. As an example, interface 490 may include a dielectric coating with a high reflectivity at an operating wavelength of the pump laser 430 (e.g., a reflectivity of greater than or equal to 70%, 80%, 90%, 95%, or 99% at the pump-laser wavelength). Additionally, the dielectric coating may have a low reflectivity at an operating wavelength of the PQSW laser 400 (e.g., a reflectivity of less than or equal to 20%, 10%, 5%, 1%, or 0.1% at the PQSW-laser wavelength). When light from the pump beam 440 enters the gain medium 410, the light is absorbed by the gain material. After propagating through the gain medium 410, any residual, unabsorbed pump light may enter the saturable absorber 420 and may cause unwanted bleaching or saturation of the saturable absorber 420. Having a high-reflectivity coating at the pump-laser wavelength may prevent most of the residual pump-beam light from entering the saturable absorber 420. Most of the pump-beam light may be reflected by the dielectric coating located at the interface 490, and the reflected pump-beam light may propagate back through the gain medium 410.

In particular embodiments, the length $L_g$ or the dopant density of gain medium 410 may be sufficient so that only a fraction of light from pump beam 440 reaches interface 490 (e.g., most of the pump beam 440 is absorbed by the gain material of gain medium 410 during the first pass of pump beam 440 through gain medium 410). As an example, less than or equal to 40%, 20%, 10%, 5%, or 1% of pump beam 440 that is incident on back surface 470 of gain medium 410 may reach the interface 490. In particular embodiments, a dielectric coating located at interface 490 to block or reflect light from the pump beam 440 may not be necessary if the absorption of the pump beam 440 in gain medium 410 is greater than a particular amount (e.g., if greater than or equal to 60%, 80%, 90%, 95%, or 99% of the pump beam 440 is absorbed in the gain medium 410 during its first pass through the gain medium 410). In particular embodiments, a dielectric coating located at interface 490 to block or reflect light from the pump beam 440 may not be necessary if the saturation intensity of the saturable absorber 420 is greater than the intensity of the residual pump-beam light that reaches the saturable absorber 420. As an example, a V:YAG saturable absorber 420 with a 3.8 MW/cm$^2$ saturation intensity may not require a dielectric coating at interface 490 to block or reflect light from the pump beam 440.

In particular embodiments, back surface 470 and output surface 480 of PQSW laser 400 may form two ends of a laser cavity of the PQSW laser 400. The gain medium 410 and saturable absorber 420 may be located between the back surface 470 and output surface 480 so that the gain medium 410 and saturable absorber 420 are contained within the laser cavity. In particular embodiments, a laser cavity may be referred to as a resonant cavity, resonator cavity, optical resonator, optical cavity, or cavity. In particular embodiments, a back surface 470 may form one end of a laser cavity and may be referred to as an input surface, an input coupler, an end surface, a cavity surface, a laser-cavity surface, or a laser-cavity mirror. A back surface 470 may refer to a surface through which pump beam 440 is received or a surface which has a high reflectivity for an operating wavelength of the PQSW laser 400. In particular embodiments, an output surface 480 may form another end of a laser cavity and may be referred to as an output coupler, an end surface, a cavity surface, a laser-cavity surface, or a laser-cavity mirror. An output surface 480 may refer to a surface from which the output beam 460 is emitted.

In particular embodiments, gain medium 410 may include a back surface 470 with a dielectric coating. As an example, back surface 470 may have a coating with a low reflectivity (e.g., R<10%) at a pump-laser wavelength and a high reflectivity (e.g., R>90%) at an operating wavelength of the PQSW laser 400. In particular embodiments, saturable absorber 420 may include an output surface 480 with a dielectric coating. In particular embodiments, a dielectric coating (which may be referred to as a thin-film coating, interference coating, or coating) may include one or more layers of dielectric materials (e.g., $SiO_2$, $TiO_2$, $Al_2O_3$, $Ta_2O_5$, $MgF_2$, $LaF_3$, or $AlF_3$) having particular thicknesses (e.g., thickness less than 1 μm) and particular refractive indices. A dielectric coating may be deposited onto a surface (e.g., a surface of gain medium 410 or saturable absorber 420) using any suitable deposition technique, such as for example, sputtering or electron-beam deposition.

In particular embodiments, a high-reflectivity dielectric coating may be referred to as an HR coating and may have any suitable reflectivity (e.g., a reflectivity R greater than or equal to 80%, 90%, 95%, 99%, 99.5%, or 99.9%) at any suitable wavelength. As an example, back surface 470 have may an HR coating at an operating wavelength of a PQSW laser 400 (e.g., R>99.8% at 1030 nm, 1064 nm, or 1422.5 nm). As another example, interface 490 may have an HR coating at a pump-laser wavelength (e.g., R>99% at 800-820 nm or 920-980 nm).

In particular embodiments, a low-reflectivity dielectric coating may be referred to as a high-transmission (HT) coating or an anti-reflection (AR) coating and may have any suitable reflectivity (e.g., R less than or equal to 10%, 5%, 2%, 1%, 0.5%, or 0.2%) at any wavelength. As an example, back surface 470 may have an HT coating at a pump-laser wavelength (e.g., R<5% at 800-820 nm or 920-980 nm). As another example, output surface 480 may have an HT coating at a pump-laser wavelength (e.g., R<5% at 800-820 nm or 920-980 nm). As another example, interface 490 may have an AR coating at an operating wavelength of a PQSW laser 400 (e.g., R<0.2% at 1030 nm, 1064 nm, or 1422.5 nm).

In particular embodiments, a dielectric coating with an intermediate or partial reflectivity may be referred to as a partially reflective (PR) coating and may have any suitable reflectivity (e.g., R between approximately 10% and approximately 90%) at any suitable wavelength. As an example, output surface 480 may have a PR coating at an operating wavelength of a PQSW laser 400 (e.g., R approximately equal to 50% at 1030 nm, 1064 nm, or 1422.5 nm).

In particular embodiments, a dielectric coating may be a dichroic coating which has a particular type of reflectivity (e.g., HR, HT, AR, or PR) at particular wavelengths. As an example, back surface 470 may have a dielectric coating which is HR (e.g., R greater than 99.8%) at an operating wavelength of a PQSW laser 400 (e.g., at 1030 nm, 1064 nm, or 1422.5 nm) and HT (e.g., R less than 5%) at a pump-laser wavelength (e.g., at 800-820 nm or 920-980 nm). As another example, output surface 480 may have a dielectric coating which is PR (e.g., R is approximately equal to 50%) at an operating wavelength of a PQSW laser 400 (e.g., at 1030 nm, 1064 nm, or 1422.5 nm) and HT (e.g., R less than 5%) at a pump-laser wavelength (e.g., at 800-820 nm or 920-980 nm). As another example, interface 490 may have a dielectric coating which is AR (e.g., R<0.5%) at an operating wavelength of a PQSW laser 400 (e.g., at 1030 nm, 1064 nm, or 1422.5 nm) and HR (e.g., R>99%) at a pump-laser wavelength (e.g., 800-820 nm or 920-980 nm).

In particular embodiments, a PQSW laser 400 may be configured to operate at any suitable wavelength, such as for example, a wavelength of approximately 1030 nm, approximately 1064 nm, or between approximately 1400 nm and approximately 1480 nm. In particular embodiments, a PQSW laser 400 may generate optical pulses at a wavelength less than 1400 nm (e.g., approximately 1030 nm or 1064 nm), and these optical pulses may be used as a pump source for another laser or for an OPO. As an example, a PQSW laser 400 with a Nd:YAG gain medium 410 and a Cr:YAG or V:YAG saturable absorber 420 may produce an output beam 460 with optical pulses having a wavelength of approximately 1064 nm (e.g., the operating wavelength of the PQSW laser 400 is approximately 1064 nm), a pulse energy of greater than or equal to 10 μJ, a pulse repetition frequency of greater than or equal to 60 kHz, or a pulse duration of less than or equal to 2 ns. A Nd:YAG/Cr:YAG or Nd:YAG/V:YAG PQSW laser 400 may be pumped by an edge-emitter pump laser 430 with an operating wavelength of 800-820 nm (e.g., approximately 808 nm) and an output power of greater than or equal to 8 W. The Nd:YAG gain medium 410 may have a length $L_g$ of approximately 2-5 mm and a dopant density of approximately 1.5% Nd. A Cr:YAG saturable absorber 420 may have a length $L_{sa}$ of approximately 0.1-1 mm. As another example, a PQSW laser 400 with a Yb:YAG gain medium 410 and a Cr:YAG or V:YAG saturable absorber 420 may have an operating wavelength of approximately 1030 nm and may produce optical pulses with a pulse energy of greater than or equal to 10 μJ, a pulse repetition frequency of greater than or equal to 60 kHz, or a pulse duration of less than or equal to 2 ns. The Yb:YAG/Cr:YAG or Yb:YAG/V:YAG PQSW laser 400 may be pumped at a wavelength of 920-980 nm (e.g., approximately 976 nm). For example, the pump laser 430 may be a VECSEL with an output power of greater than or equal to 2 W. The Yb:YAG gain medium 410 may have a length $L_g$ of approximately 2-5 mm and a dopant density of approximately 10% Yb. A V:YAG saturable absorber 420 may have a length $L_{sa}$ of approximately 0.1-1 mm).

In particular embodiments, a PQSW laser 400 may directly generate optical pulses at a wavelength between approximately 1400 nm and approximately 1600 nm, and the optical pulses may be used to perform lidar measurements. As an example, a PQSW laser 400 with a Nd:YSGG gain medium 410 may have an operating wavelength of approximately 1422.5 nm. A Nd:YSGG gain medium 410 may have a Nd-doping density of approximately 0.5% to 5% (e.g., 1.9% Nd dopant density) and a length $L_g$ of approximately 2-5 mm. The Nd:YSGG gain medium 410 may be pumped by a VECSEL pump laser 430 with an operating wavelength of approximately 806-811 nm, and the Nd:YSGG gain medium 410 may absorb greater than or equal to 70% of the incident pump beam 440. The PQSW laser 400 may include a V:YAG saturable absorber 420 with a length $L_{sa}$ of approximately 1-5 mm. A Nd:YSGG/V:YAG PQSW laser 400 may produce optical pulses with a pulse energy of greater than or equal to 1 µJ, a pulse repetition frequency of greater than or equal to 60 kHz, or a pulse duration of less than or equal to 2 ns. As another example, a PQSW laser 400 may include a Nd:GSGG, Nd:YAP, or Nd:YAG gain medium 410 and may operate at a wavelength of approximately 1422.5 nm, 1432.8 nm, or 1443.8 nm, respectively.

In particular embodiments, a PQSW laser 400 may include a Er,Yb:YAB gain medium 410. The Er,Yb:YAB gain medium 410 may be pumped by a pump laser 430 with an operating wavelength of approximately 940 nm or approximately 976 nm. The PQSW laser 400 may include a Co:spinel saturable absorber 420, a nanoparticle-based saturable absorber 420, or any other suitable saturable absorber 420, and the PQSW laser 400 may produce output pulses with a wavelength of approximately 1535 nm.

Figure 11:
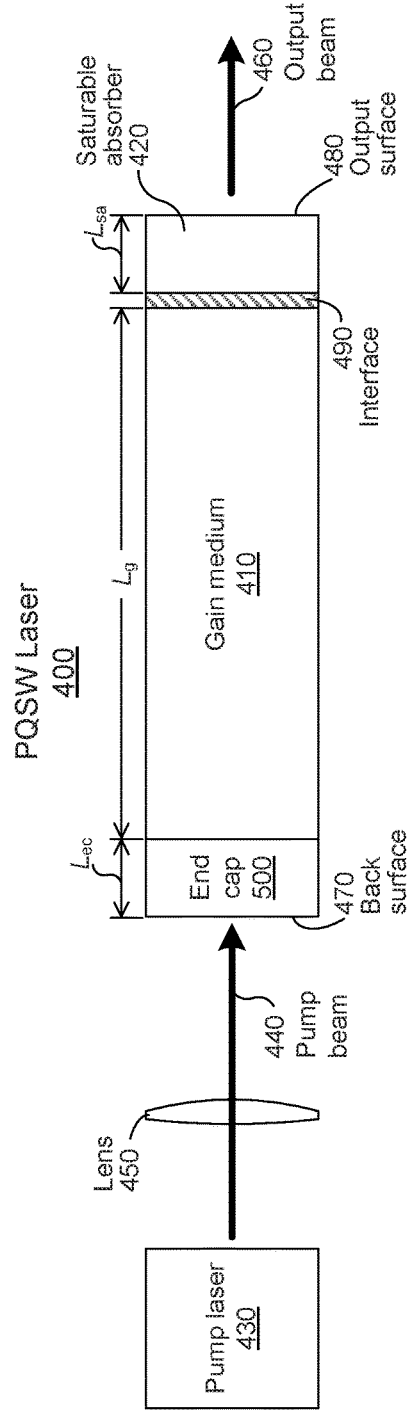
FIG. 11 illustrates an example passively Q-switched laser that includes an end cap.

FIG. 11 illustrates an example passively Q-switched laser 400 that includes an end cap 500. In particular embodiments, the end surfaces of a laser cavity of a PQSW laser 400 may be formed by back surface 470 and output surface 480, and end cap 500, gain medium 410, and saturable absorber 420 may be located within the laser cavity and between the laser-cavity end surfaces. In particular embodiments, end cap 500 may face pump laser 430. In the example of FIG. 11, end cap 500 is positioned to receive pump beam 440 so that pump beam 440 propagates through the end cap 500 before entering gain medium 410. In particular embodiments, end cap 500 may act as a heat spreader that reduces thermally induced stress or thermally induced lensing within gain medium 410. In particular embodiments, an end cap 500 may include back surface 470. A back surface 470 that is part of end cap 500 may be similar to a back surface 470 that is part of gain medium 410 (e.g., back surface 470 of end cap 500 may include a dielectric coating with particular reflectivity at particular wavelengths). In particular embodiments, an end cap 500 may have a length $L_{ec}$ of approximately 0.5-3 mm, and gain medium 410 may have a length $L_g$ of approximately 2-5 mm. As an example, an end cap 500 may have a length $L_{ec}$ of approximately 1 mm, and gain medium 410 may have length $L_g$ of approximately 3-4 mm.

In particular embodiments, an end cap 500 may refer to an undoped host material that is bonded to gain medium 410 (e.g., end cap 500 and gain medium 410 may be bonded together by adhesive or epoxy or by a direct-bonding technique). An end cap 500 may correspond to a gain medium 410 without the presence of gain-material dopants (e.g., the end cap 500 is substantially free of gain-material dopants) or with a low concentration of gain-material dopants. As an example, an end cap 500 may include a separate piece of undoped YAG crystal (e.g., a YAG crystal that is substantially free of gain-material dopants) that is bonded to a Nd:YAG gain medium 410. As another example, an end cap 500 may be an undoped YSGG crystal that is bonded to a Nd:YSGG gain medium 410. In particular embodiments, an end cap 500 being substantially free of gain-material dopants may refer to an end cap 500 with less than a particular amount (e.g., less than approximately 1%, 0.1%, 0.01%, or 0.001%) of the concentration of dopants in a gain medium 410. As an example, if a gain medium 410 is doped with 1.5% Nd and an end cap 500 has less than 1% of the dopant density of the gain medium 410, then the end cap 500 may have a Nd dopant density of less than or equal to 0.015%. In particular embodiments, an end cap 500 having a low concentration of gain-material dopants may refer to an end cap 500 with less than a particular amount (e.g., less than approximately 20%, 10%, 5%, or 2%) of the concentration of dopants in a gain medium 410. In particular embodiments, an end cap 500 may be integrated into or may be part of a host crystal of gain medium 410. As an example, a single host crystal (e.g., YAG) may include both gain medium 410 (e.g., Nd:YAG) and end cap 500 (e.g., undoped YAG). As another example, a single YAG host crystal with an overall length $L_{ec}+L_g$ may be doped with Nd ions or Cr ions over a length $L_g$, and the remaining $L_{ec}$ portion may be an undoped end cap 500 that is substantially free of Nd or Cr dopants. As another example, a single YAG host crystal may have a 5-mm overall length where the first 1-mm is an undoped YAG end cap 500, and the remaining 4-mm is 1.5% Nd-doped YAG. As another example, a single YSGG host crystal may have a length $L_g$ that includes Nd dopants and a length $L_{ec}$ that is substantially free of Nd dopants.

Figure 12:
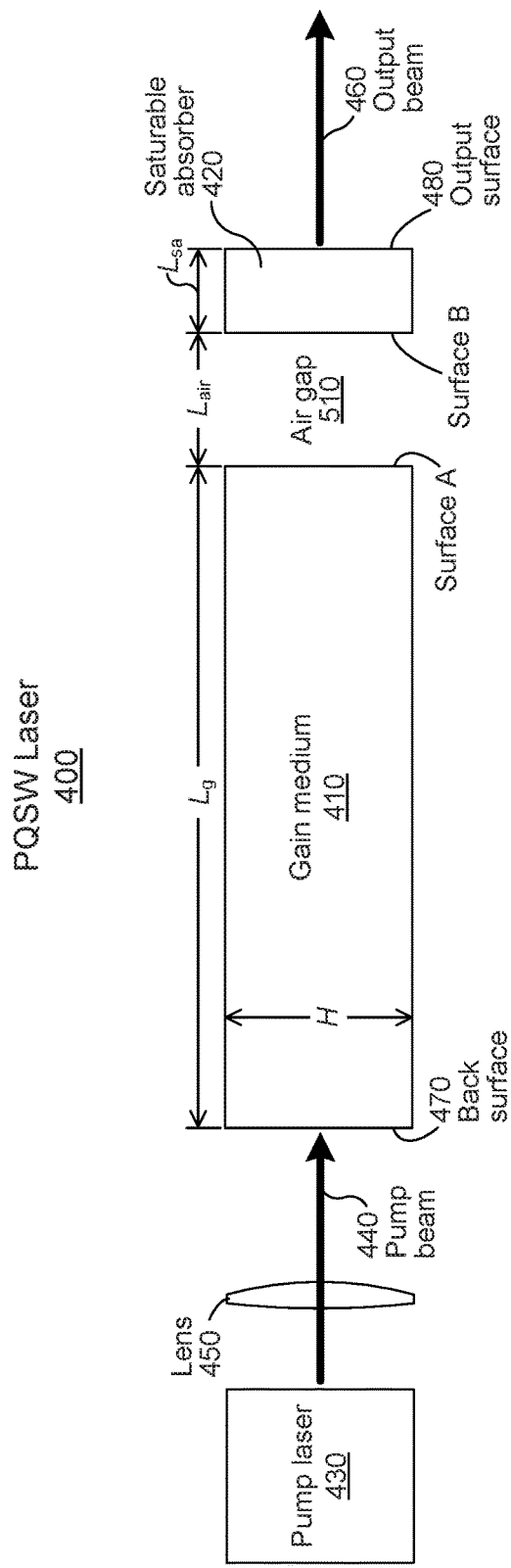
FIG. 12 illustrates an example passively Q-switched laser that includes an air gap between the gain medium and the saturable absorber.

FIG. 12 illustrates an example passively Q-switched laser 400 that includes an air gap 510 between the gain medium 410 and the saturable absorber 420. In particular embodiments, gain medium 410 and saturable absorber 420 may be discrete optical elements which are separated by air gap 510. An air gap 510 may have any suitable length $L_{air}$ between approximately 0 mm and approximately 50 mm. As an example, air gap 510 may have a length $L_{air}$ of approximately 0.1 mm, 0.5 mm, 1 mm, 2 mm, 3 mm, 5 mm, 10 mm, 15 mm, 20 mm, or 50 mm. In the example of FIG. 12, the end surfaces of a laser cavity of the PQSW laser 400 are formed by back surface 470 and output surface 480, and gain medium 410, surface A, air gap 510, surface B, and saturable absorber 420 are located within the laser cavity and between the laser-cavity end surfaces. In particular embodiments, surface A and surface B may each include a dielectric coating with a particular reflectivity (e.g., HR, HT, AR, or PR) at particular wavelengths. As an example, surface A may have a coating that is HR (e.g., R>95%) at a pump-laser wavelength and AR (e.g., R<0.5%) at an operating wavelength of the PQSW laser 400. The HR coating may reflect most pump-laser light that is incident on surface A, and the AR coating may allow most of the PQSW laser light to pass through surface A. As another example, surface B may have an AR coating at an operating wavelength of the PQSW laser 400.

Figure 13:
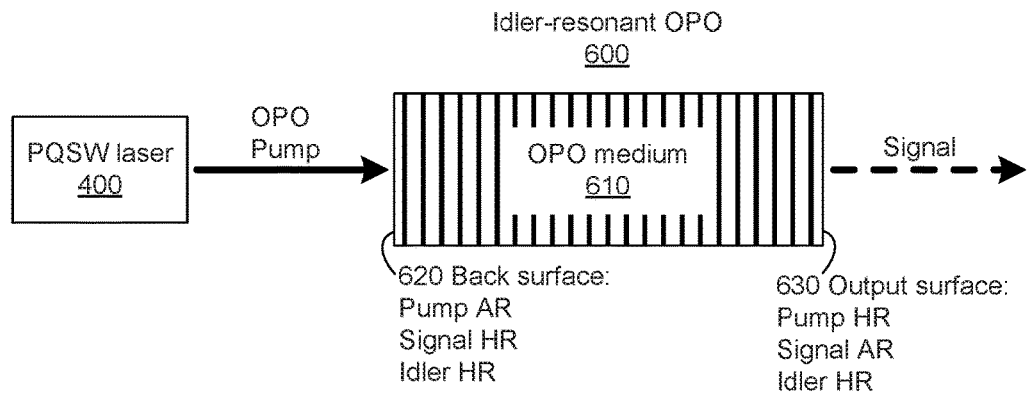
FIG. 13 illustrates an example optical parametric oscillator (OPO) configured to operate in an idler-resonant mode.

FIG. 13 illustrates an example optical parametric oscillator (OPO) 600 configured to operate in an idler-resonant mode. In particular embodiments, an OPO 600 may refer to a light source that produces light from a parametric-amplification process in an OPO medium 610. An OPO 600 may include an OPO medium 610, and the OPO medium 610 may be referred to as a nonlinear optical crystal or a nonlinear crystal. An OPO 600 may convert pulses of input light (which may be referred to as pump light, OPO pump light, or OPO pump) supplied by a pump laser (e.g., a PQSW laser 400 or an actively Q-switched laser) into two longer wavelengths of light (signal and idler) by means of a nonlinear-optical interaction in the OPO medium 610. In particular embodiments, an OPO 600 may receive OPO pump light from any suitable pulsed laser source, such as for example, a PQSW laser 400 or an actively Q-switched laser. The OPO medium 610 may convert at least part of the received pump pulses into longer-wavelength signal pulses and idler pulses. Additionally, the OPO 600 or OPO medium 610 may emit at least a portion of the signal pulses (e.g., the emitted signal pulses may correspond to an output beam 125).

In particular embodiments, a light source 110 of a lidar system 100 may include a solid-state laser, where the solid-state laser includes a PQSW laser 400 and an OPO 600. As an example, light source 110 may include an OPO 600 pumped by pulses of light from a Nd:YAG/Cr:YAG PQSW laser 400, a Nd:YAG/V:YAG PQSW laser 400, a Yb:YAG/Cr:YAG PQSW laser 400, or a Yb:YAG/V:YAG PQSW laser 400. In particular embodiments, pulses of OPO pump light may correspond to the pulses of light of output beam 460 produced by PQSW laser 400. As an example, the OPO pump beam illustrated in each of FIGS. 13-15 may correspond to an output beam 460 of PQSW laser 400.

The light produced by an OPO 600 at two longer wavelengths may be referred to as the signal and idler, where the wavelength of the signal is shorter than the wavelength of the idler. The pump, signal, and idler wavelengths ($\lambda_p$, $\lambda_s$, and $\lambda_i$, respectively) may satisfy the relationship $1/\lambda_p = 1/\lambda_s + 1/\lambda_i$, where $\lambda_p$ is less than $\lambda_s$ and $\lambda_i$, and $\lambda_s$ is less than $\lambda_i$. As an example, for a 1030-nm OPO pump wavelength (corresponding to an operating wavelength of a Yb:YAG PQSW laser 400), the signal and idler wavelengths may be approximately 1533.8 nm and 3135.8 nm, respectively. As another example, for a Nd:YAG PQSW laser 400 that produces a 1064.3-nm OPO pump wavelength, the signal and idler wavelengths may be approximately 1544.8 nm and 3421.7 nm, respectively. As another example, for a Yb:YAG PQSW laser 400 that produces a 1030-nm OPO pump wavelength, the signal and idler wavelengths may be approximately 1473.6 nm and 3421.7 nm, respectively.

In particular embodiments, the OPO pump pulses from PQSW laser 400 may have a pulse energy of greater than or equal to 10 µJ, a pulse duration of less than or equal to 2 ns, a 50-500 kHz repetition rate, or a wavelength of 1000-1200 nm (e.g., a wavelength of approximately 1030 nm or approximately 1064 nm (e.g., 1064.3 nm)). Additionally, an OPO pump beam may have a $1/e^2$ beam diameter of between approximately 100 µm and approximately 300 µm. In particular embodiments, each optical pulse from a PQSW laser 400 that pumps OPO medium 610 may result in the production of a corresponding signal pulse and idler pulse. As an example, an OPO 600 that is pumped by a PQSW laser 400 that produces pulses with a particular repetition rate (e.g., 50-500 kHz) may produce output signal pulses at approximately the same repetition rate. Signal pulses emitted by an OPO 600 may have a pulse energy of greater than or equal to 1 µJ, a pulse duration of less than or equal to 2 ns, a 50-500 kHz repetition rate, or a wavelength between approximately 1400 nm and approximately 1600 nm. Output signal pulses produced by an OPO 600 may form an output beam 125 which may be sent to a splitter or a scanner 120 of a lidar system 100 and then scanned across a FOR of the lidar system 100.

Figure 14:
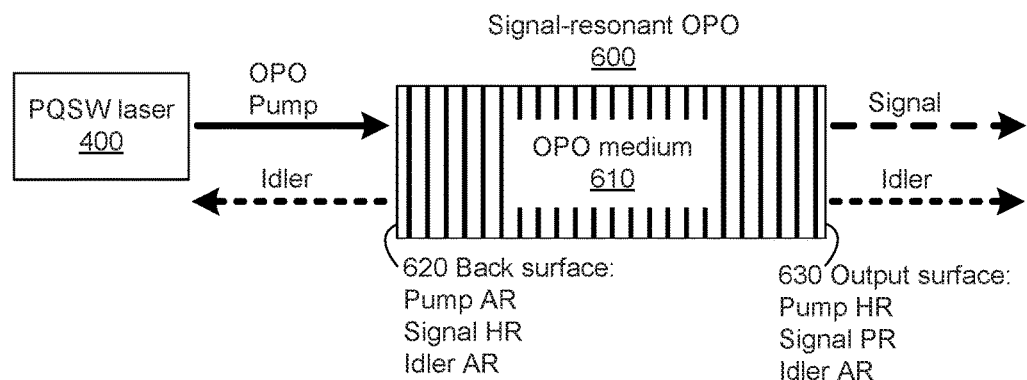
FIG. 14 illustrates an example optical parametric oscillator configured to operate in a signal-resonant mode.
Figure 15:
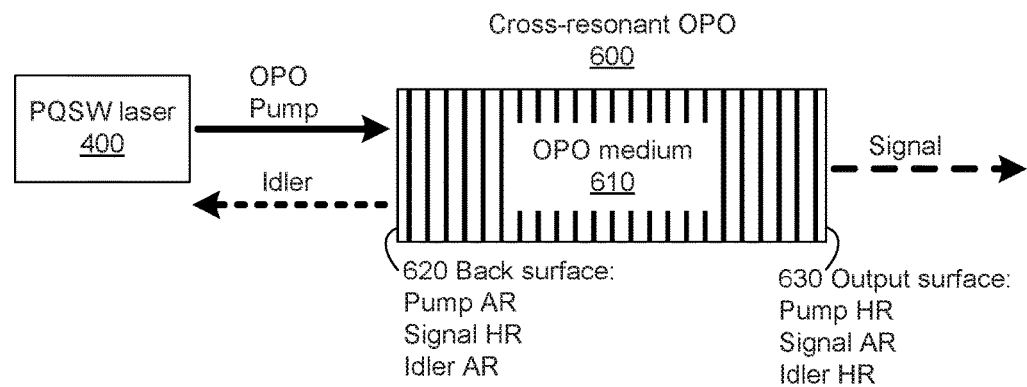
FIG. 15 illustrates an example optical parametric oscillator configured to operate in a cross-resonant mode.

In particular embodiments, OPO 600 may include an OPO medium 610 which is a periodically poled crystal material, such as for example, periodically poled potassium titanyl phosphate (PPKTP), periodically poled potassium titanyl arsenate (PPKTA), periodically poled rubidium titanyl arsenate (PPRTA), periodically poled lithium niobate (PPLN), periodically poled lithium tantalate (PPLT), or periodically poled stoichiometric lithium tantalate (PPSLT). A periodically poled crystal material may refer to a crystal material (e.g., titanyl phosphate, or KTP) which undergoes a periodic-poling process that produces a spatially periodic reversal of the orientation of the ferroelectric domains in the crystal. A periodically poled crystal material may exhibit improved conversion of pump light into signal and idler light by ensuring that the pump, signal, and idler are quasi-phase matched in the OPO medium 610. The periodic poling may be applied along a propagation axis of the OPO medium 610 so that the poled domains are oriented approximately parallel to the back surface 620 or output surface 630. In the example of FIGS. 13-15, the domains are indicated by vertical lines within the OPO medium 610. In particular embodiments, an OPO medium 610 may have between approximately 100 and 500 domains. The period of the domains may be any suitable distance between approximately 10 µm and approximately 50 µm. As an example, a PPKTP OPO medium 610 may have a domain period of approximately 20 µm, 25 µm, 30 µm, 35 µm, or 40 µm.

In particular embodiments, an OPO medium 610 of an OPO 600 may be configured to produce signal light at a wavelength between approximately 1400 nm and approximately 1600 nm. As an example, an OPO 600 may produce signal light with a wavelength between approximately 1520 nm and approximately 1574 nm. As another example, an OPO 600 with a PPKTP OPO medium 610 may produce signal light at a wavelength of approximately 1474 nm, approximately 1534 nm, or approximately 1545 nm. In particular embodiments, a length of OPO medium 610 (e.g., a distance between back surface 620 and output surface 630) may be any suitable value between approximately 1 mm and approximately 100 mm. As an example, OPO medium 610 may have a length of approximately 5 mm, 10 mm, 15 mm, 20 mm, or 25 mm.

In particular embodiments, OPO 600 may include a temperature-controlled enclosure (e.g., an oven, a heater, or a thermoelectric-cooler device) that provides temperature stabilization for OPO medium 610. As an example, an OPO medium 610 may be maintained at any suitable temperature, such as for example, a temperature of approximately 25° C., 50° C., 75° C., or 100° C. The temperature of an OPO medium 610 may be stabilized to within any suitable value of a set-point temperature (e.g., within ±2° C., ±1° C., ±0.5° C., ±0.1° C., or ±0.05° C. of a set-point temperature). As another example, a PPKTP OPO medium 610 with a 35-micron to 38-micron domain period may be operated at a temperature between approximately 27° C. and 127° C. and may be configured to produce a signal wavelength from approximately 1520 nm (at 27° C.) to approximately 1574 nm (at 127° C.). As another example, a PPKTP OPO medium 610 with a 36.5-micron domain period may be stabilized at a set-point temperature of 75-80° C. to produce a signal wavelength of approximately 1533.8 nm when pumped by a Yb:YAG PQSW laser 400 operating at approximately 1030 nm. As another example, a PPKTP OPO medium 610 with a 36.5-micron domain period may be operated at 75-80° C. to produce a signal wavelength of approximately 1544.8 nm when pumped by a Nd:YAG PQSW laser 400 operating at approximately 1064.3 nm.

In particular embodiments, an OPO medium 610 of an OPO 600 may include a back surface 620 with a dielectric coating. As an example, a back surface 620 may have a coating with a relatively low reflectivity for a pump wavelength (e.g., a wavelength of the PQSW laser 400 providing the OPO pump light) and a relatively high reflectivity for a signal wavelength of the OPO 600. Additionally back-surface coating may be high reflectivity or low reflectivity for an idler wavelength of the OPO 600. In particular embodiments, an OPO medium 610 of an OPO 600 may include an output surface 630 with a dielectric coating. As an example, an output surface 630 may have a coating with a relatively high reflectivity for OPO pump light and a relatively low or partial reflectivity for a signal wavelength of the OPO 600. Additionally, the output-surface coating may be high reflectivity or low reflectivity for an idler wavelength of the OPO 600. In particular embodiments, an OPO 600 may include an optical resonator. As an example, an optical resonator of an OPO 600 may be formed by back surface 620 and output surface 630. The OPO 600 illustrated in FIG. 13 may be referred to as an idler-resonant OPO since an optical resonator for the idler wavelength is formed by back surface 620 and output surface 630, both of which have HR coatings for the idler wavelength.

In the example of FIG. 13, OPO medium 610 has a back surface 620 with a coating that is AR for a pump wavelength (e.g., R<2% at an operating wavelength of the PQSW laser 400), HR (e.g., R>90%) for a signal wavelength, and HR (e.g., R>90%) for an idler wavelength. Additionally, the output surface 630 has a coating that is HR for a pump wavelength, AR for a signal wavelength, and HR for an idler wavelength. As an example, the back surface 620 in FIG. 13 may have a coating with the following reflectivity values: R<0.5% at approximately 1030 nm or 1064 nm (corresponding to a pump wavelength); R>98% at approximately 1534 nm or 1544 nm (corresponding to a signal wavelength); and R>95% at approximately 3136 nm or 3422 nm (corresponding to an idler wavelength). As another example, the output surface 630 in FIG. 13 may have a coating with the following reflectivity values: R>98% at approximately 1030 nm or 1064 nm; R<0.5% at approximately 1534 nm or 1544 nm; and R>95% at approximately 3136 nm or 3422 nm. A pump-AR coating on back surface 620 may allow most of the OPO pump light to pass into OPO medium 610 with minimal reflection of the OPO pump light. The pump-HR coating on output surface 630 may reflect most of the OPO pump light that reaches the output surface 630 so that the OPO pump light makes two passes through the OPO gain medium 610. This double-pass arrangement for the OPO pump light may improve the efficiency of converting pump light into signal and idler light. Additionally, the pump-HR coating on the output surface 630 may substantially block the OPO pump light from exiting the OPO medium 610 along with the signal beam. The signal-HR coating on back surface 620 reflects signal light so that most of the signal light generated in the OPO medium 610 is emitted from output surface 630, which is AR-coated for the signal.

FIG. 14 illustrates an example optical parametric oscillator 600 configured to operate in a signal-resonant mode. In the example of FIG. 14, OPO medium 610 has a back surface 620 with a coating that is AR for a pump wavelength (e.g., R<2% at an operating wavelength of the PQSW laser 400), HR (e.g., R>90%) for a signal wavelength, and AR (e.g., R<2%) for an idler wavelength. Additionally, the output surface 630 has a coating that is HR for a pump wavelength, PR for a signal wavelength, and AR for an idler wavelength. As an example, at a signal wavelength, the output surface 630 may have a PR coating with a reflectivity between approximately 10% and approximately 90% (e.g., a reflectivity of approximately 20%, 30%, 40%, 50%, 60%, 70%, or 80%). As another example, the back surface 620 in FIG. 14 may have a coating with the following reflectivity values: R<0.5% at approximately 1030 nm or 1064 nm; R>98% at approximately 1534 nm or 1544 nm; and R<2% at approximately 3136 nm or 3422 nm. As another example, the output surface 630 in FIG. 14 may have a coating with the following reflectivity values: R>98% at approximately 1030 nm or 1064 nm; R≅50% at approximately 1534 nm or 1544 nm; and R<2% at approximately 3136 nm or 3422 nm. The OPO 600 illustrated in FIG. 14 may be referred to as a signal-resonant OPO since an optical resonator for the signal wavelength is formed by the signal-HR coating on the back surface 620 and the signal-PR coating on the output surface 630.

In particular embodiments, an OPO 600 may be configured to be resonant for both the signal and idler. As an example, back surface 620 may have a coating that is AR for a pump wavelength, HR for a signal wavelength, and HR for an idler wavelength. The output surface 630 may have a coating that is HR for a pump wavelength, PR for a signal wavelength, and HR for an idler wavelength.

In particular embodiments, pump, signal, or idler beams may travel along a common optical axis (e.g., the pump, signal, or idler beams may not be displaced from one another along a transverse direction). For clarity of identifying the beams in the examples of FIGS. 14-15, the pump, signal, or idler beams are illustrated as being offset from one another along a transverse direction. In FIG. 14, the idler and signal beams emitted from output surface 630 may be coaxial, and similarly, in FIGS. 14 and 15, the idler and pump beams on the back-surface side of the OPO medium 610 may be coaxial. In particular embodiments, light from a pump or idler beam that is emitted by OPO medium 610 may be absorbed, reflected, or dispersed by a surface of an optical element (e.g., a lens, window, or filter). In FIG. 14, the idler beam emitted from output surface 630 (along with the signal beam) may be reflected or absorbed by a coating on a surface of OPO 600 (e.g., a coating on an output window of the OPO 600) or a coating located downstream from the OPO 600. In FIGS. 14 and 15, the idler beam emitted toward the PQSW laser 400 may be reflected or absorbed by a coating on an imaging optic of the PQSW laser 400 or may be spatially dispersed by the curvature of an imaging optic.

FIG. 15 illustrates an example optical parametric oscillator 600 configured to operate in a cross-resonant mode. In the example of FIG. 15, OPO medium 610 has a back surface 620 with a coating that is AR for a pump wavelength (e.g., R<2% at an operating wavelength of the PQSW laser 400), HR (e.g., R>90%) for a signal wavelength, and AR (e.g., R<2%) for an idler wavelength. Additionally, the output surface 630 has a coating that is HR for a pump wavelength, AR for a signal wavelength, and HR for an idler wavelength. For each of the signal and idler wavelengths, a cross-resonant OPO 600 (which may be referred to as a partially resonant OPO 600) may have one surface with an HR coating and another surface with an AR coating. In FIG. 15, for the signal wavelength, back surface 620 is HR, and output surface 630 is AR. For the idler wavelength, back surface 620 is AR, and output surface 630 is HR.

In particular embodiments, a cross-resonant OPO 600 may be operated as an idler-resonant OPO 600 or a signal-resonant OPO 600 with the addition of an external mirror. As an example, a cross-resonant OPO 600 may be configured to operate as an idler-resonant OPO by adding an external mirror that reflects the idler wavelength. An optical resonator for the idler may be formed by output surface 630 and an idler-HR surface of the external mirror. As another example, a cross-resonant OPO 600 may be configured to operate as a signal-resonant OPO by adding an external mirror that reflects at least part of the signal wavelength. An optical resonator for the signal may be formed by back surface 620 and a signal-HR or signal-PR surface of the external mirror. An external mirror may have a reflective surface that is curved (e.g., concave or convex) or flat and may have an HR or PR coating for the signal or idler. Additionally, an external mirror may be positioned any suitable distance from the back surface 620 or the output surface 630 (e.g., a distance of approximately 0.5 mm, 1 mm, 2 mm, 3 mm, 5 mm, 10 mm, or 20 mm from the back surface 620 or output surface 630).

Figure 16:
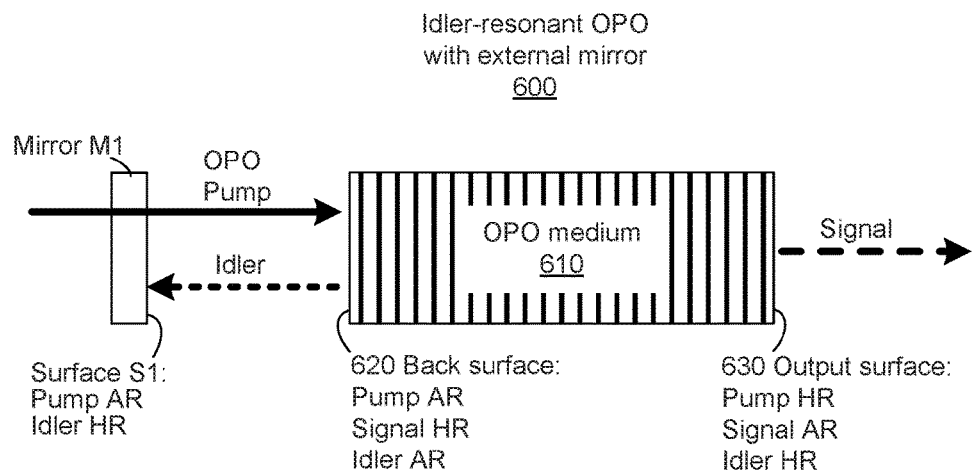
FIG. 16 illustrates an example idler-resonant optical parametric oscillator with an external mirror.

FIG. 16 illustrates an example idler-resonant optical parametric oscillator 600 with an external mirror M1. The OPO in FIG. 16 corresponds to the cross-resonant OPO in FIG. 15 with the addition of external mirror M1. The external mirror M1 is positioned between the OPO-pump source (e.g., PQSW laser 400) and the OPO medium 610. Mirror M1 has surface S1 facing back surface 620, and surface S1 has a coating which is AR for the pump wavelength and HR for the idler wavelength. The idler-HR coating is configured to reflect most of the idler beam back into the OPO medium 610. By adding the high reflecting surface S1 for the idler wavelength, a cross-resonant OPO may be converted into an idler-resonant OPO with an external mirror M1. Additionally, external mirror M1 may include a pump-AR coating to allow the OPO pump beam to pass through the external mirror M1 with minimal absorption or reflection.

Figure 17:
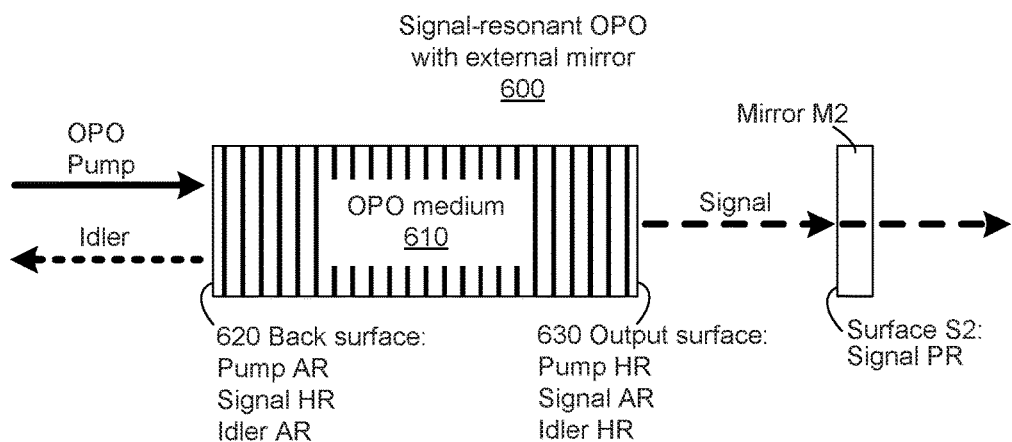
FIG. 17 illustrates an example signal-resonant optical parametric oscillator with an external mirror.

FIG. 17 illustrates an example signal-resonant optical parametric oscillator 600 with an external mirror M2. The OPO in FIG. 17 corresponds to the cross-resonant OPO in FIG. 15 with the addition of external mirror M2. The external mirror M2 has surface S2 facing output surface 630, and surface S2 may have a coating which is HR or PR for the signal wavelength. The external mirror M2 may be configured to receive the signal beam emitted by the OPO medium 610 and reflect at least a portion of the signal beam back into the OPO medium 610. By adding a HR or PR surface for the signal wavelength, a cross-resonant OPO may be converted into a signal-resonant OPO with an external mirror M2. As an example, surface S2 of mirror M2 may have a 50% reflectivity at the signal wavelength, and approximately 50% of the signal light may be sent back to the OPO medium 610. The remaining 50% of the signal light may be transmitted through mirror M2 and directed to a splitter or scanner 120.

In particular embodiments, an OPO 600 may include an OPO medium 610 and one or more external mirrors. The external mirrors may have concave reflective surfaces that allow the spatial-mode size of the signal or idler to be controlled or optimized. For a flat-flat resonant-cavity design (e.g., as illustrated in FIGS. 13-14) with flat end mirrors (formed by surfaces 620 and 630), the spatial-mode control for the signal and idler may be provided at least in part by parametric gain guiding from an OPO pump beam that has a relatively small diameter or high brightness. An OPO 600 that includes one or more external curved mirrors may allow additional control over the spatial-mode size of the signal beam. As an example, an OPO 600 may include an external concave mirror positioned facing back surface 620 (e.g., located between PQSW laser 400 and back surface 620, with the concave surface facing back surface 620) or facing output surface 630. As another example, an OPO 600 may include two external mirrors, one mirror facing back surface 620 and the other mirror facing output surface 630. A concave surface of a mirror facing back surface 620 may have a coating that is AR for OPO pump light, HR for signal light, or AR, PR, or HR for idler light. Additionally, the back surface 620 may have a coating that is AR for OPO pump light, AR or HR for signal light, or AR, PR, or HR for idler light. A concave surface of a mirror facing output surface 630 may have a coating that is AR or PR for signal light or AR, PR, or HR for idler light. Additionally, the output surface 630 may have a coating that is HR for OPO pump light, AR or PR for signal light, or AR, PR, or HR for idler light.

Figure 18:
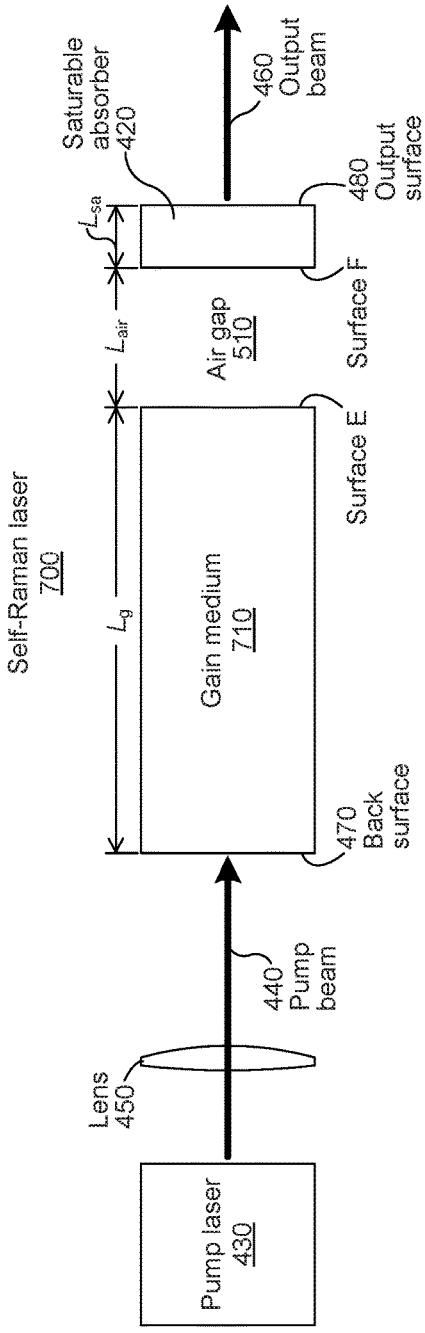
FIG. 18 illustrates an example self-Raman laser that includes a gain medium and a saturable absorber.

FIG. 18 illustrates an example self-Raman laser 700 that includes a gain medium 710 and a saturable absorber 420. In particular embodiments, a self-Raman laser 700 may refer to a solid-state laser that includes a gain medium 710, where, in addition to providing optical gain, the gain medium 710 also includes a Raman-active material. A Raman-active material may refer to a host crystal that exhibits the Raman effect in which incident photons may be inelastically scattered by the host crystal to produce lower-energy scattered photons. An inelastic scattering process may cause an incident photon to be scattered and produce a photon with a lower energy (or, longer wavelength), where the energy difference between the incident and scattered photons is referred to as the Stokes shift. As an example, the $YVO_4$ host material of a Nd:$YVO_4$ gain medium 710 may exhibit a Stokes shift of approximately 0.11 eV (or, 894 cm$^{-1}$). For an incident photon with a wavelength of approximately 1342 nm (or, an energy of approximately 0.92 eV), a Stokes shift of 0.11 eV results in the production of a Raman-shifted photon with a wavelength of approximately 1525 nm (or, an energy of approximately 0.81 eV).

Figure 19:
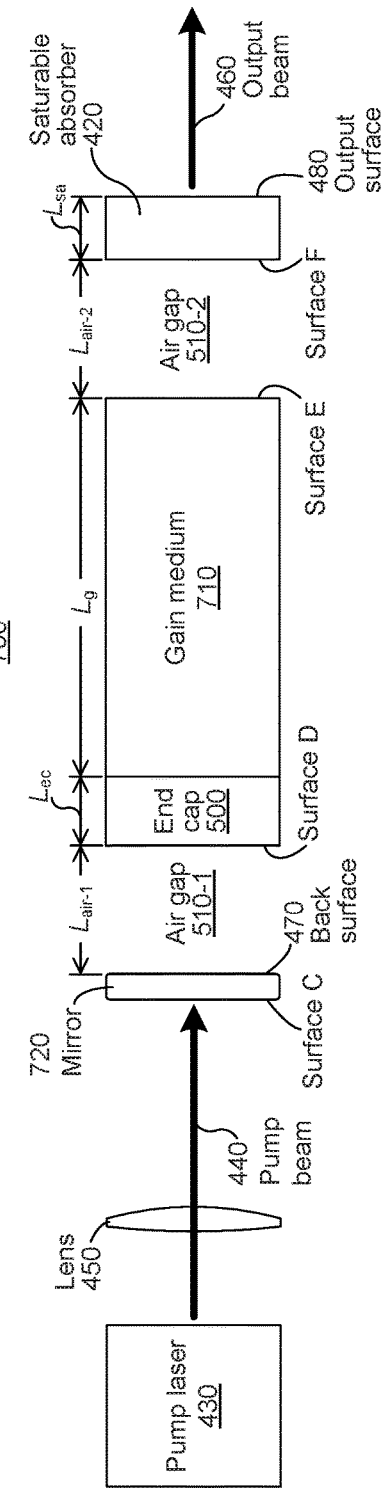
FIG. 19 illustrates an example self-Raman laser that includes a laser-cavity mirror and an end cap.

In particular embodiments, a light source 110 of a lidar system 100 may include a solid-state laser, where the solid-state laser includes a self-Raman laser 700 that includes a Raman-active gain medium 710 and a Q-switch (e.g., a saturable absorber 420 or an active Q-switch). A self-Raman laser 700 may produce Q-switched pulses of light at a lasing wavelength of the self-Raman laser. A self-Raman laser 700 may operate in a manner similar to a Q-switched laser (e.g., gain medium 710 along with saturable absorber 420 or an active Q-switch may produce Q-switched pulses through a Q-switching process). Additionally, the gain medium 710 of a self-Raman laser 700 may include a Raman-active material (e.g., the host crystal of gain medium 710 may be Raman active). At least a portion of the Q-switched pulses produced by the self-Raman laser 700 may be Raman-shifted in the Raman-active gain medium 710 to produce Raman-shifted pulses of light. The Raman-shifted pulses may have a Raman-shifted wavelength that is longer than the lasing wavelength, and the self-Raman laser 700 may be configured to emit at least a portion of the Raman-shifted pulses. In particular embodiments, a passively Q-switched self-Raman laser (as illustrated in FIGS. 18 and 19) may include a Raman-active gain medium 710 and a saturable absorber 420. In particular embodiments, an actively Q-switched self-Raman laser 700 may include a Raman-active gain medium 710 and an active Q-switch, where the gain medium 710 and the active Q-switch are configured to produce optical pulses through an active Q-switching process.

In particular embodiments, gain medium 710 of a self-Raman laser 700 may include a host crystal doped with rare-earth ions, where the host crystal is a Raman-active material. In particular embodiments, a Raman-active host crystal of gain medium 710 may include diamond, any suitable orthovanadate material, any suitable tungstate material, or any other suitable material. As an example, the host crystal of gain medium 710 may include yttrium orthovanadate ($YVO_4$), calcium tungstate ($CaWO_4$), potassium-gadolinium tungstate ($KGd(WO_4)_2$), barium tungstate ($BaWO_4$), strontium tungstate ($SrWO_4$), barium nitrate ($Ba(NO_3)_2$), or lead molybdate (Nd:$PbMoO_4$). As another example, a Raman-active gain medium 710 of a self-Raman laser 700 may include a rare-earth-doped orthovanadate crystal or a rare-earth-doped tungstate crystal. As another example, a Raman-active gain medium 710 of a self-Raman laser 700 may include neodymium-doped yttrium orthovanadate (Nd:$YVO_4$), neodymium-doped barium tungstate (Nd:BaWO$_4$), neodymium-doped strontium tungstate (Nd:SrWO$_4$), or neodymium-doped lead molybdate (Nd:PbMoO$_4$).

In particular embodiments, a gain medium 710 of a self-Raman laser 700 may have any suitable length L$_g$ between approximately 1 mm and approximately 30 mm. In particular embodiments, a self-Raman laser 700 may include any suitable saturable absorber 420, such as for example, V:YAG, Cr:YAG, Co:spinel, or Nd:SrF$_2$. As an example, a self-Raman laser 700 may include a 10-mm long Nd:YVO$_4$ gain medium 710 and a V:YAG saturable absorber 420. As another example, a self-Raman laser 700 may include a 10-mm long Nd:YVO$_4$ gain medium 710 with a 2-mm long end cap 500.

In particular embodiments, a self-Raman laser 700, which may be referred to as a passively Q-switched (PQSW) self-Raman laser, may produce pulses of light through a passive Q-switching process. Additionally, at least a portion of the Q-switched pulses of light may undergo a Raman-shifting process which produces longer-wavelength pulses, and at least a portion of the longer-wavelength pulses may be emitted by the self-Raman laser 700 as an output beam 460. As an example, a Nd:YVO$_4$ gain medium 710 and V:YAG saturable absorber 420 may act as a PQSW laser and produce optical pulses at approximately 1342 nm. Additionally, the YVO$_4$ host crystal may Raman shift at least some of the 1342-nm light to produce pulses of light at approximately 1525 nm. The 1525-nm pulses of light may be emitted as output beam 460, and at least part of the output beam 460 may form an output beam 125 of a lidar system 100. As another example, a self-Raman laser 700 may produce an output beam 460 with optical pulses having a pulse energy of greater than or equal to 1 µJ, a pulse repetition frequency of greater than or equal to 60 kHz, a pulse duration of less than or equal to 2 ns, or a wavelength of between approximately 1400 nm and approximately 1600 nm.

In particular embodiments, a self-Raman laser 700 may operate in a similar manner as a PQSW laser 400 described herein with the addition of an intracavity Raman-shifting process that occurs within the host crystal of the gain medium 710. The Raman-shifting process may convert laser photons (e.g., 1342-nm photons) produced by gain medium 710 into longer-wavelength photons (e.g., 1525-nm photons). In particular embodiments, a self-Raman laser 700 may be configured to produce pulses of output light 460 at a wavelength of approximately 1525 nm. As an example, a self-Raman laser 700 may include a Nd:YVO$_4$ gain medium 710 configured to lase (e.g., configured to produce laser light through a stimulated-emission process) and produce optical pulses at a wavelength of approximately 1342 nm. Additionally, the YVO$_4$ host material of the gain medium 710 may Raman shift at least a portion of the 1342-nm light to produce the 1525-nm pulses of Raman-shifted light.

In particular embodiments, gain medium 710 of self-Raman laser 700 may be pumped at a wavelength between approximately 800 nm and approximately 1000 nm by an edge-emitter laser diode or a VECSEL. As an example, pump laser 430 may be an edge-emitter laser diode with an output power of greater than or equal to 5 W and an operating wavelength between approximately 805 nm and approximately 811 nm (e.g., approximately 808 nm). Additionally, the free-space pump beam 440 may be focused by lens 450 to have a 1/e$^2$ beam diameter of approximately 100-400 µm in gain medium 710.

In the example of FIG. 18, gain medium 710 and saturable absorber 420 are separated by an air gap 510 with a length L$_{air}$. In particular embodiments, air gap 510 may have any suitable length L$_{air}$ between approximately 0 mm and approximately 50 mm. In particular embodiments, gain medium 710 and saturable absorber 420 may be separated by an air gap 510 to allow for differences in thermal expansion between the two host crystals (e.g., YVO$_4$ and YAG may have different coefficients of thermal expansion). As an example, gain medium 710 and saturable absorber 420 may be separated by an air gap 510 with length L$_{air}$ of approximately 0.05 mm, 0.1 mm, 0.5 mm, 1 mm, 2 mm, 5 mm, or 10 mm. In particular embodiments, there may be substantially no air gap 510 between gain medium 710 and saturable absorber 420 so that L$_{air}$ is approximately zero (e.g., self-Raman laser 700 may not include surface E or surface F). As an example, gain medium 710 and saturable absorber 420 may be bonded together with adhesive, epoxy, optical contacting, diffusion bonding, chemically activated direct bonding, or any other suitable bonding technique.

In particular embodiments, back surface 470 and output surface 480 of a self-Raman laser 700 may form two ends of a laser cavity of the self-Raman laser 700. As an example, a laser cavity of a self-Raman laser 700 may be resonant for a lasing wavelength of the gain medium 710 (e.g., 1342 nm). Additionally, the laser cavity may be resonant for a Raman wavelength (e.g., 1525 nm). As an example, back surface 470 and output surface 480 may each have a coating that is HR for a lasing wavelength or HR or PR for a Raman wavelength. A Raman wavelength, which may be referred to as a Raman-shifted wavelength, may correspond to the wavelength of light produced in a self-Raman laser 700 through Raman shifting.

In particular embodiments, back surface 470 of self-Raman laser 700 may have a dielectric coating which is AR (e.g., R<2%) at an operating wavelength of pump laser 430, HR (e.g., R>98%) at a lasing wavelength of the self-Raman laser 700, or HR (e.g., R>98%) at a Raman wavelength. As an example, back surface 470 may have a coating with the following reflectivity values: R<1% at 805-811 nm; R>99.5% at approximately 1342 nm; or R>99.5% at approximately 1525 nm. The pump-AR coating may allow most of the pump beam 440 to enter the gain medium 710 with minimal reflection loss at back surface 470. The HR coating for the Raman wavelength reflects most of the Raman-shifted light so that it is emitted primarily from the output surface 480.

In particular embodiments, output surface 480 of self-Raman laser 700 may have a dielectric coating which is HR at an operating wavelength of pump laser 430, HR at a lasing wavelength of the self-Raman laser 700, or AR or PR at a Raman wavelength. As an example, output surface 480 may have a coating with the following reflectivity values: R>99% at 805-811 nm; R>99.5% at approximately 1342 nm; or R<1% or R≅50% at approximately 1525 nm. In particular embodiments, output surface 480 may have a coating with no particular reflectivity for the pump-laser wavelength (e.g., the pump beam 440 may be reflected by a pump-HR coating located at surface E or surface F). As an example, output surface 480 may have a coating with the following reflectivity values: R>99.5% at approximately 1342 nm; or R<1% or R≅50% at approximately 1525 nm. Additionally, surface E or surface F may have an HR coating for the pump-laser wavelength. A pump-HR coating on surface E, surface F, or output surface 480 may allow the pump beam 440 to make two passes through the gain medium 710.

In particular embodiments, if self-Raman laser 700 includes an air gap 510 with a nonzero thickness (e.g., L$_{air}$>0), then surface E and surface F may each have a dielectric coating with particular reflectivity at particular wavelengths. As an example, surface E may have a coating which is HR at a pump-laser wavelength, AR at a laser wavelength of the self-Raman laser 700, or AR at a Raman wavelength. For example, surface E may have a coating with the following reflectivity values: R>99% at 805-811 nm; R<1% at approximately 1342 nm; or R<1% at approximately 1525 nm. As another example, surface F may have a coating which is AR at a laser wavelength of the self-Raman laser 700 or AR at a Raman wavelength. For example, surface F may have a coating with the following reflectivity values: R<1% at approximately 1342 nm; or R<1% at approximately 1525 nm. If surface E includes a pump-HR coating, then surface F may have a coating with no particular reflectivity at a pump-laser wavelength, since most of the pump beam 440 may be reflected by surface E.

FIG. 19 illustrates an example self-Raman laser 700 that includes a laser-cavity mirror 720 and an end cap 500. In particular embodiments, self-Raman laser 700 may include an end cap 500 coupled to gain medium 710, where the end cap 500 has a length $L_{ec}$ and is substantially free of gain-material dopants or has a low concentration of gain-material dopants. As an example, an end cap 500 may include a separate piece of undoped material (e.g., YVO$_4$) that is bonded to gain medium 710 (e.g., Nd:YVO$_4$). As another example, an end cap 500 may be formed from an undoped portion of a host crystal of gain medium 710. For example, a single YVO$_4$ host crystal with an overall length $L_{ec}+L_g$ may be doped with Nd ions over a length $L_g$, and the remaining $L_{ec}$ portion may be an undoped end cap 500 that is substantially free of Nd dopants. In particular embodiments, end cap 500 may be positioned to receive pump beam 440 so that pump beam 440 propagates through the end cap 500 before entering gain medium 710. In particular embodiments, end cap 500 may act as a heat spreader that reduces thermally induced stress or thermally induced lensing within gain medium 410. In particular embodiments, a self-Raman laser 700 may include an end cap 500 and may not include an external laser-cavity mirror 720. As an example, surface D of end cap 500 in FIG. 19 may act as a back surface 470 of self-Raman laser 700 and may have a similar dielectric coating as back surface 470 described above with respect to FIG. 18.

In particular embodiments, self-Raman laser 700 may have any suitable overall cavity length, where the cavity length corresponds to a distance between back surface 470 and output surface 480. As an example, a self-Raman laser 700 may have a cavity length of approximately 5 mm, 10 mm, 15 mm, 20 mm, 25 mm, 50 mm, or any other suitable cavity-length value. As another example, a self-Raman laser 700 may have a gain-medium length $L_g$ of approximately 10 mm and an overall cavity length of approximately 10.1-20 mm. As another example, a self-Raman laser 700 may have a gain-medium length $L_g$ of approximately 10 mm, an end-cap length $L_{ec}$ of approximately 2 mm, and an overall cavity length of approximately 20 mm. In the example of FIG. 18, the cavity length is $L_g+L_{air}+L_{sa}$. In the example of FIG. 19, the cavity length is $L_{air-1}+L_{ec}+L_g+L_{air-2}+L_{sa}$.

In particular embodiments, a self-Raman laser 700 may include one or more air gaps. In the example of FIG. 19, self-Raman laser 700 includes two air gaps: air gap 510-1 with length $L_{air-1}$ and air gap 510-2 with length $L_{air-2}$. Air gap 510-2 in FIG. 19 may be similar to air gap 510 in FIG. 18. As an example, the self-Raman laser 700 in FIG. 19 may include an air gap 510-2 having any suitable length $L_{air-2}$ between approximately 0 mm and approximately 50 mm. If there is substantially no air gap 510-2 between gain medium 710 and saturable absorber 420 (e.g., $L_{air-2}=0$), then saturable absorber 420 may be bonded to gain medium 710, and self-Raman laser 700 may not include surface E or surface F.

In particular embodiments, a self-Raman laser 700 may include laser-cavity mirror 720 separated from gain medium 710 by air gap 510-1. As an example, mirror 720 may include a back surface 470 that is concave or convex and that forms a cavity mirror of the self-Raman laser 700. The distance $L_{air-1}$ between back surface 470 and surface D may be any suitable value between approximately 0 mm and approximately 50 mm. As an example, $L_{air-1}$ may be approximately 0.5 mm, 1 mm, 2 mm, 3 mm, 5 mm, 10 mm, or 20 mm. In particular embodiments, back surface 470 of mirror 720 may have any suitable radius of curvature, such as for example, a radius of curvature of approximately +200 mm, +150 mm, +100 mm, +50 mm, +25 mm, −25 mm, −50 mm, −75 mm, −100 mm, −150 mm, or −200 mm.

In particular embodiments, surface C and back surface 470 of mirror 720 may each have any suitable dielectric coating. As an example, surface C may have a coating which is AR at a pump-laser wavelength (e.g., R<0.5% at 805-811 nm) so that pump beam 440 passes through surface C with minimal reflection loss. As another example, back surface 470 of mirror 720 have a coating which is AR at a pump-laser wavelength, HR at a lasing wavelength of the self-Raman laser 700, or HR at a Raman wavelength. For example, back surface 470 may have a coating with the following reflectivity values: R<1% at 805-811 nm; R>99.8% at approximately 1342 nm; or R>99.8% at approximately 1525 nm. As another example, back surface 470 may have no particular reflectivity at a Raman wavelength (e.g., surface D may have an HR coating that reflects the Raman wavelength).

In particular embodiments, surface D may be part of end cap 500 (as illustrated in FIG. 19), or surface D may be part of gain medium 710 (e.g., if self-Raman laser 700 does not include an end cap 500). In particular embodiments, surface D may have a dielectric coating which is AR at a pump-laser wavelength, AR at a lasing wavelength of the self-Raman laser 700, or AR, PR, or HR at a Raman wavelength. The pump-AR coating may allow most of the pump beam 440 to enter the end cap 500 or gain medium 710 with minimal reflection loss at surface D. The AR coating at the lasing wavelength may allow the laser light (e.g., light at 1342 nm) to propagate to and from the cavity mirror 720 with minimal loss at surface D. If back surface 470 has an HR coating at a Raman wavelength, then surface D may have an AR coating at the Raman wavelength. Alternately, if back surface 470 has no particular reflectivity at a Raman wavelength, then surface D may have an HR coating at the Raman wavelength.

Figure 20:
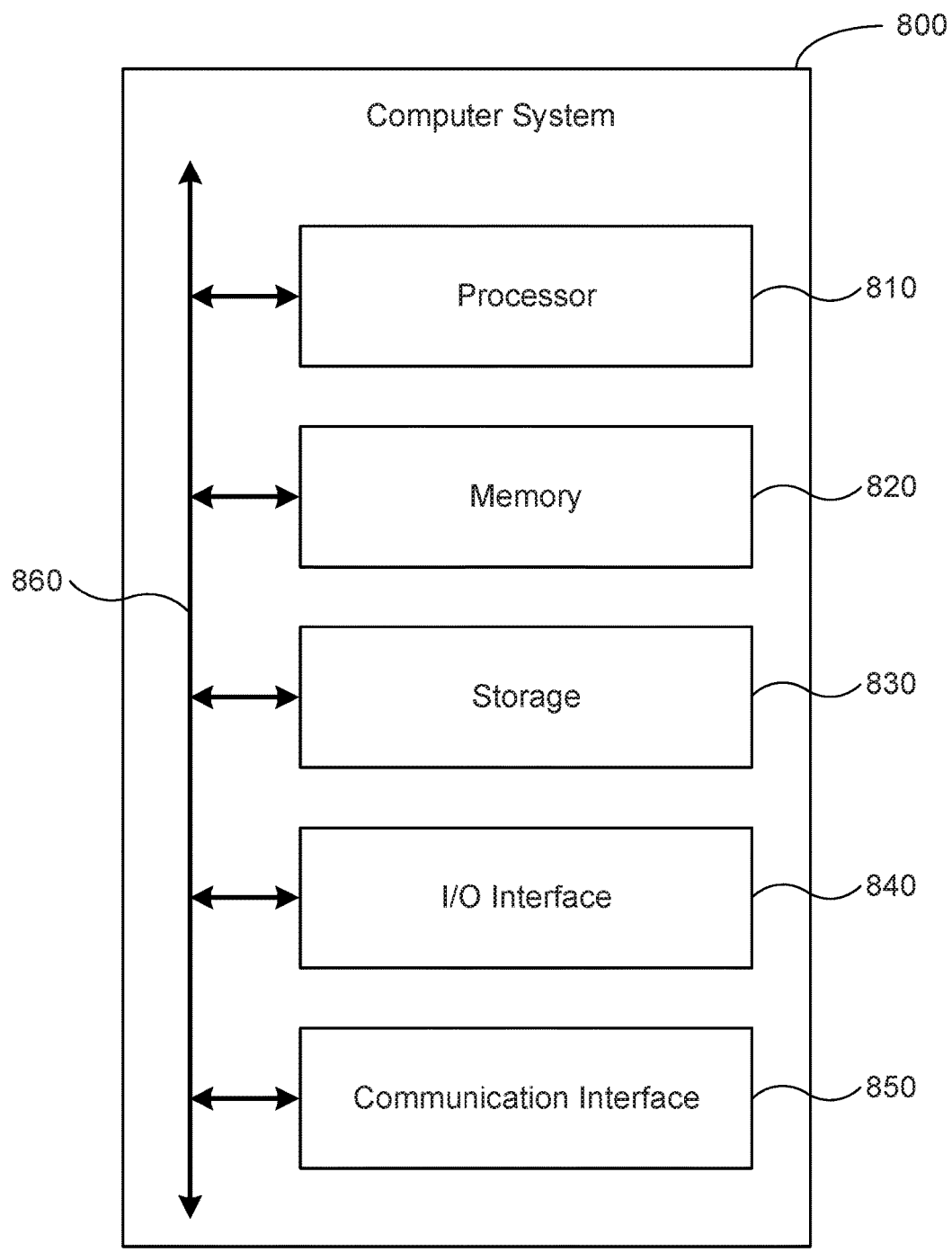
FIG. 20 illustrates an example computer system.

FIG. 20 illustrates an example computer system 800. In particular embodiments, one or more computer systems 800 may perform one or more steps of one or more methods described or illustrated herein. In particular embodiments, one or more computer systems 800 may provide functionality described or illustrated herein. In particular embodiments, software running on one or more computer systems 800 may perform one or more steps of one or more methods described or illustrated herein or may provide functionality described or illustrated herein. Particular embodiments may include one or more portions of one or more computer systems 800. In particular embodiments, a computer system may be referred to as a computing device, a computing system, a computer, a general-purpose computer, or a data-processing apparatus. Herein, reference to a computer system may encompass one or more computer systems, where appropriate.

Computer system 800 may take any suitable physical form. As an example, computer system 800 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 800 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

As illustrated in the example of FIG. 20, computer system 800 may include a processor 810, memory 820, storage 830, an input/output (I/O) interface 840, a communication interface 850, or a bus 860. Computer system 800 may include any suitable number of any suitable components in any suitable arrangement.

In particular embodiments, processor 810 may include hardware for executing instructions, such as those making up a computer program. As an example, to execute instructions, processor 810 may retrieve (or fetch) the instructions from an internal register, an internal cache, memory 820, or storage 830; decode and execute them; and then write one or more results to an internal register, an internal cache, memory 820, or storage 830. In particular embodiments, processor 810 may include one or more internal caches for data, instructions, or addresses. Processor 810 may include any suitable number of any suitable internal caches, where appropriate. As an example, processor 810 may include one or more instruction caches, one or more data caches, or one or more translation lookaside buffers (TLBs). Instructions in the instruction caches may be copies of instructions in memory 820 or storage 830, and the instruction caches may speed up retrieval of those instructions by processor 810. Data in the data caches may be copies of data in memory 820 or storage 830 for instructions executing at processor 810 to operate on; the results of previous instructions executed at processor 810 for access by subsequent instructions executing at processor 810 or for writing to memory 820 or storage 830; or other suitable data. The data caches may speed up read or write operations by processor 810. The TLBs may speed up virtual-address translation for processor 810. In particular embodiments, processor 810 may include one or more internal registers for data, instructions, or addresses. Processor 810 may include any suitable number of any suitable internal registers, where appropriate. Where appropriate, processor 810 may include one or more arithmetic logic units (ALUs); may be a multi-core processor; or may include one or more processors 810.

In particular embodiments, memory 820 may include main memory for storing instructions for processor 810 to execute or data for processor 810 to operate on. As an example, computer system 800 may load instructions from storage 830 or another source (such as, for example, another computer system 800) to memory 820. Processor 810 may then load the instructions from memory 820 to an internal register or internal cache. To execute the instructions, processor 810 may retrieve the instructions from the internal register or internal cache and decode them. During or after execution of the instructions, processor 810 may write one or more results (which may be intermediate or final results) to the internal register or internal cache. Processor 810 may then write one or more of those results to memory 820. One or more memory buses (which may each include an address bus and a data bus) may couple processor 810 to memory 820. Bus 860 may include one or more memory buses. In particular embodiments, one or more memory management units (MMUs) may reside between processor 810 and memory 820 and facilitate accesses to memory 820 requested by processor 810. In particular embodiments, memory 820 may include random access memory (RAM). This RAM may be volatile memory, where appropriate. Where appropriate, this RAM may be dynamic RAM (DRAM) or static RAM (SRAM). Memory 820 may include one or more memories 820, where appropriate.

In particular embodiments, storage 830 may include mass storage for data or instructions. As an example, storage 830 may include a hard disk drive (HDD), a floppy disk drive, flash memory, an optical disc, a magneto-optical disc, magnetic tape, or a Universal Serial Bus (USB) drive or a combination of two or more of these. Storage 830 may include removable or non-removable (or fixed) media, where appropriate. Storage 830 may be internal or external to computer system 800, where appropriate. In particular embodiments, storage 830 may be non-volatile, solid-state memory. In particular embodiments, storage 830 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 830 may include one or more storage control units facilitating communication between processor 810 and storage 830, where appropriate. Where appropriate, storage 830 may include one or more storages 830.

In particular embodiments, I/O interface 840 may include hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 840 may include one or more device or software drivers enabling processor 810 to drive one or more of these I/O devices. I/O interface 840 may include one or more I/O interfaces 840, where appropriate.

In particular embodiments, communication interface 850 may include hardware, software, or both providing one or more interfaces for communication (such as, for example, packet-based communication) between computer system 800 and one or more other computer systems 800 or one or more networks. As an example, communication interface 850 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 800 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 800 may communicate using fiber-optic communication based on 100 Gigabit Ethernet (100 GbE), 10 Gigabit Ethernet (10 GbE), or Synchronous Optical Networking (SONET). Computer system 800 may include any suitable communication interface 850 for any of these networks, where appropriate. Communication interface 850 may include one or more communication interfaces 850, where appropriate.

In particular embodiments, bus 860 may include hardware, software, or both coupling components of computer system 800 to each other. As an example, bus 860 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 860 may include one or more buses 860, where appropriate.

Various example embodiments are described in the following paragraphs.

In some embodiments, a lidar system comprises: a Q-switched laser configured to emit pulses of light, wherein the Q-switched laser comprises a gain medium and a Q-switch; a scanner configured to scan the emitted pulses of light across a field of regard; a receiver configured to detect at least a portion of the scanned pulses of light scattered by a target located a distance from the lidar system; and a processor configured to determine the distance from the lidar system to the target based at least in part on a round-trip time of flight for an emitted pulse of light to travel from the lidar system to the target and back to the lidar system.

In some embodiments, the Q-switched laser is an actively Q-switched laser and the Q-switch is an active Q-switch.

In some embodiments, the Q-switched laser is a passively Q-switched (PQSW) laser and the Q-switch is a saturable absorber.

In some embodiments, the saturable absorber comprises vanadium-doped yttrium aluminum garnet (V:YAG), chromium-doped YAG (Cr:YAG), cobalt-doped $MgAl_2\Theta_4$ (Co:spinel), neodymium-doped strontium fluoride ($Nd:SrF_2$), or lithium fluoride with $F_2$ color centers ($LiF:F_2$).

In some embodiments, the gain medium and the saturable absorber are separated by an air gap.

In some embodiments, the saturable absorber is bonded to the gain medium.

In some embodiments, the gain medium comprises neodymium-doped yttrium aluminum garnet (Nd:YAG), ytterbium-doped yttrium aluminum garnet (Yb:YAG), neodymium-doped yttrium orthovanadate ($Nd:YVO_4$), neodymium-doped yttrium scandium gallium garnet (Nd:YSGG), neodymium-doped gadolinium scandium gallium garnet (Nd:GSGG), neodymium-doped yttrium aluminum perovskite (Nd:YAP), or neodymium-doped yttrium lithium fluoride (Nd:YLF).

In some embodiments, the gain medium comprises a back surface with a dielectric coating having a low reflectivity at a pump-laser wavelength and a high reflectivity at an operating wavelength of the Q-switched laser.

In some embodiments, the gain medium is pumped at a pump wavelength between approximately 800 nm and approximately 1000 nm by an edge-emitter laser diode or a vertical-external-cavity surface-emitting laser.

In some embodiments, the Q-switched laser is an eye-safe laser with an operating wavelength between approximately 1400 nm and approximately 1600 nm.

In some embodiments, an operating wavelength of the Q-switched laser is approximately 1030 nanometers, approximately 1064 nanometers, or between approximately 1400 nanometers and approximately 1480 nanometers.

In some embodiments, the Q-switched laser further comprises an end cap coupled to the gain medium, wherein: the end cap is substantially free of gain-material dopants; and the end cap is positioned to receive light from a pump laser so that the pump-laser light propagates through the end cap before entering the gain medium.

In some embodiments, the pulses of light emitted by the Q-switched laser have a pulse repetition frequency greater than or equal to 20 kHz.

In some embodiments, the pulses of light emitted by the Q-switched laser have optical characteristics comprising: a pulse duration less than or equal to 20 nanoseconds; a duty cycle less than or equal to 1%; a pulse energy greater than or equal to 10 nanojoules; and a peak power greater than or equal to 1 watt.

In some embodiments, the lidar system further comprises a splitter configured to receive the pulses of light emitted by the Q-switched laser and split each received pulse of light into two or more angularly separated pulses of light which are scanned by the scanner across the field of regard.

In some embodiments, the angularly separated pulses of light are scanned along a scanning direction; and the angularly separated pulses of light are split along a direction that is approximately orthogonal to the scanning direction.

In some embodiments, the receiver comprises an array of two or more detector elements, wherein each detector element is configured to detect scattered light from a respective pulse of the two or more angularly separated pulses of light which are scanned across the field of regard.

In some embodiments, the field of regard comprises: a horizontal field of regard greater than or equal to 25 degrees; and a vertical field of regard greater than or equal to 5 degrees.

In some embodiments, the scanner comprises one or more mirrors, wherein each mirror is mechanically driven by a galvanometer scanner, a resonant scanner, a microelectromechanical systems (MEMS) device, or a voice coil motor.

In some embodiments, an output beam of the lidar system comprises the emitted pulses of light which are scanned across the field of regard; an input beam of the lidar system comprises the portion of the scanned pulses of light detected by the receiver; and the input and output beams are substantially coaxial.

In some embodiments, the lidar system further comprises an overlap mirror configured to overlap the input and output beams so that they are substantially coaxial, wherein the overlap mirror comprises: a hole, slot, or aperture which the output beam passes through; and a reflecting surface that reflects at least a portion of the input beam toward the receiver.

In some embodiments, scanning the emitted pulses of light across the field of regard comprises scanning a field of view of the Q-switched laser across the field of regard; and the scanner is further configured to scan a field of view of the receiver across the field of regard, wherein the Q-switched-laser field of view and the receiver field of view are scanned synchronously with respect to one another.

In some embodiments, a lidar system comprises: a pump laser configured to produce pulses of light at a pump wavelength; an optical parametric oscillator (OPO) comprising an OPO medium configured to: receive the pump pulses from the pump laser; convert at least part of the received pump pulses into pulses of light at a signal wavelength and pulses of light at an idler wavelength; and emit at least a portion of the signal pulses; a scanner configured to scan the emitted pulses of light across a field of regard; a receiver configured to detect at least a portion of the scanned pulses of light scattered by a target located a distance from the lidar system; and a processor configured to determine the distance from the lidar system to the target based at least in part on a round-trip time of flight for an emitted pulse of light to travel from the lidar system to the target and back to the lidar system.

In some embodiments, the pump laser is an actively Q-switched laser comprising a gain medium and an active Q-switch.

In some embodiments, the pump laser is a passively Q-switched (PQSW) laser comprising a gain medium and a saturable absorber.

In some embodiments, the gain medium is pumped by an edge-emitter laser diode or a vertical-external-cavity surface-emitting laser with an operating wavelength between approximately 800 nm and approximately 1000 nm.

In some embodiments, the gain medium comprises neodymium-doped yttrium aluminum garnet (Nd:YAG), ytterbium-doped yttrium aluminum garnet (Yb:YAG), neodymium-doped yttrium orthovanadate (Nd:YVO$_4$), neodymium-doped yttrium scandium gallium garnet (Nd:YSGG), neodymium-doped gadolinium scandium gallium garnet (Nd:GSGG), neodymium-doped yttrium aluminum perovskite (Nd:YAP), or neodymium-doped yttrium lithium fluoride (Nd:YLF); and the saturable absorber comprises vanadium-doped yttrium aluminum garnet (V:YAG), chromium-doped YAG (Cr:YAG), cobalt-doped MgAl$_2$O$_4$ (Co:spinel), neodymium-doped strontium fluoride (Nd:SrF$_2$), or lithium fluoride with F$_2$ color centers (LiF:F$_2$).

In some embodiments, the pump wavelength is approximately 1030 nm or approximately 1064 nm.

In some embodiments, the pump wavelength ($\lambda_p$), signal wavelength ($\lambda_s$), and idler wavelength ($\lambda_i$) are at least approximately related by an expression $1/\lambda_p = 1/\lambda_s + 1/\lambda_i$, wherein: $\lambda_p$ is less than $\lambda_s$ and $\lambda_i$; and $\lambda_s$ is less than $\lambda_i$.

In some embodiments, the OPO is an eye-safe light source and the signal wavelength of the signal pulses emitted by the OPO is between approximately 1400 nm and approximately 1600 nm.

In some embodiments, the OPO medium comprises periodically poled potassium titanyl phosphate (PPKTP), periodically poled potassium titanyl arsenate (PPKTA), periodically poled rubidium titanyl arsenate (PPRTA), periodically poled lithium niobate (PPLN), periodically poled lithium tantalate (PPLT), or periodically poled stoichiometric lithium tantalate (PPSLT).

In some embodiments, the OPO medium comprises a back surface and an output surface, wherein: the back surface comprises a dielectric coating with low reflectivity for the pump wavelength and high reflectivity for the signal wavelength; and the output surface comprises a dielectric coating with high reflectivity for the pump wavelength and low or partial reflectivity for the signal wavelength.

In some embodiments, the coating of the back surface additionally has high reflectivity or low reflectivity for the idler wavelength; and the coating of the output surface additionally has high reflectivity or low reflectivity for the idler wavelength.

In some embodiments, the signal pulses of light emitted by the OPO have a pulse repetition frequency greater than or equal to 20 kHz.

In some embodiments, the signal pulses of light emitted by the OPO have optical characteristics comprising: a pulse duration less than or equal to 20 nanoseconds; a duty cycle less than or equal to 1%; a pulse energy greater than or equal to 10 nanojoules; and a peak power greater than or equal to 1 watt.

In some embodiments, the lidar system further comprises a splitter configured to receive the signal pulses of light emitted by the OPO and split each received pulse of light into two or more angularly separated pulses of light which are scanned by the scanner across the field of regard.

In some embodiments, the angularly separated pulses of light are scanned along a scanning direction; and the angularly separated pulses of light are split along a direction that is approximately orthogonal to the scanning direction.

In some embodiments, the receiver comprises an array of two or more detector elements, wherein each detector element is configured to detect scattered light from a respective pulse of the two or more angularly separated pulses of light which are scanned across the field of regard.

In some embodiments, the field of regard comprises: a horizontal field of regard greater than or equal to 25 degrees; and a vertical field of regard greater than or equal to 5 degrees.

In some embodiments, the scanner comprises one or more mirrors, wherein each mirror is mechanically driven by a galvanometer scanner, a resonant scanner, a microelectromechanical systems (MEMS) device, or a voice coil motor.

In some embodiments, an output beam of the lidar system comprises the emitted signal pulses of light which are scanned across the field of regard; an input beam of the lidar system comprises the portion of the scanned pulses of light detected by the receiver; and the input and output beams are substantially coaxial.

In some embodiments, the lidar system further comprises an overlap mirror configured to overlap the input and output beams so that they are substantially coaxial, wherein the overlap mirror comprises: a hole, slot, or aperture which the output beam passes through; and a reflecting surface that reflects at least a portion of the input beam toward the receiver.

In some embodiments, scanning the emitted pulses of light across the field of regard comprises scanning a field of view of the OPO across the field of regard; and the scanner is further configured to scan a field of view of the receiver across the field of regard, wherein the OPO field of view and the receiver field of view are scanned synchronously with respect to one another.

In some embodiments, a lidar system comprises: a self-Raman laser comprising a Raman-active gain medium and a Q-switch, wherein the self-Raman laser is configured to: produce Q-switched pulses of light at a lasing wavelength of the self-Raman laser; Raman-shift, in the Raman-active gain medium, at least a portion of the Q-switched pulses to produce Raman-shifted pulses of light, wherein the Raman-shifted pulses have a Raman-shifted wavelength that is longer than the lasing wavelength; and emit at least a portion of the Raman-shifted pulses; a scanner configured to scan the emitted pulses of light across a field of regard; a receiver configured to detect at least a portion of the scanned pulses of light scattered by a target located a distance from the lidar system; and a processor configured to determine the distance from the lidar system to the target based at least in part on a round-trip time of flight for an emitted pulse of light to travel from the lidar system to the target and back to the lidar system.

In some embodiments, the self-Raman laser is an actively Q-switched self-Raman laser and the Q-switch is an active Q-switch.

In some embodiments, the self-Raman laser is a passively Q-switched (PQSW) self-Raman laser and the Q-switch is a saturable absorber.

In some embodiments, the saturable absorber comprises vanadium-doped yttrium aluminum garnet (V:YAG), cobalt-doped $MgAl_2O_4$ (Co:spinel), or neodymium-doped strontium fluoride ($Nd:SrF_2$).

In some embodiments, the Raman-active gain medium comprises a rare-earth-doped orthovanadate crystal or a rare-earth-doped tungstate crystal.

In some embodiments, the Raman-active gain medium comprises neodymium-doped yttrium orthovanadate ($Nd:YVO_4$) comprising neodymium ions in a yttrium orthovanadate ($YVO_4$) host crystal, wherein: the lasing wavelength of the Q-switched pulses of light produced by the $Nd:YVO_4$ material is approximately 1342 nm; and the $YVO_4$ host crystal is configured to Raman shift the portion of the Q-switched pulses to produce the Raman-shifted pulses of light, wherein the Raman-shifted wavelength is approximately 1525 nm.

In some embodiments, the gain medium is pumped at a wavelength between approximately 800 nm and approximately 1000 nm by an edge-emitter laser diode or a vertical-external-cavity surface-emitting laser.

In some embodiments, the self-Raman laser further comprises an end cap coupled to the gain medium, wherein: the end cap is substantially free of gain-material dopants; and the end cap is positioned to receive light from a pump laser so that the pump-laser light propagates through the end cap before entering the gain medium.

In some embodiments, the self-Raman laser further comprises a back surface with a dielectric coating having low reflectivity at a pump-laser wavelength, high reflectivity at the lasing wavelength of the self-Raman laser, and high reflectivity at the Raman-shifted wavelength.

In some embodiments, the self-Raman laser further comprises an output surface with a dielectric coating having high reflectivity at the lasing wavelength of the self-Raman laser and high reflectivity, partial reflectivity, or low reflectivity at the Raman-shifted wavelength.

In some embodiments, the self-Raman laser further comprises a mirror separated from the gain medium by an air gap, wherein the mirror comprises a concave surface that forms a cavity mirror of the self-Raman laser, wherein the concave surface comprises a back surface with a dielectric coating having low reflectivity at a pump-laser wavelength, high reflectivity at the lasing wavelength of the self-Raman laser, and high reflectivity at the Raman-shifted wavelength.

In some embodiments, the self-Raman laser is an eye-safe laser with an operating wavelength between approximately 1400 nm and approximately 1600 nm.

In some embodiments, the pulses of light emitted by the self-Raman laser have a pulse repetition frequency greater than or equal to 20 kHz.

In some embodiments, the pulses of light emitted by the self-Raman laser have optical characteristics comprising: a pulse duration less than or equal to 20 nanoseconds; a duty cycle less than or equal to 1%; a pulse energy greater than or equal to 10 nanojoules; and a peak power greater than or equal to 1 watt.

In some embodiments, the lidar system further comprises a splitter configured to receive the pulses of light emitted by the self-Raman laser and split each received pulse of light into two or more angularly separated pulses of light which are scanned by the scanner across the field of regard.

In some embodiments, the angularly separated pulses of light are scanned along a scanning direction; and the angularly separated pulses of light are split along a direction that is approximately orthogonal to the scanning direction.

In some embodiments, the receiver comprises an array of two or more detector elements, wherein each detector element is configured to detect scattered light from a respective pulse of the two or more angularly separated pulses of light which are scanned across the field of regard.

In some embodiments, the field of regard comprises: a horizontal field of regard greater than or equal to 25 degrees; and a vertical field of regard greater than or equal to 5 degrees.

In some embodiments, the scanner comprises one or more mirrors, wherein each mirror is mechanically driven by a galvanometer scanner, a resonant scanner, a microelectromechanical systems (MEMS) device, or a voice coil motor.

In some embodiments, an output beam of the lidar system comprises the emitted pulses of light which are scanned across the field of regard; an input beam of the lidar system comprises the portion of the scanned pulses of light detected by the receiver; and the input and output beams are substantially coaxial.

In some embodiments, the lidar system further comprises an overlap mirror configured to overlap the input and output beams so that they are substantially coaxial, wherein the overlap mirror comprises: a hole, slot, or aperture which the output beam passes through; and a reflecting surface that reflects at least a portion of the input beam toward the receiver.

In some embodiments, scanning the emitted pulses of light across the field of regard comprises scanning a field of view of the self-Raman laser across the field of regard; and the scanner is further configured to scan a field of view of the receiver across the field of regard, wherein the self-Raman-laser field of view and the receiver field of view are scanned synchronously with respect to one another.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 800. As an example, computer software may include instructions configured to be executed by processor 810. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed.

Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A lidar system comprising:
   a Q-switched laser configured to emit pulses of light, wherein the Q-switched laser comprises a gain medium and a Q-switch;
   a scanner configured to scan the emitted pulses of light across a field of regard;
   a receiver configured to detect at least a portion of the scanned pulses of light scattered by a target located a distance from the lidar system, wherein:
      an output beam of the lidar system comprises the emitted pulses of light which are scanned across the field of regard;
      an input beam of the lidar system comprises the portion of the scanned pulses of light detected by the receiver; and
      the input and output beams are substantially coaxial;
   an overlap mirror configured to overlap the input and output beams so that they are substantially coaxial, wherein the overlap mirror comprises:
      a hole, slot, or aperture which the output beam passes through; and
      a reflecting surface that reflects at least a portion of the input beam toward the receiver; and
   a processor configured to determine the distance from the lidar system to the target based at least in part on a round-trip time of flight for an emitted pulse of light to travel from the lidar system to the target and back to the lidar system.

2. The lidar system of claim 1, wherein the Q-switched laser is an actively Q-switched laser and the Q-switch is an active Q-switch.

3. The lidar system of claim 1, wherein the Q-switched laser is a passively Q-switched (PQSW) laser and the Q-switch is a saturable absorber.

4. The lidar system of claim 3, wherein the saturable absorber comprises vanadium-doped yttrium aluminum garnet (V:YAG), chromium-doped YAG (Cr:YAG), cobalt-doped $MgAl_2O_4$ (Co:spinel), neodymium-doped strontium fluoride ($Nd:SrF_2$), or lithium fluoride with $F_2^-$ color centers ($LiF:F_2^-$).

5. The lidar system of claim 3, wherein the gain medium and the saturable absorber are separated by an air gap.

6. The lidar system of claim 3, wherein the saturable absorber is bonded to the gain medium.

7. The lidar system of claim 1, wherein the gain medium comprises neodymium-doped yttrium aluminum garnet (Nd:YAG), ytterbium-doped yttrium aluminum garnet (Yb:YAG), neodymium-doped yttrium orthovanadate ($Nd:YVO_4$), neodymium-doped yttrium scandium gallium garnet (Nd:YSGG), neodymium-doped gadolinium scandium gallium garnet (Nd:GSGG), neodymium-doped yttrium aluminum perovskite (Nd:YAP), or neodymium-doped yttrium lithium fluoride (Nd:YLF).

8. The lidar system of claim 1, wherein the gain medium comprises a back surface with a dielectric coating having a low reflectivity at a pump-laser wavelength and a high reflectivity at an operating wavelength of the Q-switched laser.

9. The lidar system of claim 1, wherein the gain medium is pumped at a pump wavelength between approximately 800 nm and approximately 1000 nm by an edge-emitter laser diode or a vertical-external-cavity surface-emitting laser.

10. The lidar system of claim 1, wherein the Q-switched laser is an eye-safe laser with an operating wavelength between approximately 1400 nm and approximately 1600 nm.

11. The lidar system of claim 1, wherein an operating wavelength of the Q-switched laser is approximately 1030 nanometers, approximately 1064 nanometers, or between approximately 1400 nanometers and approximately 1480 nanometers.

12. The lidar system of claim 1, wherein the Q-switched laser further comprises an end cap coupled to the gain medium, wherein:
   the end cap is substantially free of gain-material dopants; and
   the end cap is positioned to receive light from a pump laser so that the pump-laser light propagates through the end cap before entering the gain medium.

13. The lidar system of claim 1, wherein the pulses of light emitted by the Q-switched laser have a pulse repetition frequency greater than or equal to 20 kHz.

14. The lidar system of claim 1, wherein the pulses of light emitted by the Q-switched laser have optical characteristics comprising:
   a pulse duration less than or equal to 20 nanoseconds;
   a duty cycle less than or equal to 1%;
   a pulse energy greater than or equal to 10 nanojoules; and
   a peak power greater than or equal to 1 watt.

15. The lidar system of claim 1, further comprising a splitter configured to receive the pulses of light emitted by the Q-switched laser and split each received pulse of light into two or more angularly separated pulses of light which are scanned by the scanner across the field of regard.

16. The lidar system of claim 15, wherein:
the angularly separated pulses of light are scanned along a scanning direction; and
the angularly separated pulses of light are split along a direction that is approximately orthogonal to the scanning direction.

17. The lidar system of claim 15, wherein the receiver comprises an array of two or more detector elements, wherein each detector element is configured to detect scattered light from a respective pulse of the two or more angularly separated pulses of light which are scanned across the field of regard.

18. The lidar system of claim 1, wherein the field of regard comprises:
a horizontal field of regard greater than or equal to 25 degrees; and
a vertical field of regard greater than or equal to 5 degrees.

19. The lidar system of claim 1, wherein the scanner comprises one or more mirrors, wherein each mirror is mechanically driven by a galvanometer scanner, a resonant scanner, a microelectromechanical systems (MEMS) device, or a voice coil motor.

20. The lidar system of claim 1, wherein:
scanning the emitted pulses of light across the field of regard comprises scanning a field of view of the Q-switched laser across the field of regard; and
the scanner is further configured to scan a field of view of the receiver across the field of regard, wherein the Q-switched-laser field of view and the receiver field of view are scanned synchronously with respect to one another.

* * * * *